United States Patent
Hayashi et al.

(10) Patent No.: US 7,022,752 B2
(45) Date of Patent: *Apr. 4, 2006

(54) COMPOSITE PARTICLES, PROCESS FOR PRODUCING THE SAME, AND PIGMENT, PAINT AND RESIN COMPOSITION USING THE SAME

(75) Inventors: Kazuyuki Hayashi, Hiroshima (JP); Mineko Ohsugi, Hiroshima (JP); Keisuke Iwasaki, Hiroshima (JP); Hiroko Morii, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 378 days.

This patent is subject to a terminal disclaimer.

(21) Appl. No.: 09/940,866

(22) Filed: Aug. 29, 2001

(65) Prior Publication Data

US 2002/0069790 A1    Jun. 13, 2002

(30) Foreign Application Priority Data

Sep. 1, 2000 (JP) .............................. 2000-265758
Mar. 30, 2001 (JP) .............................. 2001-101082
Jun. 5, 2001 (JP) .............................. 2001-170199

(51) Int. Cl.
*C08K 9/04* (2006.01)
*C08K 3/20* (2006.01)

(52) U.S. Cl. ...................... 523/210; 523/214; 523/215; 523/216; 524/430; 524/492; 524/495; 524/496; 524/437

(58) Field of Classification Search ................ 524/492, 524/430, 495, 496, 437; 523/210, 214, 215, 523/216
See application file for complete search history.

(56) References Cited

U.S. PATENT DOCUMENTS

| 4,877,451 | A | * | 10/1989 | Winnik et al. | 106/31.45 |
| 5,102,763 | A | * | 4/1992 | Winnik et al. | 430/108.24 |
| 5,378,574 | A | * | 1/1995 | Winnik et al. | 430/115 |
| 5,686,012 | A | | 11/1997 | Hayashi et al. | |
| 6,019,834 | A | | 2/2000 | Hayashi et al. | |
| 6,126,915 | A | * | 10/2000 | Tunashima et al. | 423/608 |
| 6,596,071 | B1 | * | 7/2003 | Hayashi et al. | 106/445 |
| 6,623,557 | B1 | * | 9/2003 | Hayashi et al. | 106/499 |
| 2001/0011110 | A1 | | 8/2001 | Hayashi et al. | |
| 2003/0002085 | A1 | * | 1/2003 | Hayashi et al. | 430/108.1 |
| 2003/0031615 | A1 | * | 2/2003 | Satou et al. | 423/335 |

FOREIGN PATENT DOCUMENTS

| EP | 0 699 721 A | | 3/1996 |
| EP | 0 863 188 A | | 9/1998 |
| EP | 1 106 657 A | | 6/2001 |
| JP | 01138114 | * | 5/1989 |

* cited by examiner

Primary Examiner—Tae H. Yoon
(74) Attorney, Agent, or Firm—Nixon & Vanderhye P.C.

(57) ABSTRACT

Composite particles having an average particle diameter of 0.001 to 10.0 μm, comprise:
 white inorganic particles as core particles;
 a gluing agent coating layer formed on surface of the white inorganic particle; and
 an organic pigment coat formed onto said gluing agent coating layer in an amount of from 1 to 500 parts by weight based on 100 parts by weight of the white inorganic particles. The composite particles are substantially free from desorption of an organic pigment from the surface thereof and contain no harmful element.

58 Claims, No Drawings

COMPOSITE PARTICLES, PROCESS FOR PRODUCING THE SAME, AND PIGMENT, PAINT AND RESIN COMPOSITION USING THE SAME

BACKGROUND OF THE INVENTION

The present invention relates to composite particles, a process for producing the composite particles, and a pigment, paint and resin composition using the composite particles. More particularly, the present invention relates to composite particles which are substantially free from desorption of an organic pigment from the surface thereof and contain no harmful element, a process for producing the composite particles, and a pigment, paint and resin composition using such composite particles.

As well known in the arts, inorganic pigments and organic pigments have been used as colorants for resins, paints, printing inks or the like according to applications thereof. Also, it is known that the inorganic pigments are usually excellent in light resistance, but are deteriorated in tinting strength, thereby failing to show a clear hue. Although some inorganic pigments exhibit a clear hue, many of such pigments contain as essential component, harmful metals such as lead, mercury, cadmium, chromium or the like. Therefore, it has been strongly required to replace these conventional inorganic pigments with alternate materials capable of showing a clear hue, from the standpoints of hygiene, safety and environmental protection.

On the other hand, it is known that the organic pigments usually show a clear hue, but are deteriorated in hiding power and light resistance.

Hitherto, in order to obtain pigments exhibiting excellent properties required for colorants, it has been attempted to combine the inorganic pigments with the organic pigments. For example, there have been proposed the method of co-precipitating chrome yellow and phthalocyanine blue together, the method of adhering an organic pigment to the surface of inorganic pigment particles (Japanese Patent Application Laid-Open (KOKAI) Nos. 4-132770(1992) and 11-181329(1999), etc.) or the like.

At present, it has been strongly required to provide composite particles which are substantially free from desorption of organic pigment from the surface thereof, and contain no harmful elements. However, such composite particles have not been obtained.

That is, in the above method in which chrome yellow and phthalocyanine blue are co-precipitated together, the chrome yellow used therein shows a toxicity, and the obtained pigment shows an insufficient storage stability in a paint produced therefrom due to the co-precipitation production method thereof. Further, when such paint is formed into a coating film, undesired floating tends to be caused thereon.

Also, in the method described in Japanese Patent Application Laid-Open (KOKAI) No. 4-132770(1992), since the organic pigment is simply precipitated in the presence of the inorganic pigment, the adhesion strength of the organic pigment onto the inorganic pigment is insufficient.

Further, in the method described in Japanese Patent Application Laid-Open (KOKAI) No. 11-181329(1999), organopolysiloxane is dissolved in cyclic silicone, and organic pigment particles are added to the resultant solution so as to produce fine particles of the organic pigment. The mixture is impregnated into a high-oil absorptive inorganic pigment. Then, the cyclic silicone is evaporated from the obtained pigment. Therefore, the adhesion strength of the organic pigment onto the inorganic pigment is also insufficient.

Meanwhile, in Japanese Patent Application Laid-Open (KOKAI) No. 11-323174(1999), there are also described black iron-based composite particles comprising as core particles black iron oxide particles or black iron oxide hydroxide particles, a coating layer formed on surface of the core particle which comprises organosilane compounds obtainable from alkoxysilanes, and a carbon black coat formed onto the surface of the coating layer. However, the invention of this KOKAI relates to fixing carbon black onto the black inorganic particles as core particles, and the technique described therein, therefore, is quite different from techniques for obtaining an organic pigment having an excellent hue.

As a result of the present inventors' earnest studies, it has been found that by forming a gluing agent coating layer on surface of a white inorganic particle and forming an organic pigment coat on the gluing agent coating layer in an amount of 1 to 500 parts by weight based on 100 parts by weight of the white inorganic particles, the obtained composite particles having an average particle size of 0.001 to 10.0 μm are substantially free from desorption of organic pigment from the surface thereof, and are usable as a harmless pigment. The present invention has been attained on the basis of the finding.

SUMMARY OF THE INVENTION

An object of the present invention is to provide composite particles which are substantially free from desorption of organic pigment from the surface thereof, and contain no harmful elements.

Another object of the present invention is to provide a harmless pigment which is substantially free from desorption of organic pigment from the surface thereof.

A further object of the present invention is to provide a paint exhibiting excellent stability and dispersibility.

A still further object of the present invention is to provide a resin composition having an excellent pigment dispersibility therein.

To accomplish the aims, in a first aspect of the present invention, there are provided composite particles having an average particle diameter of 0.001 to 10.0 μm, comprising:

white inorganic particles as core particles;

a gluing agent coating layer formed on surface of said white inorganic particle; and an organic pigment coat formed onto said gluing agent coating layer in an amount of from 1 to 500 parts by weight based on 100 parts by weight of said white inorganic particles.

In a second aspect of the present invention, there are provided composite particles having an average particle diameter of 0.001 to 10.0 μm, comprising:

white inorganic particles as core particles, each having on at least a part of the surface thereof, a coating layer comprising at least one compound selected from the group consisting of hydroxides of aluminum, oxides of aluminum, hydroxides of silicon and oxides of silicon;

a gluing agent coating layer formed on surface of said white inorganic particle; and an organic pigment coat formed onto said gluing agent coating layer in an amount of from 1 to 500 parts by weight based on 100 parts by weight of said white inorganic particles.

In a third aspect of the present invention, there are provided composite particles having an average particle diameter of 0.001 to 10.0 µm, comprising:

white inorganic particles as core particles;

a gluing agent coating layer formed on surface of said white inorganic particle, comprising at least one selected from the group consisting of a silane-based coupling agent, a titanate-based coupling agent, an aluminate-based coupling agent, a zirconate-based coupling agent, an oligomer compound, a polymer compound and an organosilicon compound selected from the group consisting of:

(1) organosilane compounds obtainable from alkoxysilane compounds, (2) polysiloxanes or modified polysiloxanes, and (3) fluoroalkyl organosilane compounds obtainable form fluoroalkylsilane compounds; and an organic pigment coat formed on said coating layer in an amount of from 1 to 500 parts by weight based on 100 parts by weight of said white inorganic particles.

In a fourth aspect of the present invention, there are provided composite particles having an average particle diameter of 0.001 to 10.0 µm, comprising:

white inorganic particles as core particles, each having on at least a part of the surface thereof, a coating layer comprising at least one compound selected from the group consisting of hydroxides of aluminum, oxides of aluminum, hydroxides of silicon and oxides of silicon;

a gluing agent coating layer formed on surface of said white inorganic particle, comprising at least one selected from the group consisting of a silane-based coupling agent, a titanate-based coupling agent, an aluminate-based coupling agent, a zirconate-based coupling agent, an oligomer compound, a polymer compound and an organosilicon compound selected from the group consisting of:

(1) organosilane compounds obtainable from alkoxysilane compounds, (2) polysiloxanes or modified polysiloxanes, and (3) fluoroalkyl organosilane compounds obtainable form fluoroalkylsilane compounds; and an organic pigment coat formed on said coating layer in an amount of from 1 to 500 parts by weight based on 100 parts by weight of said white inorganic particles.

In a fifth aspect of the present invention, there are provided composite particles having an average particle diameter of 0.001 to 10.0 µm, comprising:

white inorganic particles as core particles, each having on at least a part of the surface thereof, a coating layer comprising at least one compound selected from the group consisting of hydroxides of aluminum, oxides of aluminum, hydroxides of silicon and oxides of silicon;

a coating layer formed on surface of said white inorganic particle, comprising at least one organosilicon compound selected from the group consisting of:

(1) organosilane compounds obtainable from alkoxysilane compounds, and (2) polysiloxanes or modified polysiloxanes; and an organic pigment coat formed on the coating layer comprising said organosilicon compound in an amount of from 1 to 100 parts by weight based on 100 parts by weight of said white inorganic particles.

In a sixth aspect of the present invention, there are provided composite particles having an average particle diameter of 0.001 to 10.0 µm, comprising:

white inorganic particles as core particles;

a gluing agent coating layer formed on surface of said white inorganic particle; and at least two colored adhesion layers composed of an organic pigment, formed on said coating layer through a gluing agent, the amount of the organic pigment being 1 to 500 parts by weight based on 100 parts by weight of said white inorganic particles.

In a seventh aspect of the present invention, there are provided composite particles having an average particle diameter of 0.001 to 10.0 µm, comprising:

white inorganic particles as core particles, each having on at least a part of the surface thereof, a coating layer comprising at least one compound selected from the group consisting of hydroxides of aluminum, oxides of aluminum, hydroxides of silicon and oxides of silicon;

a gluing agent coating layer formed on surface of said white inorganic particle; and at least two colored adhesion layers composed of an organic pigment, formed on said coating layer through a gluing agent, the amount of the organic pigment being 1 to 500 parts by weight based on 100 parts by weight of said white inorganic particles.

In an eighth aspect of the present invention, there are provided composite particles having an average particle diameter of 0.001 to 10.0 µm, comprising:

white inorganic particles as core particles;

a gluing agent coating layer formed on surface of said white inorganic particle, comprising at least one selected from the group consisting of a silane-based coupling agent, a titanate-based coupling agent, an aluminate-based coupling agent, a zirconate-based coupling agent, an oligomer compound, a polymer compound and an organosilicon compound selected from the group consisting of:

(1) organosilane compounds obtainable from alkoxysilane compounds, (2) polysiloxanes or modified polysiloxanes, and (3) fluoroalkyl organosilane compounds obtainable form fluoroalkylsilane compounds; and at least two colored adhesion layers composed of an organic pigment, formed on said coating layer through a gluing agent comprising at least one selected from the group consisting of a silane-based coupling agent, a titanate-based coupling agent, an aluminate-based coupling agent, a zirconate-based coupling agent, an oligomer compound, a polymer compound and an organosilicon compound selected from the group consisting of: (1) organosilane compounds obtainable from alkoxysilane compounds, (2) polysiloxanes or modified polysiloxanes, and (3) fluoroalkyl organosilane compounds obtainable form fluoroalkylsilane compounds, the amount of the organic pigment being 1 to 500 parts by weight based on 100 parts by weight of said white inorganic particles.

In a ninth aspect of the present invention, there are provided composite particles having an average particle diameter of 0.001 to 10.0 µm, comprising:

white inorganic particles as core particles, each having on at least a part of the surface thereof, a coating layer comprising at least one compound selected from the group consisting of hydroxides of aluminum, oxides of aluminum, hydroxides of silicon and oxides of silicon;

a gluing agent coating layer formed on surface of said white inorganic particle, comprising at least one selected from the group consisting of a silane-based coupling agent, a titanate-based coupling agent, an aluminate-based coupling agent, a zirconate-based coupling agent, an oligomer compound, a polymer compound and an organosilicon compound selected from the group consisting of:

(1) organosilane compounds obtainable from alkoxysilane compounds, (2) polysiloxanes or modified polysiloxanes, and (3) fluoroalkyl organosilane compounds obtainable form fluoroalkylsilane compounds; and at least two colored adhesion layers composed of an organic pigment, formed on said coating layer through a gluing agent comprising at least one selected from the group consisting of a silane-based coupling agent, a titanate-based coupling agent, an aluminate-based coupling agent, a zirconate-based coupling agent, an oligomer compound, a polymer compound and an organosilicon compound selected from the group consisting of: (1) organosilane compounds obtainable from alkoxysilane compounds, (2) polysiloxanes or modified polysiloxanes, and (3) fluoroalkyl organosilane compounds obtainable form fluoroalkylsilane compounds, the amount of the organic pigment being 1 to 500 parts by weight based on 100 parts by weight of said white inorganic particles.

In a tenth aspect of the present invention, there are provided composite particles having an average particle diameter of 0.001 to 0.5 µm, comprising:

extender pigment particles as core particles;

a gluing agent coating layer formed on surface of said white extender pigment particle, comprising an organosilicon compound, a coupling agent, an oligomer compound or a polymer compound; and an organic pigment coat formed on the gluing agent coating layer in an amount of from 1 to 500 parts by weight based on 100 parts by weight of said extender pigment particles.

In an eleventh aspect of the present invention, there are provided composite particles having an average particle diameter of 0.001 to 0.15 µm, comprising:

extender pigment particles as core particles, each having on at least a part of the surface thereof, a coating layer comprising at least one compound selected from the group consisting of hydroxides of aluminum, oxides of aluminum, hydroxides of silicon and oxides of silicon;

a gluing agent coating layer formed on surface of said white extender pigment particle, comprising an organosilicon compound, a coupling agent, an oligomer compound or a polymer compound; and an organic pigment coat formed on the gluing agent coating layer in an amount of from 1 to 500 parts by weight based on 100 parts by weight of said extender pigment particles.

In a twelfth aspect of the present invention, there is provided a process for producing composite particles, comprising:

mixing white inorganic particles with a gluing agent under stirring to form a gluing agent coating layer on surface of said white inorganic particle; and mixing an organic pigment with the gluing agent-coated white inorganic particles under stirring to form an organic pigment coat on the gluing agent coating layer.

In a thirteenth aspect of the present invention, there are provided a pigment comprising the composite particles defined in any one of the above-mentioned aspects.

In a fourteenth aspect of the present invention, there is provided a paint comprising:

said pigment defined in the above aspect; and a paint base material.

In a fifteenth aspect of the present invention, there is provided a rubber or resin composition comprising:

said pigment defined in the above aspect; and a base material for rubber or resin composition.

In a sixteenth aspect of the present invention, there is provided a pigment dispersion for solvent-based paint comprising:

100 parts by weight of a pigment dispersion base material for solvent-based paint; and 5 to 1,000 parts by weight of the pigment defined in the above aspect.

In a seventeenth aspect of the present invention, there is provided a pigment dispersion for water-based paint comprising:

100 parts by weight of a pigment dispersion base material for water-based paint; and 5 to 1,000 parts by weight of the pigment defined in the above aspect.

In an eighteenth aspect of the present invention, there is provided master batch pellets comprising:

100 parts by weight of rubber or thermoplastic resins; and 1 to 100 parts by weight of the pigment defined in the above aspect.

DETAILED DESCRIPTION OF THE INVENTION

The present invention will now be described in detail below.

First, the composite particles according to the present invention are described.

The composite particles according to the present invention, comprise white inorganic particles, a gluing agent coating layer formed on surface of the white inorganic particles, and an organic pigment coat adhered onto the surface of the white inorganic particle through the gluing agent coating layer. The composite particles have an average particle size of 0.001 to 10.0 µm.

As the white inorganic particles used in the present invention, there may be exemplified white pigments such as titanium dioxide, transparent titanium dioxide and zinc oxide; pearl pigments such as titanium mica and muscovite; and extender pigments such as fine silica particles such as silica powder, white carbon, fine silicic acid powder and diatomaceous earth, clay, calcium carbonate, precipitated barium sulfate, alumina white, talc, transparent titanium oxide and satin white. The white inorganic particles may be appropriately selected from the above-described pigments according to properties required therefor or applications thereof, for example, the white pigments are preferably used in applications requiring a hiding power, and the pearl pigments are preferably used in applications requiring pearl-like gloss. In addition, transparent titanium dioxide, the extender pigments or pearl pigments are preferably used in applications requiring a transparency. Among them, the extender pigments are more preferred.

The white inorganic particles may be those having any suitable shape such as spherical particles, granular particles, polyhedral particles, acicular particles, spindle-shaped particles, rice grain-like particles, flake-shaped particles, scale-like particles and plate-shaped particles.

The lower limit of the average particle size of the white inorganic particles is usually 0.0009 µm, preferably 0.002 µm, more preferably 0.004 µm, still more preferably 0.009 µm. The upper limit of the average particle size of the white inorganic particles is usually 9.95 µm, preferably 9.45 µm, more preferably 8.95 μm. In some specific applications, the upper limit of the average particle size of the white inorganic particles is preferably 0.49 μm, more preferably 0.29 μm, still more preferably 0.14 μm.

When the average particle size of the white inorganic particles is more than 9.95 μm, the obtained composite particles become coarse, resulting in deteriorated tinting strength thereof. When the average particle size of the white inorganic particles is less than 0.0009 μm, such particles tend to be agglomerated due to such fine particles. As a result, it becomes difficult to form a uniform gluing agent coating layer on the surface of the white inorganic particles, and uniformly adhere an organic pigment onto the surface of the coating layer.

The white inorganic particles usually have a BET specific surface area value of not less than 0.5 m²/g. When the BET specific surface area value is less than 0.5 m²/g, the white inorganic particles become coarse, or sintering is caused within or between the particles, so that the obtained composite particles also become coarse and are, therefore, deteriorated in tinting strength. In the consideration of tinting strength of the obtained composite particles, the BET specific surface area value of the white inorganic particles is preferably not less than 1.0 m²/g, more preferably 1.5 m²/g. In the consideration of forming a uniform gluing agent coating layer on the surface of the white inorganic particles or uniformly adhering the organic pigment onto the surface of the gluing agent coating layer, the upper limit of the BET specific surface area value of the white inorganic particles is usually 500 m²/g, preferably 400 m²/g, more preferably 300 m²/g.

As to the hue of the white inorganic particles, the L* value thereof is preferably not less than 70.00, more preferably not less than 75.00, and the C* value thereof is preferably not more than 18.00, more preferably not more than 16.00, still more preferably not more than 12.00, further still more preferably not more than 10.00, most preferably not more than 8.00. When the L* value is out of the above-specified ranges, the inorganic particles may not exhibit a sufficiently white color, so that it may become difficult to obtain the aimed composite particles of the present invention.

As to the hiding power of the white inorganic particles used in the present invention, in the case where white pigments is used as the white inorganic particles, the hiding power thereof not less than 600 cm²/g when measured by the below-mentioned method, and in the case where transparent titanium dioxide, pearl pigments or extender pigments are used as the white inorganic particles, the hiding power thereof is less than 600 cm²/g.

In order to obtain the composite particles having a good transparency, the hiding power of the white inorganic particles is preferably less than 200 cm²/g, more preferably not more than 150 cm²/g, still more preferably not more than 100 cm²/g.

As to the light resistance of the white inorganic particles used in the present invention, the lower limit of the ΔE* value thereof is more than 5.0, and the upper limit of the ΔE* value is usually 12.0, preferably 11.0, more preferably 10.0.

The gluing agent used in the present invention may be of any kind as long as the organic pigment can be adhered onto the surface of the white inorganic particle therethrough. Examples of the preferred gluing agents may include organosilicon compounds such as alkoxysilanes, fluoroalkylsilanes and polysiloxanes; various coupling agents such as silane-based coupling agents, titanate-based coupling agents, aluminate-based coupling agents and zirconate-based coupling agents; oligomer compounds, polymer compounds or the like. These gluing agents may be used alone or in the form of a mixture of any two or more thereof. In the consideration of adhesion strength of the organic pigment onto the surface of the white inorganic particle through the gluing agent, the more preferred gluing agents are the organosilicon compounds such as alkoxysilanes, fluoroalkylsilanes and polysiloxanes, and various coupling agents such as silane-based coupling agents, titanate-based coupling agents, aluminate-based coupling agents and zirconate-based coupling agents.

In particular, in the case where fine silica particles are used as the core particles, it is preferable to use the organosilicon compounds or the silane-based coupling agents as the gluing agent.

As organosilicon compounds used in the present invention, at least one organosilicon compound selected from the group consisting of (1) organosilane compounds obtained from alkoxysilane compounds; (2) polysiloxanes, or modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group; and (3) fluoroalkyl organosilane compounds obtained from fluoroalkylsilane compounds.

The organosilane compounds (1) can be produced from alkoxysilane compounds represented by the formula (I):

$$R^1_a SiX_{4-a} \quad (I)$$

wherein $R^1$ is $C_6H_5\text{—}$, $(CH_3)_2CHCH_2\text{—}$ or $n\text{-}C_bH_{2b+1}\text{—}$ (wherein b is an integer of 1 to 18); X is $CH_3O\text{—}$ or $C_2H_5O\text{—}$; and a is an integer of 0 to 3.

The alkoxysilane compounds may be dried or heat-treated, for example, at a temperature of usually 40 to 150° C., preferably 60 to 120° C. for usually 10 minutes to 12 hours, preferably 30 minutes to 3 hours.

Specific examples of the alkoxysilane compounds may include methyltriethoxysilane, dimethyldiethoxysilane, phenyltriethyoxysilane, diphenyldiethoxysilane, methyltrimethoxysilane, dimethyldimethoxysilane, phenyltrimethoxysilane, diphenyldimethoxysilane, isobutyltrimethoxysilane, decyltrimethoxysilane or the like. Among these alkoxysilane compounds, in view of the desorption percentage and the adhering effect of the organic pigments, methyl triethoxysilane, phenyltriethyoxysilane, methyltrimethoxysilane, dimethyldimethoxysilane and isobutyltrimethoxysilane are preferred, and methyltriethoxysilane, methyltrimethoxysilane and phenyltriethyoxysilane are more preferred.

As the polysiloxanes (2), there may be used those compounds represented by the formula (II):

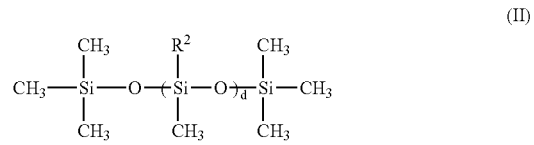

wherein $R^2$ is $H\text{—}$ or $CH_3\text{—}$, and d is an integer of 15 to 450.

Among these polysiloxanes, in view of the desorption percentage and the adhering effect of the organic pigment, polysiloxanes having methyl hydrogen siloxane units are preferred.

As the modified polysiloxanes (2-A), there may be used:

(a1) polysiloxanes modified with polyethers represented by the formula (III):

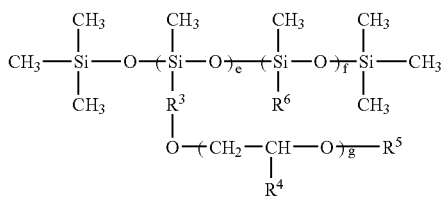
(III)

wherein $R^3$ is $—(—CH_2—)_h—$; $R^4$ is $—(—CH_2—)_i—CH_3$; $R^5$ is $—OH$, $—COOH$, $—CH=CH_2$, $—CH(CH_3)=CH_2$ or $—(—CH_2—)_j—CH_3$; $R^6$ is $—(—CH_2—)_k—CH_3$; g and h are an integer of 1 to 15; i, j and k are an integer of 0 to 15; e is an integer of 1 to 50; and f is an integer of 1 to 300;

(a2) polysiloxanes modified with polyesters represented by the formula (IV):

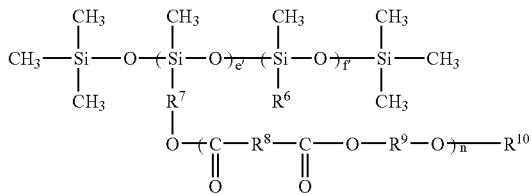
(IV)

wherein $R^7$, $R^8$ and $R^9$ are $—(—CH_2—)_q—$ and may be the same or different; $R^{10}$ is $—OH$, $—COOH$, $—CH=CH_2$, $—CH(CH_3)=CH_2$ or $—(—CH_2—)_r—CH_3$; $R^{11}$ is $—(—CH_2—)_s—CH_3$; n and q are an integer of 1 to 15; r and s are an integer of 0 to 15; e' is an integer of 1 to 50; and f' is an integer of 1 to 300;

(a3) polysiloxanes modified with epoxy compounds represented by the formula (V):

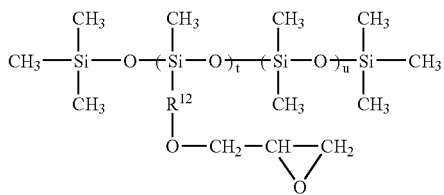
(V)

wherein $R^{12}$ is $—(—CH_2—)_v—$; v is an integer of 1 to 15; t is an integer of 1 to 50; and u is an integer of 1 to 300; or a mixture thereof.

Among these modified polysiloxanes (2-A), in view of the desorption percentage and the adhering effect of the organic pigment, the polysiloxanes modified with the polyethers represented by the formula (III), are preferred.

As the terminal-modified polysiloxanes (2-B), there may be used those represented by the formula (VI):

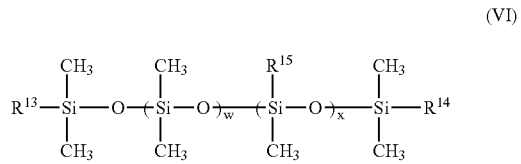
(VI)

wherein $R^{13}$ and $R^{14}$ are $—OH$, $R^{16}OH$ or $R^{17}COOH$ and may be the same or different; $R^{15}$ is $—CH_3$ or $—C_6H_5$; $R^{16}$ and $R^{17}$ are $—(—CH_2—)_y—$; wherein y is an integer of 1 to 15; w is an integer of 1 to 200; and x is an integer of 0 to 100.

Among these terminal-modified polysiloxanes, in view of the desorption percentage and the adhering effect of the organic pigment, the polysiloxanes whose terminals are modified with carboxylic acid groups are preferred.

The fluoroalkyl organosilane compounds (3) may be produced from fluoroalkylsilane compounds represented by the formula (VII):

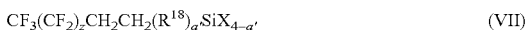
$$CF_3(CF_2)_zCH_2CH_2(R^{18})_{a'}SiX_{4-a'} \quad \text{(VII)}$$

wherein $R^{18}$ is $CH_3—$, $C_2H_5—$, $CH_3O—$ or $C_2H_5O—$; X is $CH_3O—$ or $C_2H_5O—$; and z is an integer of 0 to 15; and a' is an integer of 0 to 3.

The fluoroalkylsilane compounds may be dried or heat-treated, for example, at a temperature of usually 40 to 150° C., preferably 60 to 120° C. for usually 10 minutes to 12 hours, preferably 30 minutes to 3 hours.

Specific examples of the fluoroalkylsilane compounds may include trifluoropropyl trimethoxysilane, tridecafluorooctyl trimethoxysilane, heptadecafluorodecyl trimethoxysilane, heptadecafluorodecylmethyl dimethoxysilane, trifluoropropyl triethoxysilane, tridecafluorooctyl triethoxysilane, heptadecafluorodecyl triethoxysilane, heptadecafluorodecylmethyl diethoxysilane or the like. Among these fluoroalkylsilane compounds, in view of the desorption percentage and the adhering effect of the organic pigment, trifluoropropyl trimethoxysilane, tridecafluorooctyl trimethoxysilane and heptadecafluorodecyl trimethoxysilane are preferred, and trifluoropropyl trimethoxysilane and tridecafluorooctyl trimethoxysilane are more preferred.

As the silane-based coupling agents, there may be exemplified vinyltrimethoxysilane, vinyltriethoxysilane, γ-aminopropyltriethoxysilane, γ-glycidoxypropyltrimethoxysilane, γ-mercaptopropyltrimethoxysilane, γ-methacryloxypropyltrimethoxysilane, N-β(aminoethyl)-γ-aminopropyltrimethoxysilane, γ-glycidoxypropylmethyldimethoxysilane, γ-chloropropyltrimethoxysilane or the like.

As the titanate-based coupling agents, there may be exemplified isopropyltristearoyl titanate, isopropyltris(dioctylpyrophosphate)titanate, isopropyltri(N-aminoethyl-aminoethyl)titanate, tetraoctylbis(ditridecylphosphate)titanate, tetra(2,2-diaryloxymethyl-1-butyl)bis(ditridecyl)phosphate titanate, bis(dioctylpyrophosphate)oxyacetate titanate, bis(dioctylpyrophosphate)ethylene titanate or the like.

As the aluminate-based coupling agents, there may be exemplified acetoalkoxyaluminum diisopropilate, aluminumdiisopropoxymonoethylacetoacetate, aluminumtrisethylacetoacetate, aluminumtrisacetylacetonate or the like.

As the zirconate-based coupling agents, there may be exemplified zirconiumtetrakisacetylacetonate, zirconiumdibutoxybisacetylacetonate, zirconiumtetrakisethylacetoacetate, zirconiumtributoxymonoethylacetoacetate, zirconiumtributoxyacetylacetonate or the like.

It is preferred to use oligomer compounds having a molecular weight of from 300 to less than 10,000. It is preferred to use polymer compounds having a molecular weight of about 10,000 to about 100,000. In the consideration of forming a uniform coating layer on the white inorganic particles, the oligomers or polymer compounds are preferably in a liquid state, or soluble in water or various solvents.

The amount of the gluing agent coating layer is preferably 0.01 to 15.0% by weight, more preferably 0.02 to 12.5% by weight, still more preferably 0.03 to 10.0% by weight (calculated as C) based on the weight of the gluing agent-coated white inorganic particles, in the case where the coupling agent except for the silane-based coupling agents, oligomers or polymer compounds are used as the gluing agent.

When the amount of the gluing agent-coating layer is less than 0.01% by weight, it may be difficult to adhere not less than one part by weight of the organic pigment onto 100 parts by weight of the white inorganic particles. When the amount of the gluing agent coating layer is more than 15.0% by weight, since it is possible to adhere 1 to 500 parts by weight of the organic pigment onto 100 parts by weight of the white inorganic particles therethrough, it is unnecessary to form the gluing agent coating layer in an amount of more than 15.0% by weight.

In the case where the organosilicon compounds or silane-based coupling agents are used as the gluing agent, the amount of the coating organosilicon compounds or silane-based coupling agents is preferably 0.02 to 5.0% by weight, more preferably 0.03 to 4.0% by weight, still more preferably 0.05 to 3.0% by weight (calculated as Si) based on the weight of the white inorganic particles coated with the organosilicon compounds or silane-based coupling agents.

When the amount of the coating organosilicon compounds is less than 0.02% by weight, it may become difficult to adhere not less than one part by weight of the organic pigment onto 100 parts by weight of the white inorganic particles. When the amount of the coating organosilicon compounds is more than 5.0% by weight, since it is possible to adhere 1 to 500 parts by weight of the organic pigment onto 100 parts by weight of the white inorganic particles, it is unnecessary to form a coating layer of the organosilicon compounds in an amount of more than 5.0% by weight.

As the organic pigment used in the present invention, there may be exemplified various organic pigments ordinarily used as colorants of paints, inks and resin compositions, such as organic red-based pigments, organic blue-based pigments, organic yellow-based pigments and organic green-based pigments.

Examples of the organic red-based pigments may include quinacridon pigments such as quinacridon red, azo-based pigments such as permanent red, condensed azo pigments such as condensed azo red, perylene pigment such as perylene red or the like.

Examples of the organic blue-based pigments may include phthalocyanine-based pigments such as metal-free phthalocyanine blue, phthalocyanine blue and fast sky blue.

Examples of the organic yellow-based pigments may include monoazo-based pigments such as Hanza yellow, disazo-based pigments such as benzidine yellow and permanent yellow, condensed azo pigments such as condensed azo yellow, or the like.

Examples of the organic green-based pigments may include phthalocyanine-based pigments such as phthalocyanine green.

Meanwhile, these organic pigments may be used in the form of a mixture of any two or more thereof depending upon the hue required.

In the composite particles of the present invention, a plurality of organic pigment coats composed of the above organic pigments may be formed on the surface of the white inorganic particle as core particles through the gluing agent. For example, after forming the gluing agent coating layer on the surface of the core particle, an organic pigment coat (hereinafter referred to merely as "first colored adhesion layer") is formed by adhering the organic pigment onto the gluing agent coating layer. Then, after further forming a gluing agent coating layer on the first colored adhesion layer, an organic pigment coat (hereinafter referred to merely "second colored adhesion layer") is formed by adhering the organic pigment onto the gluing agent coating layer. The same procedure as described above may be repeated to form three or more colored adhesion layers on the surface of the white inorganic particles, if required.

Meanwhile, the organic pigments contained in the first and second colored adhesion layers may be the same or different in kinds or colors. In this case, when organic pigments having different specific functions such as light resistance are used in combination, it is possible to obtain composite particles having a plurality of functions.

The amount of the organic pigment adhered is usually 1 to 500 parts by weight, preferably 1 to 400 parts by weight, more preferably 1 to 300 parts by weight, still more preferably 1 to 200 parts by weight, further still more preferably 1 to 100 parts by weight, furthermore still more preferably 1 to 75 parts by weight, most preferably 1 to 50 parts by weight based on 100 parts by weight of the white inorganic particles.

When the amount of the organic pigment adhered is less than one part by weight, the amount of the organic pigment coated on the white inorganic particles is too small, so that it may become difficult to obtain the aimed composite particles of the present invention. When the amount of the organic pigment adhered is more than 500 parts by weight, the organic pigment may tend to be desorbed from the white inorganic particles because of too large amount of the organic pigment adhered. As a result, the obtained composite particles may be deteriorated in dispersion stability.

In the case where a plurality of colored adhesion layers are formed on the surface of the white inorganic particle, the amount of the organic pigment adhered for each colored adhesion layer may be appropriately determined according to aimed hue and properties such that the total amount of the organic pigments adhered for whole colored adhesion layers does not exceed the above-mentioned upper limit thereof.

The shape and size of the composite particles according to the present invention may vary depending upon those of the white inorganic particles as core particles. The composite particles usually have a configuration or shape similar to that of the core particles.

Specifically, the lower limit of average particle size of the composite particles according to the present invention is usually 0.001 µm, preferably 0.003 µm, more preferably 0.005 µm, still more preferably 0.01 µm. The upper limit of average particle size of the composite particles according to the present invention is usually 10.0 µm, preferably 9.5 µm, more preferably 9.0 µm.

When the average particle size of the composite particles is more than 10.0 µm, the composite particles may be deteriorated in tinting strength because of too large particle size thereof. When the average particle size of the composite particles is less than 0.001 µm, the composite particles may tend to be agglomerated together due to such fine particles, so that it may become difficult to disperse the composite particles in paint vehicles or resin compositions.

The lower limit of BET specific surface area value of the composite particles according to the present invention is usually 1.0 m$^2$/g, preferably 1.5 m$^2$/g, more preferably 2.0 m$^2$/g. The upper limit of BET specific surface area value of the composite particles according to the present invention is preferably 500 m$^2$/g, more preferably 400 m$^2$/g, still more preferably 300 m$^2$/g. In some specific applications, the BET specific surface area value of the composite particles is preferably not more than 100 m$^2$/g, more preferably not more than 95 m$^2$/g, still more preferably not more than 90 m$^2$/g.

When the BET specific surface area value of the composite particles is less than 1.0 m$^2$/g, the obtained composite particles may become coarse, or sintering may be caused within or between the particles, resulting in deteriorated tinting strength. When the BET specific surface area value of the composite particles is more than 500 m$^2$/g, the obtained particles may tend to be agglomerated together due to such fine particles, resulting in deteriorated dispersibility in paint or ink vehicles, or resin compositions.

The desorption percentage of the organic pigment from the composite particles is preferably not more than 10%, more preferably not more than 9%.

Also, in the case where the specific gravity of the organic pigment is close to that of the composite particles, the degree of desorption of the organic pigment from the composite particles is preferably the rank 5 or 4, more preferably the rank 5 when visually observed and evaluated by the below-mentioned method. When the desorption percentage of the organic pigment from the composite particles is more than 10% or when the degree of desorption of the organic pigment from the composite particles is the rank 1, 2 or 3, uniform dispersion of the composite particles in paint vehicles or resin compositions may tend to be inhibited by the desorbed organic pigment. In addition, the hue of the white inorganic particles themselves is exposed outside at portions from which the organic pigment is desorbed, so that it may become difficult to obtain composite particles having a uniform hue.

The tinting strength of the composite particles according to the present invention is preferably not less than 110%, more preferably not less than 115%, still more preferably not less than 120% when measured by the below-mentioned evaluation method.

In the case where white pigments are used as the white inorganic particles, the hiding power of the obtained composite particles according to the present invention is preferably not less than 700 cm$^2$/g, more preferably not less than 750 cm$^2$/g when measured by the below-mentioned evaluation method. In the case where transparent titanium dioxide, extender pigments or pearl pigments are used as the white inorganic particles, the hiding power of the obtained composite particles is preferably less than 700 cm$^2$/g, more preferably not more than 650 cm$^2$/g, still more preferably not more than 600 cm$^2$/g, further still more preferably not more than 560 cm$^2$/g.

As to the light resistance of the composite particles according to the present invention, the ΔE* value thereof is usually not more than 5.0, preferably not more than 4.0 when measured by the below-mentioned evaluation method. In particular, when particles having an ultraviolet light-preventing effect, such as titanium oxide and zinc oxide are used as the core particles, the ΔE* value of the composite particles is preferably not more than 3.0, more preferably not more than 2.0.

In the composite particles according to the present invention, if required, the surface of the white inorganic particle may be previously coated with at least one compound selected from the group consisting of hydroxides of aluminum, oxides of aluminum, hydroxides of silicon and oxides of silicon (hereinafter referred to as "hydroxides and/or oxides of aluminum and/or silicon coat"). The composite particles using the white inorganic particles having the hydroxides and/or oxides of aluminum and/or silicon coat, can be more effectively prevented from undergoing desorption of organic pigment from the surface of the white inorganic particle, and can exhibit a higher light resistance, as compared to composite particles using the white inorganic particles having no hydroxides and/or oxides of aluminum and/or silicon.

The amount of the hydroxides and/or oxides of aluminum and/or silicon coat is 0.01 to 20% by weight (calculated as Al, SiO$_2$ or sum of Al and SiO$_2$) based on the weight of the white inorganic particles coated with the hydroxides and/or oxides of aluminum and/or silicon coat.

When the amount of the hydroxides and/or oxides of aluminum and/or silicon coat is less than 0.01% by weight, it may be difficult to attain the improved effect of reducing the desorption percentage of organic pigment or the improved effect of enhancing the light resistance. As long as the amount of the hydroxides and/or oxides of aluminum and/or silicon coat is in the range of 0.01 to 20% by weight, the improved effect of reducing the desorption percentage of organic pigment or the improved effect of enhancing the light resistance can be sufficiently attained. Therefore, it is unnecessary to form the hydroxides and/or oxides of aluminum and/or silicon coat in an amount of more than 20% by weight.

The composite particles having a hydroxides and/or oxides of aluminum and/or silicon coat according to the present invention are substantially the same in particle size, BET specific surface area value, hue (L* value, a* value and b* value), tinting strength and hiding power as those of the composite particles having no hydroxides and/or oxides of aluminum and/or silicon coat according to the present invention. The desorption percentage of the organic pigment from the composite particles can be improved by forming an intermediate coat (the hydroxides and/or oxides of aluminum and/or silicon coat), on the white inorganic particles. Specifically, by forming such the intermediate coat on the white inorganic particles, the properties of the composite particles can be improved such that the desorption percentage of the organic pigment therefrom is preferably not more than 8%, more preferably not more than 6%, and as to the light resistance, the ΔE* value thereof is usually not more than 4.0, preferably 3.0.

The pigment according to the present invention comprises the above composite particles.

Next, the paint containing the pigment according to the present invention will be described.

The solvent-based paint containing the pigment according to the present invention has such a storage stability that the ΔE* value thereof is usually not more than 1.5, preferably not more than 1.2. When the paint is formed into a coating film, the gloss of the coating film is usually 75 to 110%, preferably 80 to 110%. As to the light resistance of the coating film, the $\Delta E^*$ value thereof is usually not more than 5.0, preferably not more than 4.0. Meanwhile, in the case where transparent titanium dioxide, the extender pigment or pearl pigment is used as the white inorganic particles, the coating film has such a transparency that the linear absorption thereof is usually not more than $0.10\ \mu m^{-1}$, preferably not more than $0.09\ \mu m^{-1}$.

The solvent-based paint blended with the pigment using the white inorganic particles coated with the hydroxides and/or oxides of aluminum and/or silicon, has such a storage stability that the $\Delta E^*$ value thereof is usually not more than 1.5, preferably not more than 1.2. When the paint is formed into a coating film, the gloss of the coating film is usually 80 to 115%, preferably 85 to 115%. The coating film has such a light resistance that the $\Delta E^*$ value thereof is usually not more than 4.0, preferably not more than 3.0. When transparent titanium dioxide, the extender pigment or pearl pigment is used as the white inorganic particles, the coating film has such a transparency that the linear absorption thereof is usually not more than $0.10\ \mu m^{-1}$, preferably not more than $0.09\ \mu m^{-1}$.

The water-based paint containing the pigment according to the present invention has such a storage stability that the $\Delta E^*$ value thereof is usually not more than 1.5, preferably not more than 1.2. When the water-based paint is formed into a coating film, the gloss of the coating film is usually 70 to 110%, preferably 75 to 110%. The coating film has such a light resistance that the $\Delta E^*$ value thereof is usually not more than 5.0, preferably not more than 4.0. Meanwhile, when transparent titanium dioxide, the extender pigment or pearl pigment is used as the white inorganic particles, the coating film produced from the water-based paint has such a transparency that the linear absorption thereof is usually not more than $0.11\ \mu m^{-1}$, preferably not more than $0.10\ \mu m^{-1}$.

The water-based paint blended with the pigment using the white inorganic particles coated with the hydroxides and/or oxides of aluminum and/or silicon, has such a storage stability that the $\Delta E^*$ value thereof is usually not more than 1.5, preferably not more than 1.2. When such a water-based paint is formed into a coating film, the gloss of the coating film is usually 75 to 115%, preferably 80 to 115%. The coating film has such a light resistance that the $\Delta E^*$ value thereof is usually not more than 4.0, preferably not more than 3.0. When transparent titanium dioxide, the extender pigment or pearl pigment is used as the white inorganic particles, the coating film produced from the water-based paint has such a transparency that the linear absorption thereof is usually not more than $0.11\ \mu m^{-1}$, preferably not more than $0.09\ \mu m^{-1}$.

The amount of the pigment blended in the paint according to the present invention is in the range of usually 0.5 to 100 parts by weight based on 100 parts by weight of a paint base material. In the consideration of handling of the paint, the amount of the pigment blended in the paint is preferably 1.0 to 100 parts by weight based on 100 parts by weight of the paint base material.

The paint base material comprises a resin and a solvent, and may further contain, if required, a defoamer, an extender pigment, a drying agent, a surfactant, a hardening accelerator, an assistant or the like.

Examples of the resins used in the paint base material for solvent-based paints may include those ordinarily used for solvent-based paints or oil-based printing inks such as acrylic resins, alkyd resins, polyester resins, polyurethane resins, epoxy resins, phenol resins, melamine resins, amino resins, vinyl chloride resins, silicone resins, rosin-based resins such as gum rosin and lime rosin, maleic acid resins, polyamide resins, nitrocellulose, ethylene-vinyl acetate copolymer resins, rosin-modified resins such as rosin-modified phenol resins and rosin-modified maleic acid resins, petroleum resins or the like. Examples of the resins used in the paint base material for water-based paints may include those ordinarily used for water-based paints or aqueous inks such as water-soluble acrylic resins, water-soluble styrene-maleic acid copolymer resins, water-soluble alkyd resins, water-soluble melamine resins, water-soluble urethane emulsion resins, water-soluble epoxy resins, water-soluble polyester resins or the like.

As the solvent for solvent-based paints, there may be exemplified those solvents ordinarily used for solvent-based paints or oil-based printing inks such as soybean oil, toluene, xylene, thinner, butyl acetate, methyl acetate, methyl isobutyl ketone, glycol ether-based solvents such as methyl cellosolve, ethyl cellosolve, propyl cellosolve, butyl cellosolve and propylene glycol monomethyl ether, ester-based solvents such as ethyl acetate, butyl acetate and amyl acetate, aliphatic hydrocarbon-based solvents such as hexane, heptane and octane, alicyclic hydrocarbon-based solvents such as cyclohexane, petroleum-based solvents such as mineral spirits, ketone-based solvents such as acetone and methyl ethyl ketone, alcohol-based solvents such as methyl alcohol, ethyl alcohol, propyl alcohol and butyl alcohol, aliphatic hydrocarbons or the like.

As the solvents for water-based paints, there may be used a mixture of water and a water-soluble organic solvent ordinarily used for water-based paints or aqueous inks such as alcohol-based solvents such as ethyl alcohol, propyl alcohol and butyl alcohol, glycol ether-based solvents such as methyl cellosolve, ethyl cellosolve, propyl cellosolve and butyl cellosolve, oxyethylene or oxypropylene addition polymers such as diethylene glycol, triethylene glycol, polyethylene glycol, dipropylene glycol, tripropylene glycol and polypropylene glycol, alkylene glycols such as ethylene glycol, propylene glycol and 1,2,6-hexanetriol, glycerin, 2-prolidone or the like As the fats and oils, there may be used boiled oils obtained by processing drying oils such as linseed oil, tung oil, oiticica oil and safflower oil.

As the defoamer, there may be used commercially available products such as "NOPCO 8034 (tradename)", "SN DEFOAMER 477 (tradename)", "SN DEFOAMER 5013 (tradename)", "SN DEFOAMER 247 (tradename)" and "SN DEFOAMER 382 (tradename)" (all produced by SUN NOPCO CO., LTD.), "ANTI-FOAM 08 (tradename)" and "EMARGEN 903 (tradename)" (both produced by KAO CO., LTD.), or the like.

Next, the resin composition tinted with the pigment according to the present invention is described.

The resin composition tinted with the pigment according to the present invention exhibits a dispersing condition of usually the rank 4 or 5, preferably the rank 5 when visually observed and evaluated by the below-mentioned method, and a light resistance ($\Delta E^*$ value) of usually not more than 5.0, preferably not more than 4.0. When transparent titanium dioxide, the extender pigments or pearl pigment are used as the white inorganic particles, the transparency of the resin composition is such that the linear absorption thereof is usually not more than $0.10\ \mu m^{-1}$, preferably not more than $0.09\ \mu m^{-1}$.

When the resin composition is tinted with the pigment produced from the white inorganic particles coated with the hydroxides and/or oxides of aluminum and/or silicon, the dispersing condition thereof is usually the rank 4 or 5, preferably the rank 5 when visually observed and evaluated by the below-mentioned method, and the light resistance ($\Delta E^*$ value) thereof is usually not more than 4.0, preferably not more than 3.0. Meanwhile, when transparent titanium dioxide, the extender pigment or pearl pigment are used as the white inorganic particles, the transparency of the resin composition is such that the linear absorption thereof is usually not more than 0.10 $\mu m^{-1}$, preferably not more than 0.09 $\mu m^{-1}$.

The amount of the pigment blended in the resin composition according to the present invention is usually in the range of 0.01 to 200 parts by weight based on 100 parts by weight of resins contained in the composition. In the consideration of handling of the resin composition, the amount of the pigment blended therein is preferably 0.05 to 150 parts by weight, more preferably 0.1 to 100 parts by weight based on 100 parts by weight of the resins.

The base material of the resin composition according to the present invention comprises the pigment and known thermoplastic resins, and may further contain, if required, additives such as lubricants, plasticizers, antioxidants, ultraviolet light absorbers, various stabilizers or the like.

As the reins, there may be used polyolefins such as polyethylene, polypropylene, polybutene and polyisobutylene; thermoplastic resins such as polyvinyl chloride, polystyrene, styrene-acrylic ester copolymers, chlorinated resins, styrene-vinyl acetate copolymers and polyamides; rosin-modified maleic acid resins; phenol resins; epoxy resins; polyester resins; ionomer resins; polyurethane resins; silicone resins; rosin-esters; rosins; natural rubbers, synthetic rubbers; or the like.

The additives may be added in an amount of usually not more than 50% by weight based on the total amount of the pigment and the resin. When the amount of the additives added is more than 50% by weight, the obtained resin composition may be deteriorated in moldability.

The resin composition of the present invention is produced by previously intimately mixing the raw resin material with the pigment, and then kneading the resultant mixture using a kneader or an extruder under heating while applying a strong shear force thereto in order to deaggregate the agglomerated pigment and uniformly disperse the pigment in the resin. Then, the obtained resin composition is molded into an aimed shape upon use.

Next, the pigment dispersion for the production of paints and printing inks according to the present invention is described.

The pigment dispersion of the present invention contains a pigment paste and a mill base as an intermediate dispersion for paints and printing inks. Specifically, the pigment dispersion contains the pigment of the present invention in an amount of usually 5 to 1,000 parts by weight, preferably 10 to 800 parts by weight based on 100 parts by weight of the pigment dispersion base material.

The pigment dispersion base material contains a resin, a solvent and/or fats and oils, and may further contain, if required, defoamers, extender pigments, drying agents, surfactants, hardening accelerators, assistants or the like according to applications thereof.

As the resins for the pigment dispersion of the present invention, there may be used the same resins as those for the above-described paints.

As the solvents for the pigment dispersion of the present invention, there may be used the same solvents as those for the above-described paints.

As the fats and oils for the pigment dispersion of the present invention, there may be used the same fats and oils as those for the above-described paints.

The composition of the resin used in the pigment dispersion may be the same as or different from that of the diluting resin used for the production of paints. In the case where the resin used in the pigment dispersion is different from the diluting resin, the kinds of resins used may be determined in view of properties thereof so as to attain a good compatibility therebetween.

The pigment dispersion of the present invention can be produced by kneading and dispersing the pigment, the solvent and/or the fats and oils together using a dispersing device such as butterfly mixer, planetary mixer, pony mixer, dissolver, tank mixer, high-speed mixer, homomixer, kneader, roll mill, sand mill, attritor and ball mill.

The paint obtained by using the pigment dispersion of the present invention can exhibit a more excellent dispersibility.

Next, the master batch pellets used for the production of the paint and the resin composition of the present invention are described.

The master batch pellets of the present invention are produced (i) by mixing a binder resin as a base material for the paint or the resin composition with the pigment, if necessary, using a mixing device such as ribbon blender, Nauter mixer, Henschel mixer and Super mixer, kneading and molding the resultant mixture using a known single-screw kneading extruder or twin-screw kneading extruder, and then cutting the molded product into pellets; or (ii) by mixing a binder resin as a base material for the paint or the resin composition with the pigment, if necessary, using a mixing device such as ribbon blender, Nauter mixer, Henschel mixer and Super mixer, kneading the above mixture using Banbury mixer, press kneader or the like, and then pulverizing, molding or cutting the kneaded material into pellets.

The binder resin and the pigment may be respectively supplied in separate batches into the kneader at predetermined constant ratios, or may be simultaneously supplied thereto in the form of a mixture of both the components.

The master batch pellets of the present invention have an average major diameter of usually 1 to 6 mm, preferably 2 to 5 mm, and an average minor diameter of usually 2 to 5 mm, preferably 2.5 to 4 mm. When the average major diameter of the master batch pellets is less than 1 mm, the workability upon production of the pellets may be deteriorated. When the average major diameter of the master batch pellets is more than 6 mm, the master batch pellets are considerably different in size from that of diluting binder resin particles, so that it may be difficult to sufficiently disperse the pellets in the diluting binder resin. The master batch pellets may have any suitable shape such as an amorphous shape, a granular shape such as spherical shape, a cylindrical shape, a flake-like shape or the like.

As the binder resin for the master batch pellets of the present invention, there may be used resins of the same type as the above binder resin for the paint or the resin composition.

Meanwhile, the composition of the binder resin contained in the master batch pellets is preferably the same as that of the diluting binder resin. Also, the binder resin may be different from the diluting binder resin. In such a case, it is required that kinds of resins used are determined in view of various properties thereof so as to attain a good compatibility therebetween.

The amount of the pigment blended in the master batch pellets is usually 1 to 100 parts by weight, preferably 1 to 90 parts by weight, more preferably 1 to 80 parts by weight, still more preferably 5 to 25 parts by weight based on 100 parts by weight of the binder resin. When the amount of the pigment blended is less than 1 part by weight, the obtained master batch pellets may be insufficient in melt viscosity upon kneading, so that it may become difficult to sufficiently mix and disperse the pigment in the resin. When the amount of the pigment blended is more than 100 parts by weight, the amount of the binder resin may become comparatively small, so that it may also become difficult to sufficiently mix and disperse the pigment in the resin. In addition, since even a slight change in amount of the master batch pellets added causes a considerable change in content of the pigment in the resin composition, it may be difficult to control the content of the pigment in the resin composition to the aimed level. Further, mechanical abrasion of products produced from such master batch pellets becomes remarkable.

Next, the process for producing the composite particles according to the present invention is described.

The composite particles of the present invention can be produced by first mixing the white inorganic particles with the gluing agent to coat the surface of the white inorganic particle with the gluing agent, and then mixing the thus-obtained gluing agent-coated white inorganic particles with the organic pigment.

The formation of the gluing agent coating layer on the surface of the white inorganic particle or each colored adhesion layer may be conducted by mechanically mixing and stirring the particles with a gluing agent solution or the gluing agent, or by mechanically mixing and stirring the particles while spraying the gluing agent solution or the gluing agent thereonto. Substantially whole amount of the gluing agent added is adhered on the surface of the particles.

Meanwhile, in the case where alkoxysilanes or fluoroalkylsilanes are used as the gluing agent, a part of the alkoxysilanes or fluoroalkylsilanes may be coated in the form of organosilane compounds produced from the alkoxysilanes or fluoroalkyl organosilane compounds obtainable form fluoroalkylsilanes through the coating step. Even in such a case, subsequent adhesion of the organic pigment on the gluing agent-coating layer is not adversely affected.

In order to uniformly adhere the gluing agent over the surface of the white inorganic particles, it is preferred that the agglomerated white inorganic particles are previously deaggregated using a crusher.

The mixing and stirring of the white inorganic particles with the gluing agent, the mixing and stirring of the organic pigment with the gluing agent-coated white inorganic particles, the mixing and stirring of the gluing agent with the white inorganic particles coated with the organic pigment coat through the gluing agent, and the mixing and stirring of the organic pigment and the white inorganic particles having the colored adhesion layer and the gluing agent coating layer formed thereon, is preferably carried out using an apparatus capable of applying a shear force to the powder mixture, especially such an apparatus capable of simultaneously effecting shear action, spatula stroking and compression. Examples of such apparatuses may include wheel-type kneaders, ball-type kneaders, blade-type kneaders, roll-type kneaders or the like. Among these apparatuses, the wheel-type kneaders are preferred to effectively practice the present invention.

Specific examples of the wheel-type kneaders may include edge runners (similar in meaning to mix muller, Simpson mill and sand mill), multimill, Stotz mill, Wet pan mill, corner mill, ring muller or the like. Among these kneaders, preferred are edge runners, multimill, Stotz mill, Wet pan mill and ring muller, and more preferred are edge runners. Specific examples of the ball-type kneaders may include vibration mill or the like. Specific examples of the blade-type kneaders may include Henschel mixer, planetary mixer, Nauter mixer or the like. Specific examples of the roll-type kneaders may include extruders or the like.

The conditions of the mixing and stirring treatment may be selected so as to uniformly coat the surface of the particle with the gluing agent. Specifically, the mixing and stirring conditions may be appropriately controlled such that the linear load is usually 19.6 to 1,960 N/cm (2 to 200 kg/cm), preferably 98 to 1,470 N/cm (10 to 150 kg/cm), more preferably 147 to 980 N/cm (15 to 100 kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The amount of the gluing agent added is preferably 0.15 to 45 parts by weight based on 100 parts by weight of the white inorganic particles. When the gluing agent is added in an amount of 0.15 to 45 parts by weight, it is possible to adhere 1 to 500 parts by weight of the organic pigment onto 100 parts by weight of the white inorganic particles.

After the surface of the white inorganic particle is coated with the gluing agent, the organic pigment is added, and then mixed and stirred with the coated white inorganic particles to adhere the organic pigment onto the gluing agent coating layer. The obtained particles may be further subjected to drying or heating treatments, if required.

By varying an adding method of the organic pigments, mixing and stirring conditions, and an adhering configuration of the organic pigment coat, it is possible to adhere 1 to 500 parts by weight of the organic pigment onto the gluing agent coating layer.

As the adding method, a lump addition method, a continuous addition method, a divided addition method may be exemplified. When a large amount of the organic pigment is added, it is preferred to conduct the continuous addition method and the divided addition method.

As the adhering configuration of the organic pigment coat, a single organic pigment coat and a plurality of the organic pigment coats (organic pigment multilayered coat) may be exemplified. In case of a plurality of the organic pigment coats, the desorption percentage of the organic pigments is good as compared with that of the single organic pigment coat.

In case of continuously adding the organic pigments, the organic pigment may be added slowly and little by little, especially for a period of 5 minutes to 24 hours, preferably 5 minutes to 20 hours.

In case of dividedly adding the organic pigments, the adding step of the organic pigments of 5 to 20 parts by weight based on 100 parts by weight of the white inorganic particles, and mixing and stirring step under the following conditions can be repeated until the added amount of the organic pigments reaches a predetermined amount thereof.

The mixing and stirring conditions may be appropriately selected so as to form a uniform organic pigment coat on the gluing agent coating layer, and may be controlled such that the linear load is usually 19.6 to 1,960 N/cm (2 to 200 kg/cm), preferably 98 to 1,470 N/cm (10 to 150 kg/cm), more preferably 147 to 980 N/cm (15 to 100 kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

When a large amount of the organic pigment is added, it is preferred to lengthen the mixing and stirring time.

The amount of the organic pigment added is usually 1 to 500 parts by weight based on 100 parts by weight of the white inorganic particles. When the amount of the organic pigment added is out of the above-specified range, the aimed coloring material cannot be obtained.

The heating temperature used in the drying and heating treatments is preferably 40 to 150° C., more preferably 60 to 120° C., and the heating time is preferably 10 minutes to 12 hours, more preferably 30 minutes to 3 hours.

Meanwhile, in the case where alkoxysilanes are used as the gluing agent, the alkoxysilanes are finally coated in the form of organosilane compounds produced from the alkoxysilanes through these steps.

Alternatively, the composite particles having at least two colored adhesion layers each composed organic pigment coats through the gluing agent, can be produced by mixing the white inorganic particles with the gluing agent to coat the surface of the white inorganic particle with the gluing agent; mixing the organic pigment with the gluing agent-coated white inorganic particles to adhere the organic pigment onto the gluing agent coating layer, thereby forming a first colored adhesion layer; mixing the thus obtained primary composite particles having the first colored adhesion layer with the gluing agent; and then further mixing the obtained gluing agent-coated primary composite particles with the organic pigment to form an organic pigment coat onto the second gluing agent coating layer formed on the primary composite particles. Meanwhile, by repeating the coating with the gluing agent and the adhesion of the organic pigment according to requirements, it is possible to obtain such composite particles having three or more colored adhesion layers thereon.

The formation of the gluing agent coating layer on the surface of the white inorganic particle or each colored adhesion layer may be conducted by mechanically mixing and stirring the particles with the gluing agent, or by mechanically mixing and stirring the particles while spraying the gluing agent thereonto. At this time, substantially whole amount of the gluing agent added is adhered on the surface of the particle.

Meanwhile, in the case where alkoxysilanes are used as the gluing agent, a part of the alkoxysilanes adhered may be coated in the form of organosilane compounds produced from the alkoxysilanes through the coating step. Even in such a case, the subsequent adhesion of the organic pigment onto the gluing agent-coating layer is not adversely affected.

The mixing and stirring of the white inorganic particles with the gluing agent, the mixing and stirring of the organic pigment with the gluing agent-coated white inorganic particles, the mixing and stirring of the gluing agent with the primary composite particles having the first colored adhesion layer thereon, and the mixing and stirring of the organic pigment with the primary composite particles having the first colored adhesion layer and the gluing agent coating layer formed thereon, is preferably carried out using an apparatus capable of applying a shear force to the powder mixture, especially such an apparatus capable of simultaneously effecting shear action, spatula stroking and compression. Examples of such apparatuses may include wheel-type kneaders, ball-type kneaders, blade-type kneaders or roll-type kneaders. Among these apparatuses, the wheel-type kneaders are preferred to effectively practice the present invention.

The conditions for mixing and stirring the white inorganic particles with the gluing agent may be appropriately selected so as to form a uniform gluing agent coating layer on the surface of the white inorganic particle. Specifically, the mixing and stirring conditions may be controlled such that the linear load is usually 19.6 to 1,960 N/cm (2 to 200 Kg/cm), preferably 98 to 1,470 N/cm (10 to 150 Kg/cm), more preferably 147 to 980 N/cm (15 to 100 Kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The amount of the gluing agent added is preferably 0.15 to 45 parts by weight based on 100 parts by weight of the white inorganic particles. When the gluing agent is added in an amount of 0.15 to 45 parts by weight, it is possible to adhere 1 to 500 parts by weight of the organic pigment onto 100 parts by weight of the white inorganic particles.

After coating the surface of the white inorganic particle with the gluing agent, the organic pigment is added to the coated white inorganic particles, and the mixture is mixed and stirred together to form an organic pigment coat onto the gluing agent coating layer.

The organic pigment is preferably added slowly and little by little, especially for a period of 5 minutes to 24 hours, preferably 5 minutes to 20 hours.

The mixing and stirring conditions for forming the first colored adhesion layer may be appropriately selected so as to obtain a uniform organic pigment coat, and may be controlled such that the linear load is usually 19.6 to 1,960 N/cm (2 to 200 kg/cm), preferably 98 to 1,470 N/cm (10 to 150 kg/cm), more preferably 147 to 980 N/cm (15 to 100 kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The upper limit of the amount of the organic pigment adhered for forming the first colored adhesion layer, is preferably 300 parts by weight, more preferably 200 parts by weight, still more preferably 150 parts by weight, further still more preferably 100 parts by weight based on 100 parts by weight of the white inorganic particles.

Then, the thus-obtained primary composite particles having the first colored adhesion layer is mixed with the gluing agent, and then the organic pigment is added to the resultant gluing agent-coated primary composite particles to adhere the organic pigment onto the first colored adhesion layer through the gluing agent, thereby forming a second colored adhesion layer. The obtained composite particles may be further subjected to drying or heating treatments, if required.

The conditions for mixing and stirring the primary composite particles with the gluing agent, may be appropriately selected so as to adhere the gluing agent on the surface of the primary composite particle, and may be controlled such that the linear load is usually 19.6 to 1,960 N/cm (2 to 200 kg/cm), preferably 98 to 1,470 N/cm (10 to 150 kg/cm), more preferably 147 to 980 N/cm (15 to 100 kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The amount of the gluing agent added is preferably 0.15 to 45 parts by weight based on 100 parts by weight of the white inorganic particles. When the gluing agent are added in an amount of 0.15 to 45 parts by weight, it is possible to adhere 1 to 500 parts by weight of the organic pigment based onto 100 parts by weight of the white inorganic particles.

The mixing and stirring conditions for forming the second colored adhesion layer may be appropriately selected so as to form a uniform organic pigment coat onto the gluing agent coating layer, and may be controlled such that the linear load is usually 19.6 to 1,960 N/cm (2 to 200 kg/cm), preferably 98 to 1,470 N/cm (10 to 150 kg/cm), more preferably 147 to 980 N/cm (15 to 100 kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The amount of the organic pigment added for forming the second colored adhesion layer may be appropriately determined according to the aimed hue and properties of the obtained composite particles such that the total amount of the organic pigment adhered does not exceed the upper limit thereof. The upper limit of the total amount of the organic pigment adhered is preferably 300 parts by weight, more preferably 200 parts by weight, still more preferably 150 parts by weight, further still more preferably 100 parts by weight based on 100 parts by weight of the white inorganic particles.

The heating temperature used in the drying and heating treatments is preferably 40 to 150° C., more preferably 60 to 120° C., and the heating time is preferably 10 minutes to 12 hours, more preferably 30 minutes to 3 hours.

The alkoxysilanes or fluoroalkylsilanes used as a gluing agent layer in the obtained composite particles are finally coated in the form of organosilane compounds produced from the alkoxysilanes or fluoroalkyl organosilane compounds obtainable form fluoroalkylsilanes through the above treatment steps.

The white inorganic particles may be previously coated, if required, with hydroxides and/or oxides of aluminum and/or silicon prior to mixing and stirring with the gluing agent.

The formation of the hydroxides and/or oxides of aluminum and/or silicon coat is conducted as follows. That is, an aluminum compound, a silicon compound or both the aluminum and silicon compounds are added to a water suspension prepared by dispersing the white inorganic particles in water. The resultant mixture is mixed and stirred together and then, if required, the pH value thereof is adjusted adequately, thereby forming the hydroxides and/or oxides of aluminum and/or silicon coat, on the surface of the white inorganic particle. Thereafter, the thus-obtained white inorganic particles coated with the hydroxides and/or oxides of aluminum and/or silicon are filtered out, washed with water, dried and then pulverized, and may be further subjected to subsequent treatments such as deaeration and compaction, if required.

Examples of the aluminum compound may include aluminum salts such as aluminum acetate, aluminum sulfate, aluminum chloride and aluminum nitrate, alkali aluminates such as sodium aluminate, or the like.

Examples of the silicon compound may include water glass #3, sodium orthosilicate, sodium metasilicate or the like.

The paint according to the present invention can be produced by blending the pigment according to the present invention and the above-mentioned paint base material in specific weight ratios by a commonly used mixer such as ball mill, roll mill, homomixer, shaker, attritor or sand grinder.

The rubber or resin composition according to the present invention may be produced by preliminarily intimately mixing a raw rubber or resin material and the black iron-based composite particles together and applying a strong shear force to the mixture by a kneader or an extruder to diaggregate agglomerates of the black iron-based composite particles and uniformly disperse the individual black iron-based composite particles in the rubber or resin. The thus produced rubber or resin composition may be formed into an appropriate shape according to the application thereof upon use.

The point of the present invention is that the composite particles comprising the white organic particles, the gluing agent coating layer formed on the surface of the white inorganic particle and the organic pigment coat formed on the gluing agent coating layer, are substantially free from the desorption of the organic pigment from the surface of the white inorganic particle, and contain no harmful elements.

The reason why the composite particles of the present invention can be inhibited from undergoing the desorption of the organic pigment from the surface of the white inorganic particle, is considered by the present inventors as follows.

That is, in the case where the alkoxysilanes are used, it is considered that metalloxane bonds (Si—O—M wherein M represents a metal element contained in the white inorganic particles) are formed between metal elements contained within or on the surfaces of the white inorganic particles and alkoxy groups contained in the alkoxysilanes or fluoroalkylsilanes, so that the organosilane compounds produced from the alkoxysilanes or fluoroalkyl organosilane compounds obtainable form fluoroalkylsilanes onto which the organic pigment coat is formed, can be strongly bonded to the surface of the white inorganic particles.

Also, in the case where the coupling agent is used, it is considered that since the coupling agent onto which the organic pigment coat is formed, contains reactive groups exhibiting a high reactivity with inorganic materials, the reactive groups can be strongly bonded to the surface of the white inorganic particles.

Further, in the case where polysiloxanes, oligomers or polymer compounds are used, it is considered that various functional groups of the polysiloxanes, oligomers or polymer compounds onto which the organic pigment coat is formed, can be strongly bonded to the surface of the white inorganic particles.

An another point of the present invention is that the paint blended with the composite particles of the present invention can exhibit excellent stability and dispersibility, and the resin composition blended with the composite particles of the present invention can exhibit an excellent dispersibility.

The reason why the paint of the present invention is excellent in stability and dispersibility, and the resin composition of the present invention is excellent in dispersibility, is considered by the present inventors as follows. That is, the composite particles which are free from desorption of the organic pigment from the surfaces of the white inorganic particles, are used as a colorant for the paint and resin composition.

A still further point of the present invention is that the paint produced via the pigment dispersion of the present invention can show more excellent stability and dispersibility, and the resin composition produced via the master batch pellets of the present invention can show a more excellent dispersibility.

In addition, the composite particles of the present invention contain no harmful elements and compounds and, therefore, can provide a pigment which is excellent from viewpoints of not only hygiene and safety, but also environmental protection.

Thus, the composite particles of the present invention are substantially free from desorption of the organic pigment from the surfaces of the core particles and are harmless, and, therefore, are suitably used as a coloring pigment in various applications.

Also, in the paint and the resin composition of the present invention, the composite particles which are substantially free from desorption of the organic pigment therefrom and are harmless, are used as a coloring pigment therefor. Therefore, the paint and the resin composition of the present invention are free from environmental pollution.

EXAMPLES

The present invention will now be described in more detail with reference to the following examples, but the present invention is not restricted to those examples and various modifications are possible within the scope of the present invention.

Various properties were evaluated by the following methods.

(1) The average particle size of the particles was expressed by an average value of 350 particles observed on a micrograph.

(2) The specific surface area was expressed by the value measured by a BET method.

(3) The amounts of Al and Si which were present on the surface of white inorganic particle coated with an intermediate coating material, were respectively measured by a fluorescent X-ray spectroscopy device "3063 M-type" (manufactured by RIGAKU DENKI KOGYO CO., LTD.) according to JIS K0119 "General rule of fluorescent X-ray analysis".

In the case where the gluing agent-coated white inorganic particles were composed of silicon-free core particles and a silicon-containing gluing agent, the amount of Si was measured by a fluorescent X-ray spectroscopy device "3063 M-type" (manufactured by RIGAKU DENKI KOGYO CO., LTD.) according to JIS K0119 "General rule of fluorescent X-ray analysis" to determine the amount of the gluing agent coating layer formed on the surface of the white inorganic particles.

Also, in the case where the gluing agent-coated white inorganic particles were composed of silicon-containing core particles and a silicon-free gluing agent, the amount of C was measured by "Horiba Metal, Carbon and Sulfur Analyzer EMIA-2200 Model" (manufactured by HORIBA SEISAKUSHO CO., LTD.) to determine the amount of the gluing agent coating layer formed on the surface of the white inorganic particles.

(4) The amount of the organic pigment adhered onto the surface of the white inorganic particle was expressed by the amount of carbon measured by "Horiba Metal, Carbon and Sulfur Analyzer EMIA-2200 Model" (manufactured by HORIBA SEISAKUSHO CO. LTD.).

(5) The desorotion percentage (%) of the organic pigment desorbed from the white inorganic particles was measured by the following method. The closer to 0% the desorption percentage, the smaller the amount of the organic pigment desorbed from the surfaces of the white inorganic particles.

That is, 2 g of the particles to be measured and 20 ml of dibromomethane were placed in a 50-ml conical flask and then were subjected to ultrasonic dispersion for 20 minutes. Thereafter, the obtained dispersion was allowed to stand for 3 days, and a supernatant containing the organic pigment desorbed was separated from the particles on the basis of the difference in specific gravity between the organic pigment and the particles. Next, the light transmittance of the obtained supernatant was measured by a self-recording photoelectric spectrophotometer "UV-2100" (manufactured by SHIMADZU SEISAKUSHO CO., LTD.). Using a calibration curve prepared on the basis of a concentration of organic pigment contained in dibromomethane and its light transmittance as previously calculated, the concentration of the desorbed organic pigment present in dibromomethane was calculated from the measured value, and further the desorption percentage (%) of the organic pigment was calculated according to the following formula:

Desorption percentage of organic pigment (%)= $\{(W_a-W_e)/W_a\}\times100$ wherein $W_a$ represents an amount of organic pigment initially adhered onto the surfaces of the white inorganic particles; and $W_e$ represents an amount of organic pigment still adhered on the surfaces of the white inorganic particles after desorption test.

Separately, in the case where the specific gravity of the organic pigment was close to that of the composite particles, the degree of desorption of the organic pigment from the composite particles was visually observed and evaluated by the below-mentioned method, and the observation results were classified into the following five ranks. The rank 5 represents that the amount of the organic pigment desorbed from the composite particles is smallest.

2 g of the particles to be measured and 20 ml of ethanol were placed in a 50-ml conical flask and then was subjected to ultrasonic dispersion for 60 minutes. Thereafter, the obtained dispersion was centrifuged at a rotating speed of 10,000 rpm for 15 minutes to separate the particles from the solvent. The obtained particles were dried at 80° C. for one hour, and the micrograph (×50,000) thereof was visually observed to count the number of the desorbed and re-aggregated organic pigment particles present in visual field of the micrograph. The micrograph was compared with a micrograph (×50,000) of mixed particles obtained by simply mixing the white inorganic particles with the organic pigment without forming a gluing agent coating layer. The results are classified into the following five ranks.

Rank 1: Number of desorbed and re-aggregated particles was substantially the same as that in the simply mixed particles;

Rank 2: 30 to 49 desorbed and re-aggregated particles per 100 white inorganic particles such as extender pigment were recognized;

Rank 3: 10 to 29 desorbed and re-aggregated particles per 100 white inorganic particles were recognized;

Rank 4: 5 to 9 desorbed and re-aggregated particles per 100 white inorganic particles were recognized; and Rank 5: 0 to 4 desorbed and re-aggregated particles per 100 white inorganic particles were recognized.

(6) The hue of each of the white inorganic particles, organic pigment and composite particles, were measured by the following method.

That is, 0.5 g of each sample and 0.5 ml of castor oil were intimately kneaded together by a Hoover's muller to form a paste. 4.5 g of clear lacquer was added to the obtained paste and was intimately kneaded to form a paint. The obtained paint was applied on a cast-coated paper by using a 150 μm (6-mil) applicator to produce a coating film piece (having a film thickness of about 30 μm). The thus obtained coating film piece was measured by a portable spectrocolorimeter "COLOR-GUIDE 45/0" (manufactured by BYK CHEMIE JAPAN CO., LTD.) and a multi-spectro-colour-meter "MSC-IS-2D" (manufactured by SUGA TESTING MACHINES MANUFACTURING CO., LTD.) to determine L*, a* and b* values thereof, respectively. Meanwhile, the C* value representing chroma is calculated according to the following formula:

$$C^* = ((a^*)^2 + (b^*)^2)^{1/2}$$

(7) The tinting strength of the composite particles was measured by the following method.

That is, a primary color enamel and a vehicle enamel prepared by the below-mentioned method were respectively applied on a cast-coated paper by a 150 μm (6-mil) applicator to produce coating film pieces. The thus obtained coating film pieces were measured by a portable spectrocolorimeter "COLOR-GUIDE 45/0" (manufactured by BYK CHEMIE JAPAN CO., LTD.) and a multi-spectrocolour-meter "MSC-IS-2D" (manufactured by SUGA TESTING MACHINES MANUFACTURING CO., LTD.) to determine L* values thereof. The difference between the obtained L* values was represented by a ΔL* value.

Next, as a standard sample for the composite particles, a mixed pigment was prepared by simply mixing the organic pigment and the white inorganic particles at the same mixing ratio as used for the production of the composite particles. Using the thus prepared mixed pigment as standard sample, the same procedure as defined above was conducted to prepare an primary color enamel and a vehicle enamel, form coating film pieces and measure L* values thereof. The difference between the L* values was represented by a ΔLs* value.

From the obtained ΔL* value of the composite particles and ΔLs* value of the standard sample, the tinting strength (%) was calculated according to the following formula:

$$\text{Tinting strength (\%)} = 100 + \{(\Delta Ls^* - \Delta L^*) \times 10\}$$

Preparation of Primary Color Enamel:

10 g of the above sample particles, 16 g of an amino alkyd resin and 6 g of a thinner were blended together. The resultant mixture was added together with 90 g of 3 mmφ glass beads into a 140-ml glass bottle, and then mixed and dispersed for 45 minutes by a paint shaker. The obtained mixture was mixed with 50 g of an amino alkyd resin, and further dispersed for 5 minutes by a paint shaker, thereby obtaining an primary color enamel.

Preparation of Vehicle Enamel:

12 g of the above-prepared primary color enamel and 40 g of Aramic White (titanium dioxide-dispersed amino alkyd resin) were blended together, and the resultant mixture was mixed and dispersed for 15 minutes by a paint shaker, thereby preparing a vehicle enamel.

(8) The hiding powers of the white inorganic particles, organic pigment and composite particles were measured by the cryptometer method according to JIS K5101-8.2 using the above-prepared primary color enamel.

(9) The light resistances of the white inorganic particles, organic pigment and composite particles were measured by the following method.

That is, the same primary color enamel as prepared above for the measurement of tinting strength, was applied onto a cold-rolled steel plate (0.8 mm×70 mm×150 mm; JIS G-3141) and dried to form a coating film having a thickness of 150 μm. One half of the thus prepared test specimen was covered with a metal foil, and an ultraviolet light was continuously irradiated over the test specimen at an intensity of 100 mW/cm² for 6 hours using "EYE SUPER UV TESTER SUV-W13" (manufactured by IWASAKI DENKI CO., LTD.). Then, the hues (L*, a* and b* values) of the metal foil-covered non-irradiated portion and the UV-irradiated portion of the test specimen were respectively measured. The ΔE* value was calculated from differences between the measured hue values of the metal foil-covered non-irradiated portion and the UV-irradiated portion according to the following formula:

$$\Delta E^* = [(\Delta L^*)^2 + (\Delta a^*)^2 + (\Delta b^*)^2]^{1/2}$$

wherein ΔL* represents the difference between L* values of the non-irradiated and UV-irradiated portions; Δa* represents the difference between a* values of the non-irradiated and UV-irradiated portions; and Δb* represents the difference between b* values of the non-irradiated and UV-irradiated portions.

(10) The average manor diameter and average minor diameter (average diameter) of the master batch pellets were respectively expressed by average values obtained by measuring these parameters of 10 pellets using vernier calipers.

(11) The hues of the solvent-based paint and water-based paint using the composite particles were measured by the following method.

That is, the respective paints prepared by the below-mentioned methods, were applied onto a cold-rolled steel plate (0.8 mm×70 mm×150 mm; JIS G-3141) and dried to form a coating film having a thickness of 150 μm. The thus obtained test specimens were measured by a multi-spectro-color-meter "MSC-IS-2D" (manufactured by SUGA TESTING MACHINES MANUFACTURING CO., LTD.) and a portable spectrocolorimeter "COLOR-GUIDE 45/0" (manufactured by BYK CHEMIE JAPAN CO., LTD.) to determine L*, a* and b* values thereof. Also, the hue of the resin composition tinted with the composite particles was measured by the following method. That is, a colored resin plate prepared by the below-mentioned method was measured by a multi-spectro-color-meter "MSC-IS-2D" (manufactured by SUGA TESTING MACHINES MANUFACTURING CO., LTD.) and a portable spectrocolorimeter "COLOR-GUIDE 45/0" (manufactured by BYK CHEMIE JAPAN CO., LTD.) by the same method as described above.

(12) The gloss of the coating film was measured by irradiating light at an incident angle of 60°, using a gloss meter UGV-5D (manufactured by SUGA TESTING MACHINES MANUFACTURING CO., LTD.). The higher the gloss, the more excellent the dispersibility of the composite particles in the paint.

(13-1) The light resistances of coating films produced from the respective paints, were measured by the following method.

That is, one half of the same test specimen as prepared and used for measuring hues of the above paints, was covered with a metal foil, and an ultraviolet light was continuously irradiated over the test specimen at an intensity of 100 mW/cm² for 6 hours using "EYE SUPER UV TESTER SUV-W13" (manufactured by IWASAKI DENKI CO., LTD.). Then, the hues (L*, a* and b* values) of the metal foil-covered non-irradiated portion and the UV-irradiated portion of the test specimen were respectively measured. The ΔE* value was calculated from differences between the measured hue values of the metal foil-covered non-irradiated portion and the UV-irradiated portion according to the above-described formula.

(13-2) The light resistances of the respective resin compositions, were measured by the following method.

That is, one half of the same resin plate as prepared and used for measuring hues of the above resin composition, was covered with a metal foil, and an ultraviolet light was continuously irradiated over the resin plate at an intensity of 100 mW/cm² for 6 hours using "EYE SUPER UV TESTER SUV-W13" (manufactured by IWASAKI DENKI CO., LTD.). Then, the hues (L*, a* and b* values) of the metal foil-covered non-irradiated portion and the UV-irradiated portion of the resin plate were respectively measured. The ΔE* value was calculated from differences between the measured hue values of the metal foil-covered non-irradiated portion and the UV-irradiated portion according to the above-described formula.

(14) The transparency of the coating film using the composite particles was expressed by the linear absorption defined by the following formula. Specifically, the linear absorption was calculated from the light transmittance of a coating film produced by applying a paint prepared by the below-mentioned method on a 100 μm-thick clear base film. The light transmittance was measured using a self-recording photoelectric spectrophotometer "UV-2100" (manufactured by SHIMADZU SEISAKUSHO CO., LTD.). Also, the transparency of the resin composition was expressed by the linear absorption of a resin plate having the following composition. The linear absorption was calculated from the light transmittance of the resin plate which was measured using a self-recording photoelectric spectrophotometer "UV-2100" (manufactured by Shimadzu Seisakusho CO., LTD.). The smaller the linear absorption, the higher the light transmittance and the higher the transparency.

$$\text{Linear absorption } (\mu m^{-1}) = ln(1/t)/FT$$

wherein t is a light transmittance (−) at λ=900 nm; FT is a thickness (μm) of the coating film or resin plate to be tested.

Preparation of Paint for Evaluation of Transparency:

5 g of sample particles and the other components shown below were added at the following weight ratio into a 250-ml glass bottle, and then mixed and dispersed therein together with 160 g of 3 mmφ glass beads for 120 minutes by a paint shaker, thereby preparing a paint for evaluation of transparency.

| Composition of paint for evaluation of transparency: | |
|---|---|
| Sample particles | 9.9 parts by weight |
| Melamine resin (SUPER PECKAMINE J-820-60 (tradename) produced by DAI-NIPPON INK KAGAKU KOGYO CO., LTD.) | 19.8 parts by weight |
| Alkyd resin (BECKOZOL 1307-60EL (tradename) produced by DAI-NIPPON INK KAGAKU KOGYO CO., LTD.) | 39.6 parts by weight |
| Xylene | 29.7 parts by weight |
| Butanol | 1.0 part by weight |

Preparation of Water-based Paint for Evaluation of: Transparency 5 g of sample particles and the other components shown below were added at the following weight ratio into a 250-ml glass bottle, and then mixed and dispersed therein together with 160 g of 3 mmφ glass beads for 120 minutes by a paint shaker, thereby preparing a paint for evaluation of transparency.

| Composition of paint for evaluation of transparency: | |
|---|---|
| Sample particles | 10.1 parts by weight |
| Water-based melamine resin (S-695 (tradename) produced by DAI-NIPPON INK KAGAKU KOGYO CO., LTD.) | 9.3 parts by weight |
| Water-based alkyd resin (S-118 (tradename) produced by DAI-NIPPON INK KAGAKU KOGYO CO., LTD.) | 40.7 parts by weight |
| Defoamer (NOPCO 8034 (tradename) produced by SUN NOPCO CO., LTD.) | 0.2 part by weight |
| Water | 28.2 parts by weight |
| Butyl cellosolve | 11.5 parts by weight |

Preparation of Resin Composition for Evaluation of: Transparency 0.5 g of sample particles and 49.5 g of polyvinyl chloride resin particles ("103EP8D" (tradename), produced by NIPPON ZEON CO., LTD.) were weighed and charged into a 100 ml beaker made of a resin, and intimately mixed together by a spatula, thereby obtaining mixed particles.

1.0 g of calcium stearate was added to the obtained mixed particles. The mixed particles were intimately mixed and then slowly supplied to hot rolls heated to 160° C. whose clearance was set to 0.2 mm, and continuously kneaded therebetween until a uniform resin composition was produced. The resin composition kneaded was separated from the hot rolls and used as a raw material for forming a colored resin plate. Next, the thus-produced resin composition was interposed between a pair of surface-polished stainless steel plates, placed within a hot press heated to 180° C. and then subjected to a pressure molding while applying a pressure of 9.8×10⁷ Pa (1 ton/cm²) thereto, thereby obtaining a colored resin plate for evaluation of transparency, having a thickness of 1 mm.

(15) The storage stability of the paint was measured by the following method.

That is, the respective paints prepared by the below-mentioned method were applied onto a cold-rolled steel plate (0.8 mm×70 mm×150 mm; JIS G-3141) and dried to form a coating film having a thickness of 150 μm. Then, the L*, a* and b* values of the thus prepared coating film were measured. Separately, the respective paints were allowed to stand at 25° C. for one week, and then applied onto the cold-rolled steel plate and dried to form a similar coating film. The L*, a* and b* values of the thus prepared coating film were also measured. The ΔE* value was calculated from the differences between the measured values according to the following formula:

$$\Delta E^* = [(\Delta L^*)^2 + (\Delta a^*)^2 + (\Delta b^*)^2]^{1/2}$$

wherein ΔL* represents the difference between L* values before and after the standing test; Δa* represents the difference between a* values before and after the standing test; and Δb* represents the difference between b* values before and after the standing test.

(16) The viscosity at 25° C. of the paint prepared by the below-mentioned method, was measured at a shear rate (D) of 1.92 sec⁻¹ using an E-type viscometer (cone plate-type viscometer) EMD-R (manufactured by TOKYO KEIKI CO., LTD.).

(17) The dispersibility of the composite particles in resin composition was evaluated by visually counting the number of undispersed aggregate particles on a surface of the obtained resin plate, and classifying the results into the following five ranks. The rank 5 represents the most excellent dispersing condition.

Rank 5: No undispersed aggregate particles were recognized.
Rank 4: 1 to 4 undispersed aggregate particles per 1 cm$^2$ were recognized;
Rank 3: 5 to 9 undispersed aggregate particles per 1 cm$^2$ were recognized;
Rank 2: 10 to 49 undispersed aggregate particles per 1 cm$^2$ were recognized;
Rank 1: Not less than 50 undispersed aggregate particles per 1 cm$^2$ were recognized.

Example 1

<Production of Composite Particles>

20 kg of titanium oxide particles (particle shape: granular shape; average particle size: 0.24 μm; BET specific surface area value: 11.6 m$^2$/g; when measured by a portable spectrocolorimeter "COLOR-GUIDE 45/0" (manufactured by BYK CHEMIE JAPAN CO., LTD.), L* value: 94.15, a* value: 1.06, b* value: 2.22 and C* value: 2.46, (when measured by a multi-spectro-color-meter "MSC-IS-2D" (manufactured by SUGA TESTING MACHINES MANUFACTURING CO., LTD.), L* value: 96.31, a* value: 1.06, b* value: −1.66 and C* value: 1.97); hiding power: 1,490 cm$^2$/g; light resistance (ΔE* value): 6.86) were deaggregated in 150 liters of pure water using a stirrer, and further passed through a TK pipeline homomixer (manufactured by TOKUSHU KIKA KOGYO CO., LTD.) three times, thereby obtaining a slurry containing the titanium oxide particles.

Successively, the obtained slurry was passed through a transverse-type sand grinder (tradename "MIGHTY MILL MHG-1.5L", manufactured by INOUE SEISAKUSHO CO., LTD.) five times at an axis-rotating speed of 2,000 rpm, thereby obtaining a slurry in which the titanium oxide particles were dispersed.

The titanium oxide particles in the obtained slurry, which remained on a sieve of 325 meshes (mesh size: 44 μm) was 0%. The slurry was filtered and washed with water, thereby obtaining a wet cake composed of the titanium oxide particles. The obtained wet cake composed of the titanium oxide particles was dried at 120° C. 11.0 kg of the dried particles were then charged into an edge runner "MPUV-2 Model" (tradename, manufactured by MATSUMOTO CHUZO TEKKOSHO CO., LTD.), and mixed and stirred at 294 N/cm (30 Kg/cm) for 30 minutes, thereby lightly deaggregating the particles.

Then, 110 g of methyltriethoxysilane "TSL8123" (tradename, produced by GE TOSHIBA SILICONE CO., LTD.) was mixed and diluted with 200 ml of ethanol to obtain a solution of methyltriethoxysilane. The methyltriethoxysilane solution was added to the deaggregated titanium oxide particles while operating the edge runner. The titanium oxide particles were continuously mixed and stirred at a linear load of 588 N/cm (60 Kg/cm) and a stirring speed of 22 rpm for 30 minutes.

Next, 1,100 g of organic pigment B-1 (kind: phthalocyanine-based pigment; particle shape: granular shape; average particle size: 0.06 μm; BET specific surface area: 71.6 m$^2$/g; hiding power: 240 cm$^2$/g; when measured by a portable spectrocolorimeter "COLOR-GUIDE 45/0" (manufactured by BYK CHEMIE JAPAN CO., LTD.), L* value: 5.20, a* value: 9.14, and b* value: −21.84, (when measured by a multi-spectro-color-meter "MSC-IS-2D" (manufactured by SUGA TESTING MACHINES MANUFACTURING CO., LTD.), L* value: 17.70, a* value: 9.72 and b* value: −23.44); light resistance (ΔE* value): 10.84), was added to the titanium oxide particles coated with methyltriethoxysilane for 10 minutes while operating the edge runner. Further, the particles were continuously mixed and stirred at a linear load of 392 N/cm (40 Kg/cm) and a stirring speed of 22 rpm for 20 minutes to form an organic pigment B-1 coat on the coating layer composed of methyltriethoxysilane. Then, the thus obtained coated particles were heat-treated at 105° C. for 60 minutes by using a drier, thereby obtaining composite particles.

The resultant composite particles were granular particles having an average particle size of 0.24 μm. In addition, the composite particles showed a BET specific surface area value of 13.8 m$^2$/g, when measured by a portable spectrocolorimeter "COLOR-GUIDE 45/0" (manufactured by BYK CHEMIE JAPAN CO., LTD.), L* value of 64.33, a* value of −5.68 and b* value of −29.36, (when measured by a multi-spectro-color-meter "MSC-IS-2D" (manufactured by SUGA TESTING MACHINES MANUFACTURING CO., LTD.), L* value of 64.67, a* value of 1.06 and b* value of −31.42); tinting strength of 138%, hiding power of 1,520 cm$^2$/g, and light resistance (ΔE* value) of 2.48. The desorption percentage of the organic pigment from the composite particles was 2.5%. The amount of a coating organosilane compound produced from methyl triethoxysilane was 0.15% by weight (calculated as Si). The amount of the organic pigment coat formed on the coating layer composed of the organosilane compound produced from methyl triethoxysilane is 6.04% by weight (calculated as C) based on the weight of the composite particles (corresponding to 10 parts by weight based on 100 parts by weight of the titanium oxide particles).

As a result of observing the micrograph, since no organic pigment B-1 was recognized from the micrograph, it was confirmed that a whole amount of the organic pigment B-1 used contributed to the formation of the organic pigment coat on the coating layer composed of the organosilane compound produced from methyl triethoxysilane.

Example 2

<Production of Solvent-based Paint Containing Composite Particles>

10 g of the composite particles produced in Example 1, were blended with an amino alkyd resin and a thinner at the following weight ratio, and charged into a 140-ml glass bottle together with 90 g of 3 mmφ glass beads. Next, the obtained mixture was mixed and dispersed for 90 minutes by a paint shaker, thereby preparing a mill base.

Composition of Mill Base:

| | |
|---|---|
| Composite particles | 12.2 parts by weight |
| Amino alkyd resin (AMILAC No. 1026, produced by KANSAI PAINT CO., LTD.) | 19.5 parts by weight |
| Thinner | 7.3 parts by weight |

The above-prepared mill base was blended with an amino alkyd resin at the following weight ratio, and the obtained mixture was further mixed and dispersed for 15 minutes by a paint shaker, thereby obtaining a solvent-based paint containing the composite particles.

| Composition of paint: | |
|---|---|
| Mill base | 39.0 parts by weight |
| Amino alkyd resin (AMILAC No. 1026, produced by KANSAI PAINT CO., LTD.) | 61.0 parts by weight |

The thus obtained solvent-based paint exhibited a viscosity of 1,024 cP and a storage stability ($\Delta E^*$ value) of 0.83.

Next, the thus prepared solvent-based paint was applied onto a cold-rolled steel plate (0.8 mm×70 mm×150 mm; JIS G-3141) and dried to form a coating film having a thickness of 150 µm. The obtained coating film showed a gloss of 91% and a light resistance ($\Delta E^*$ value) of 2.81. As to the hue of the coating film, when measured by a portable spectrocolorimeter "COLOR-GUIDE 45/0" (manufactured by BYK CHEMIE JAPAN CO., LTD.), the $L^*$ value thereof was 67.13, the $a^*$ value thereof was −5.32 and the $b^*$ value thereof was −28.64, and when measured by a multi-spectrocolor-meter "MSC-IS-2D" (manufactured by SUGA TESTING MACHINES MANUFACTURING CO., LTD.), the $L^*$ value thereof was 67.41 the $a^*$ value thereof was −5.32 and the $b^*$ value thereof was −30.74.

Example 3

<Production of Water-based Paint Containing Composite Particles>

7.62 g of the composite particles obtained in Example 1, were blended with a water-soluble alkyd resin and the like at the following weight ratio, and charged into a 140-ml glass bottle together with 90 g of 3 mmφ glass beads. Next, the obtained mixture was mixed and dispersed for 90 minutes by a paint shaker, thereby preparing a mill base.

| Composition of Mill Base: | |
|---|---|
| Composite particles | 12.4 parts by weight |
| Water-soluble alkyd resin (tradename: "S-118", produced by DAI-NIPPON INK KAGAKU KOGYO CO., LTD.) | 9.0 parts by weight |
| Defoamer (tradename: "NOPCO 8034", produced by SUN NOPCO CO., LTD.) | 0.1 part by weight |
| Water | 4.8 parts by weight |
| Butyl cellosolve | 4.1 parts by weight |

The above-prepared mill base was blended with paint components shown below at the following weight ratio, and the obtained mixture was further mixed and dispersed for 15 minutes by a paint shaker, thereby obtaining a water-based paint.

| Composition of paint: | |
|---|---|
| Mill base | 30.4 parts by weight |
| Water-soluble alkyd resin (tradename: S-118, produced by DAI-NIPPON INK KAGAKU KOGYO CO., LTD.) | 46.2 parts by weight |
| Water-soluble melamine resin (tradename: S-695, produced by DAI-NIPPON INK KAGAKU KOGYO CO., LTD.) | 12.6 parts by weight |

-continued

| Composition of paint: | |
|---|---|
| Defoamer (tradename: "NOPCO 8034", produced by SUN NOPCO CO., LTD.) | 0.1 part by weight |
| Water | 9.1 parts by weight |
| Butyl cellosolve | 1.6 parts by weight |

The thus obtained water-based paint exhibited a viscosity of 2,560 cP and a storage stability ($\Delta E^*$ value) of 0.86.

Next, the thus prepared water-based paint was applied onto a cold-rolled steel plate (0.8 mm×70 mm×150 mm; JIS G-3141) and dried to form a coating film having a thickness of 150 µm. The obtained coating film showed a gloss of 88% and a light resistance ($\Delta E^*$ value) of 2.72. As to the hue of the coating film, when measured by a portable spectrocolorimeter "COLOR-GUIDE 45/0" (manufactured by BYK CHEMIE JAPAN CO., LTD.), the $L^*$ value thereof was 65.13, the $a^*$ value thereof was −5.63 and the $b^*$ value thereof was −29.26, and when measured by a multi-spectrocolor-meter "MSC-IS-2D" (manufactured by SUGA TESTING MACHINES MANUFACTURING CO., LTD.), the $L^*$ value thereof was 65.44, the $a^*$ value thereof was −5.63 and the $b^*$ value thereof was −31.33.

Example 4

<Production of Resin Composition>

2.5 g of the composite particles obtained in Example 1, and 47.5 g of polyvinyl chloride resin particles 103EP8D (produced by NIPPON ZEON CO., LTD.) were weighed and charged into a 100-ml beaker made of resins, and intimately mixed together by a spatula, thereby obtaining mixed particles.

0.5 g of calcium stearate was added to the obtained mixed particles. The mixed particles were intimately mixed and then slowly supplied to hot rolls heated to 160° C. whose clearance was set to 0.2 mm, and continuously kneaded therebetween until a uniform resin composition was produced. The resin composition kneaded was separated from the hot rolls and used as a raw material for forming a colored resin plate.

Next, the thus-produced resin composition was interposed between a pair of surface-polished stainless steel plates, placed within a hot press heated to 180° C. and then subjected to a pressure molding while applying a pressure of 98,000 kPa (1 ton/cm$^2$) thereto, thereby obtaining a colored resin plate having a thickness of 1 mm. The thus-produced colored resin plate had a dispersing condition of rank 5 and a light resistance ($\Delta E^*$ value) of 2.95. As to the hue of the colored resin plate, when measured by a portable spectrocolorimeter "COLOR-GUIDE 45/0" (manufactured by BYK CHEMIE JAPAN CO., LTD.), the $L^*$ value thereof was 66.31, the $a^*$ value thereof was −5.84 and the $b^*$ value thereof was −28.65, and when measured by a multi-spectrocolor-meter "MSC-IS-2D" (manufactured by SUGA TESTING MACHINES MANUFACTURING CO., LTD.), the $L^*$ value thereof was 66.60, the $a^*$ value thereof was −5.84 and the $b^*$ value thereof was −30.75.

Example 5

20 kg of titanium oxide particles (particle shape: granular shape; average particle size: 0.24 µm; BET specific surface area value: 11.6 m$^2$/g; when measured by a portable spectrocolorimeter "COLOR-GUIDE 45/0" (manufactured by BYK CHEMIE JAPAN CO., LTD.), L* value: 94.15, a* value: 1.06, b* value: 2.22 and C* value: 2.46 (when measured by a multi-spectro-color-meter "MSC-IS-2D" (manufactured by SUGA TESTING MACHINES MANUFACTURING CO., LTD.), L* value: 96.31, a* value: 1.06, b* value: −1.66 and C* value: 1.97); hiding power: 1,490 cm$^2$/g; light resistance (ΔE* value): 6.86) were deaggregated in 150 liters of pure water using a stirrer, and further passed through a TK pipeline homomixer (manufactured by TOKUSHU KIKA KOGYO CO., LTD.) three times, thereby obtaining a slurry containing the titanium oxide particles.

Successively, the obtained slurry was passed through a transverse-type sand grinder (tradename "MIGHTY MILL MHG-1.5L", manufactured by INOUE SEISAKUSHO CO., LTD.) five times at an axis-rotating speed of 2,000 rpm, thereby obtaining a slurry in which the titanium oxide particles were dispersed.

The titanium oxide particles in the obtained slurry, which remained on a sieve of 325 meshes (mesh size: 44 μm) was 0%. The slurry was filtered and washed with water, thereby obtaining a wet cake composed of the titanium oxide particles. The obtained wet cake composed of the titanium oxide particles was dried at 120° C. 11.0 kg of the dried particles were then charged into an edge runner "MPUV-2 Model" (tradename, manufactured by MATSUMOTO CHUZO TEKKOSHO CO., LTD.), and mixed and stirred at 294 N/cm (30 Kg/cm) for 30 minutes, thereby lightly deaggregating the particles.

Then, 110 g of methyltriethoxysilane "TSL8123" (tradename, produced by GE TOSHIBA SILICONE CO., LTD.) was mixed and diluted with 200 ml of ethanol to obtain a solution of methyltriethoxysilane. The methyltriethoxysilane solution was added to the deaggregated titanium oxide particles while operating the edge runner. The titanium oxide particles were continuously mixed and stirred at a linear load of 588 N/cm (60 Kg/cm) and a stirring speed of 22 rpm for 20 minutes.

Next, 2,200 g of organic pigment B-1 (kind: phthalocyanine-based pigment; particle shape: granular shape; average particle size: 0.06 μm; BET specific surface area: 71.6 m$^2$/g; hiding power: 240 cm$^2$/g; when measured by a portable spectrocolorimeter "COLOR-GUIDE 45/0" (manufactured by BYK CHEMIE JAPAN CO., LTD.), L* value: 5.20, a* value: 9.14, and b* value: −21.84, (when measured by a multi-spectro-color-meter "MSC-IS-2D" (manufactured by SUGA TESTING MACHINES MANUFACTURING CO., LTD.), L* value: 17.70, a* value: 9.72 and b* value: −23.44); light resistance (ΔE* value): 10.84, was added to the titanium oxide particles coated with methyltriethoxysilane for 20 minutes while operating the edge runner. Further, the particles were continuously mixed and stirred at a linear load of 392 N/cm (40 Kg/cm) and a stirring speed of 22 rpm for 60 minutes to form an organic pigment B-1 coat on the coating layer composed of methyltriethoxysilane.

In order to confirm the amount of the coating methyltriethoxysilane and the amount of the organic pigment B-1 coat, a part of the obtained primary composite particles was sampled and heat-treated at 105° C. for 60 minutes by using a drier. The amount of the coating methyltriethoxysilane was 0.15% by weight (calculated as Si), and the amount of the organic pigment B-1 coat was 10.96% by weight (calculated as C) (corresponding to 20 parts by weight based on 100 parts by weight of the titanium oxide particles). As a result of observing the micrograph, since substantially no organic pigment B-1 was recognized from the micrograph, it was confirmed that a whole amount of the organic pigment B-1 used contributed to the formation of the organic pigment coat on the coating layer composed of the organosilane compound produced from methyltriethoxysilane.

Next, 220 g of dimethylpolysiloxane (tradename "TSF451", produced by GE TOSHIBA SILICONES CO., LTD.) was added to the above primary composite particles while operating the edge runner. Further, the resultant mixture was mixed and stirred at a linear load of 588 N/cm (60 Kg/cm) and a stirring speed of 22 rpm for 60 minutes, thereby obtaining the primary composite particles having a uniform coating layer composed of dimethylpolysiloxane thereon.

Next, 2,200 g of organic pigment B-2 (kind: phthalocyanine-based pigment; particle shape: granular shape; average particle size: 0.08 μm; BET specific surface area value: 56.3 m$^2$/g; hiding power: 272 cm$^2$/g; when measured by a portable spectrocolorimeter "COLOR-GUIDE 45/0" (manufactured by BYK CHEMIE JAPAN CO., LTD.), L* value: 6.00, a* value: −11.60 and b* value: −23.56, (when measured by a multi-spectro-color-meter "MSC-IS-2D" (manufactured by SUGA TESTING MACHINES MANUFACTURING CO., LTD.), L* value: 17.32, a* value: −11.60 and b* value: −26.53); light resistance (ΔE* value): 10.21) was added to the coated primary composite particles for 20 minutes while operating the edge runner. Further, the particles were continuously mixed and stirred at a linear load of 392 N/cm (40 Kg/cm) and a stirring speed of 22 rpm for 60 minutes to form an organic pigment B-2 coat on the organic pigment B-1 coat through the coating layer composed of dimethylpolysiloxane. Then, the thus obtained coated particles were heat-treated at 105° C. for 60 minutes by using a drier, thereby obtaining composite particles.

The resultant composite particles were granular particles having an average particle size of 0.25 μm. In addition, the composite particles showed a BET specific surface area value of 11.8 m$^2$/g, when measured by a portable spectrocolorimeter "COLOR-GUIDE 45/0" (manufactured by BYK CHEMIE JAPAN CO., LTD.), L* value of 62.14, a* value of 7.24 and b* value of −19.92, (when measured by a multi-spectro-color-meter "MSC-IS-2D" (manufactured by SUGA TESTING MACHINES MANUFACTURING CO., LTD.), L* value of 62.67, a* value of 7.24 and b* value of −23.07); tinting strength of 217%, hiding power of 1,810 cm$^2$/g, and light resistance (ΔE* value) of 2.36. The desorption percentage of the organic pigments from the composite particles was 6.2%. The amount of the coating dimethylpolysiloxane was 0.70% by weight (calculated as Si). The total amount of the organic pigment coats was 18.84% by weight (calculated as C) based on the weight of the composite particles (corresponding to 40 parts by weight based on 100 parts by weight of the titanium oxide particles).

As a result of observing the micrograph, since substantially no organic pigments B-2 were recognized from the micrograph, it was confirmed that a whole amount of the organic pigments used contributed to the formation of the organic pigment coats on the coating layer composed of methyl hydrogen polysiloxane.

Example 6

<Production of Solvent-based Paint Containing Composite>Particles 10 g of the composite particles produced in Example 5, were blended with an amino alkyd resin and a thinner at the following weight ratio, and charged into a 140-ml glass bottle together with 90 g of 3 mmφ glass beads. Next, the obtained mixture was mixed and dispersed for 90 minutes by a paint shaker, thereby preparing a mill base.

Composition of Mill Base:

| | |
|---|---|
| Composite particles | 12.2 parts by weight |
| Amino alkyd resin (AMILAC No. 1026, produced by KANSAI PAINT CO., LTD.) | 19.5 parts by weight |
| Thinner | 7.3 parts by weight |

The above-prepared mill base was blended with an amino alkyd resin at the following weight ratio, and the obtained mixture was further mixed and dispersed for 15 minutes by a paint shaker, thereby obtaining a solvent-based paint containing the composite particles.

Composition of paint:

| | |
|---|---|
| Mill base | 39.0 parts by weight |
| Amino alkyd resin (ANILAC No. 1026, produced by KANSAI PAINT CO., LTD.) | 61.0 parts by weight |

The thus obtained solvent-based paint exhibited a viscosity of 1,280 cP and a storage stability ($\Delta E^*$ value) of 0.78.

Next, the thus prepared solvent-based paint was applied onto a cold-rolled steel plate (0.8 mm×70 mm×150 mm; JIS G-3141) and dried to form a coating film having a thickness of 150 μm. The obtained coating film showed a gloss of 93% and a light resistance ($\Delta E^*$ value) of 2.68. As to the hue of the coating film, when measured by a portable spectrocolorimeter "COLOR-GUIDE 45/0" (manufactured by BYK CHEMIE JAPAN CO., LTD.), the $L^*$ value thereof was 64.51, the $a^*$ value thereof was 6.60 and the $b^*$ value thereof was −21.24, and when measured by a multi-spectro-colormeter "MSC-IS-2D" (manufactured by SUGA TESTING MACHINES MANUFACTURING CO., LTD.), the $L^*$ value thereof was 64.91, the $a^*$ value thereof was 6.60 and the $b^*$ value thereof was −24.32.

Example 7

<Production of Water-based Paint Containing Composite Particles>

7.62 g of the composite particles obtained in Example 5, were blended with a water-soluble alkyd resin and the like at the following weight ratio, and charged into a 140-ml glass bottle together with 90 g of 3 mmφ glass beads. Next, the obtained mixture was mixed and dispersed for 90 minutes by a paint shaker, thereby preparing a mill base.

Composition of Mill Base:

| | |
|---|---|
| Composite particles | 12.4 parts by weight |
| Water-soluble alkyd resin (tradename: "S-118", produced by DAI-NIPPON INK KAGAKU KOGYO CO., LTD.) | 9.0 parts by weight |
| Defoamer (tradename: "NOPCO 8034", produced by SUN NOPCO CO., LTD.) | 0.1 part by weight |
| Water | 4.8 parts by weight |
| Butyl cellosolve | 4.1 parts by weight |

The above-prepared mill base was blended with paint components shown below at the following weight ratio, and the obtained mixture was further mixed and dispersed for 15 minutes by a paint shaker, thereby obtaining a water-based paint.

Composition of paint:

| | |
|---|---|
| Mill base | 30.4 parts by weight |
| Water-soluble alkyd resin (tradename: S-118, produced by DAI-NIPPON INK KAGAKU KOGYO CO., LTD.) | 46.2 parts by weight |
| Water-soluble melamine resin (tradename: S-695, produced by DAI-NIPPON INK KAGAKU KOGYO CO., LTD.) | 12.6 parts by weight |
| Defoamer (tradename: "NOPCO 8034", produced by SUN NOPCO CO., LTD.) | 0.1 part by weight |
| Water | 9.1 parts by weight |
| Butyl cellosolve | 1.6 parts by weight |

The thus obtained water-based paint exhibited a viscosity of 2,840 cP and a storage stability ($\Delta E^*$ value) of 0.78.

Next, the thus prepared water-based paint was applied onto a cold-rolled steel plate (0.8 mm×70 mm×150 mm; JIS G-3141) and dried to form a coating film having a thickness of 150 μm. The obtained coating film showed a gloss of 89% and a light resistance ($\Delta E^*$ value) of 2.56. As to the hue of the coating film, when measured by a portable spectrocolorimeter "COLOR-GUIDE 45/0" (manufactured by BYK CHEMIE JAPAN CO., LTD.), the $L^*$ value thereof was 64.56, the $a^*$ value thereof was 6.12 and the $b^*$ value thereof was −20.63; and when measured by a multi-spectro-colormeter "MSC-IS-2D" (manufactured by SUGA TESTING MACHINES MANUFACTURING CO., LTD.), the $L^*$ value thereof was 64.96, the $a^*$ value thereof was 6.12 and the $b^*$ value thereof was −23.74.

Example 8

<Production of Resin Composition>

2.5 g of the composite particles obtained in Example 5, and 47. 5 g of polyvinyl chloride resin particles 103EP8D (produced by NIPPON ZEON CO., LTD.) were weighed and charged into a 100-ml beaker made of resins, and intimately mixed together by a spatula, thereby obtaining mixed particles.

0.5 g of calcium stearate was added to the obtained mixed particles. The mixed particles were intimately mixed and then slowly supplied to hot rolls heated to 160° C. whose clearance was set to 0.2 mm, and continuously kneaded therebetween until a uniform resin composition was produced. The resin composition kneaded was separated from the hot rolls and used as a raw material for forming a colored resin plate.

Next, the thus-produced resin composition was interposed between a pair of surface-polished stainless steel plates, placed within a hot press heated to 180° C. and then subjected to a pressure molding while applying a pressure of 98,000 kPa (1 ton/cm$^2$) thereto, thereby obtaining a colored resin plate having a thickness of 1 mm. The thus-produced colored resin plate had a dispersing condition of rank 5 and a light resistance ($\Delta E^*$ value) of 2.82. As to the hue of the colored resin plate, when measured by a portable spectrocolorimeter "COLOR-GUIDE 45/0" (manufactured by BYK CHEMIE JAPAN CO., LTD.), the $L^*$ value thereof was 65.06, the a* value thereof was 6.63 and the b* value thereof was −21.24, and when measured by a multi-spectro-color-meter "MSC-IS-2D" (manufactured by SUGA TESTING MACHINES MANUFACTURING CO., LTD.), the L* value thereof was 65.44, the a* value thereof was 6.63 and the b* value thereof was −24.32.

Example 9

<Production of Solvent-based Pigment Dispersion>

The composite particles produced in Example 1 were blended with an amino alkyd resin and a thinner as a pigment dispersion base material at the following weight ratio. Next, the obtained mixture was dispersed using a sand grinder mill, thereby preparing a solvent-based pigment dispersion.

| Composition of pigment dispersion: | |
| --- | --- |
| Composite particles | 12.2 parts by weight |
| Amino alkyd resin (AMILAC No. 1026, produced by KANSAI PAINT CO., LTD.) | 6.1 parts by weight |
| Thinner | 12.2 parts by weight |

<Production of Solvent-based Paint>

The above-prepared pigment dispersion was blended with an amino alkyd resin at the following weight ratio, and the obtained mixture was further mixed and dispersed for 15 minutes by a paint shaker, thereby obtaining a solvent-based paint containing the composite pigment.

| Composition of paint: | |
| --- | --- |
| Solvent-based pigment dispersion | 30.5 parts by weight |
| Amino alkyd resin (AMILAC No. 1026, produced by KANSAI PAINT CO., LTD.) | 69.5 parts by weight |

The thus obtained solvent-based paint exhibited a viscosity of 608 cP and a storage stability (ΔE* value) of 0.84.

Next, the thus prepared solvent-based paint was applied onto a cold-rolled steel plate (0.8 mm×70 mm×150 mm; JIS G-3141) and dried to form a coating film having a thickness of 150 μm. The obtained coating film showed a gloss of 105% and a light resistance (ΔE* value) of 2.65. As to the hue of the coating film, when measured by a portable spectrocolorimeter "COLOR-GUIDE 45/0" (manufactured by BYK CHEMIE JAPAN CO., LTD.), the L* value thereof was 67.72, the a* value thereof was −5.36 and the b* value thereof was −28.09, and when measured by a multi-spectro-color-meter "MSC-IS-2D" (manufactured by SUGA TESTING MACHINES MANUFACTURING CO., LTD.), the L* value thereof was 67.99, the a* value thereof was −5.36 and the b* value thereof was −30.22.

Example 10

<Production of Water-based Pigment Dispersion>

The composite particles obtained in Example 1 were blended with a water-soluble alkyd resin and the like as a pigment dispersion base material at the following weight ratio. Next, the obtained mixture was dispersed by a sand grinder mill, thereby preparing a water-based pigment dispersion.

| Composition of pigment dispersion: | |
| --- | --- |
| Composite particles | 17.5 parts by weight |
| Water-soluble alkyd resin (tradename: "S-118", produced by DAI-NIPPON INK KAGAKU KOGYO CO., LTD.) | 3.5 parts by weight |
| Defoamer (tradename: "NOPCO 8034", produced by SUN NOPCO CO., LTD.) | 0.1 part by weight |
| Water | 7.5 parts by weight |
| Butyl cellosolve | 6.4 parts by weight |

<Production of Water-based Paint>

The above-prepared pigment dispersion was blended with paint components shown below at the following weight ratio, and the obtained mixture was further mixed and dispersed for 15 minutes by a paint shaker, thereby obtaining a water-based paint.

| Composition of paint: | |
| --- | --- |
| Water-based pigment dispersion | 35.0 parts by weight |
| Water-soluble alkyd resin (tradename: S-118, produced by DAI-NIPPON INK KAGAKU KOGYO CO., LTD.) | 30.0 parts by weight |
| Water-soluble melamine resin (tradename: S-695, produced by DAI-NIPPON INK KAGAKU KOGYO CO., LTD.) | 10.8 parts by weight |
| Defoamer (tradename: "NOPCO 8034", produced by SUN NOPCO CO., LTD.) | 0.1 part by weight |
| Water | 24.1 parts by weight |

The thus obtained water-based paint exhibited a viscosity of 1,291 cP and a storage stability (ΔE* value) of 0.85.

Next, the thus prepared water-based paint was applied onto a cold-rolled steel plate (0.8 mm×70 mm×150 mm; JIS G-3141) and dried to form a coating film having a thickness of 150 μm. The obtained coating film showed a gloss of 95% and a light resistance (ΔE* value) of 2.61. As to the hue of the coating film, when measured by a portable spectrocolorimeter "COLOR-GUIDE 45/0" (manufactured by BYK CHEMIE JAPAN CO., LTD.), the L* value thereof was 65.45, the a* value thereof was −5.59 the b* value thereof was −29.38, and when measured by a multi-spectro-color-meter "MSC-IS-2D" (manufactured by SUGA TESTING MACHINES MANUFACTURING CO., LTD.), the L* value thereof was 65.76, the a* value thereof was −5.59 and the b* value thereof was −31.44.

Examples 11

<Production of Master Batch Pellets>

80.0 parts by weight of polyvinyl chloride resin particles 103EP8D (produced by NIPPON ZEON CO., LTD.) and 20.0 parts by weight of the composite particles obtained in Example 1 were kneaded at 160° C. using a twin-screw extruder, extruded therefrom, and then cut into pellets, thereby obtaining cylindrical master batch pellets having an average minor diameter of 3 mm and an average diameter of 3 mm.

<Production of Resin Composition>

25.0 parts by weight of the thus-obtained master batch pellets, 74.5 parts by weight of polyvinyl chloride resin particles 103EP8D (produced by NIPPON ZEON CO., LTD.) and 0.5 part by weight of calcium stearate were mixed together by a ribbon blender, thereby preparing a raw material for a colored resin plate.

Next, the thus-produced resin composition was interposed between a pair of surface-polished stainless steel plates, placed within a hot press heated to 180° C. and then subjected to a pressure molding while applying a pressure of 98,000 kPa (1 ton/cm$^2$) thereto, thereby obtaining a colored resin plate having a thickness of 1 mm. The thus-produced colored resin plate had a dispersing condition of rank 5 and a light resistance ($\Delta E^*$ value) of 2.84. As to the hue of the colored resin plate, when measured by a portable spectrocolorimeter "COLOR-GUIDE 45/0" (manufactured by BYK CHEMIE JAPAN CO., LTD.), the $L^*$ value thereof was 66.51, the $a^*$ value thereof was −5.72 and the $b^*$ value thereof was −28.92, and when measured by a multi-spectro-color-meter "MSC-IS-2D" (manufactured by SUGA TESTING MACHINES MANUFACTURING CO., LTD.), the $L^*$ value thereof was 66.80, the $a^*$ value thereof was −5.72 and the $b^*$ value thereof was −31.01.

Core Particles 1 to 7:

White inorganic particles as core particles 1 to 7 having properties shown in Table 1 were prepared.

Core Particles 8:

A slurry containing titanium oxide particles was obtained by dispersing 20 kg of titanium oxide particles (core particles 1) in 150 liters of water. The pH value of the thus obtained re-dispersed slurry containing the titanium oxide particles was adjusted to 10.5 by using an aqueous sodium hydroxide solution, and then the concentration of the solid content in the slurry was adjusted to 98 g/liter by adding water thereto. After 150 liters of the slurry was heated to 60° C., 5,444 ml of a 1.0 mol/liter sodium aluminate solution (corresponding to 1.0% by weight (calculated as Al) based on the weight of the titanium oxide particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the titanium oxide particles whose surface was coated with hydroxides of aluminum.

The essential production conditions are shown in Table 2, and various properties of the obtained surface-treated titanium oxide particles are shown in Table 3.

Core Particles 9 to 14:

The same procedure as defined for the production of the above core particles 8, was conducted except that the core particles 2 to 7 were respectively used instead of the core particles 1, and kinds and amounts of coating materials were changed variously, thereby obtaining white inorganic particles whose surface was coated with an intermediate coating layer.

The essential production conditions are shown in Table 2, and various properties of the obtained surface-treated white inorganic particles are shown in Table 3.

Meanwhile, in Tables, "A" and "S" as described in "kind of coating material used in surface-treating step" represent hydroxides of aluminum and oxides of silicon, respectively.

Organic Pigments:

Organic pigments having properties as shown in Table 4 were prepared.

Examples 12 to 27 and Comparative Examples 1 to 5

The same procedure as defined in Example 1 was conducted except that kinds of core particles, kinds and amounts of additives added in coating step with gluing agent, linear load and treating time for edge runner treatment used in the coating step with gluing agent, kinds and amounts of organic pigments adhered in organic pigment-adhering step, and linear load and treating time for edge runner treatment used in the organic pigment-adhering step, were changed variously, thereby obtaining organic and inorganic composite pigments.

The essential production conditions are shown in Table 5, and various properties of the obtained organic and inorganic composite pigments are shown in Table 6.

In Example 16, 100 g of the organic pigment R-1 was continuously added for 100 minutes.

In Example 17, the organic pigment Y-1 was added five times in an amount of 20 g each such that the total amount of the organic pigment Y-1 added was 100 g, and then the organic pigment Y-2 was added two times in an amount of 25 g each such that the total amount of the organic pigment Y-2 added was 50 g.

In Example 20, after 50 g of the organic pigment B-1 and 50 g of the organic pigment Y-1 were mixed together, 100 g of the resultant mixed pigment was continuously added for 200 minutes.

In Example 27, the organic pigment G-1 was added ten times in an amount of 15 g each such that the total amount of the organic pigment G-1 added was 150 g.

Primary Composite Particles 1 to 17:

The same procedure as defined in Example 5 was conducted except that kinds of core particles, kinds and amounts of additives added in coating step with gluing agent, linear load and treating time for edge runner treatment used in the coating step with gluing agent, kinds and amounts of organic pigments adhered in first colored adhesion layer-adhering step, and linear load and treating time for edge runner treatment used in the first colored adhesion layer-adhering step, were changed variously, thereby obtaining primary composite particles.

The essential production conditions are shown in Table 7.

In the primary pigment 2, the organic pigment Y-1 was added six times in an amount of 20 g each such that the total amount of the organic pigment Y-1 added was 120 g.

In the primary pigment 6, 150 g of the organic pigment Y-1 was continuously added for 150 minutes.

In the primary pigment 8, 100 g of the organic pigment R-1 was continuously added for 150 minutes.

In the primary pigment 10, the organic pigment Y-1 was added ten times in an amount of 15 g each such that the total amount of the organic pigment Y-1 added was 150 g.

Examples 28 to 55 and Comparative Examples 6 to 16

The same procedure as defined in Example 5 was conducted except that kinds of primary composite particles, kinds and amounts of additives added in coating step with gluing agent, linear load and treating time for edge runner treatment used in the coating step with gluing agent, kinds and amounts of organic pigments adhered in second colored adhesion layer-adhering step, and linear load and treating time for edge runner treatment used in the second colored adhesion layer-adhering step, were changed variously, thereby obtaining composite particles.

The essential production conditions are shown in Tables 8 to 10, and various properties of the obtained composite particles are shown in Tables 11 to 13.

In Example 34, the organic pigment B-2 was added three times in an amount of 25 g each such that the total amount of the organic pigment B-2 added was 75 g.

In Example 38, 100 g of the organic pigment B-2 was continuously added for 100 minutes.

In Example 40, 100 g of the organic pigment R-2 was continuously added for 100 minutes.

In Example 43, the organic pigment B-1 was added six times in an amount of 20 g each such that the total amount of the organic pigment B-1 added was 120 g.

In Example 44, 150 g of the organic pigment Y-2 was continuously added for 150 minutes.

In Example 45, the organic pigment Y-1 was added four times in an amount of 20 g each such that the total amount of the organic pigment Y-1 added was 80 g.

In Example 48, 200 g of the organic pigment Y-2 was continuously added for 200 minutes.

Examples 56 to 99 and Comparative Examples 17 to 40

The same procedure as defined in Example 2 was conducted except that kinds of composite particles were changed variously, thereby obtaining solvent-based paints.

Various properties of the obtained solvent-based paints and various properties of coating films obtained therefrom are shown in Tables 14 to 18.

Examples 100 to 133

The same procedure as defined in Example 9 was conducted except that kinds of composite particles, and kinds and amounts of resins and solvents contained in pigment dispersion base material, were changed variously, thereby obtaining solvent-based pigment dispersions.

The essential production conditions are shown in Tables 19 and 20.

Examples 134 to 153

The same procedure as defined in Example 9 was conducted except that kinds and amounts of solvent-based pigment dispersions, resins and solvents were changed variously, thereby obtaining solvent-based paints.

The essential production conditions are shown in Tables 21 and 22, and various properties of the obtained solvent-based paints and various properties of coating films obtained from the paints are shown in Tables 23 and 24.

Examples 154 to 197 and Comparative Examples 41 to 64

The same procedure as defined in Example 3 was conducted except that kinds of composite particles were changed variously, thereby obtaining water-based paints.

Various properties of the obtained water-based paints and various properties of coating films obtained from the paints are shown in Tables 25 to 29.

Examples 198 to 235

The same procedure as defined in Example 10 was conducted except that kinds of composite particles, and kinds and amounts of resins and solvents contained in water-based pigment dispersion base material, were changed variously, thereby obtaining water-based pigment dispersions.

The essential production conditions are shown in Tables 30 and 31.

Examples 236 to 255

The same procedure as defined in Example 10 was conducted except that kinds and amounts of water-based pigment dispersions, resins and solvents were changed variously, thereby obtaining water-based paints.

The essential production conditions are shown in Tables 32 and 33, and various properties of the obtained water-based paints and various properties of coating films obtained from the paints are shown in Tables 34 and 35.

Examples 256 to 299 and Comparative Examples 65 to 88

The same procedure as defined in Example 4 was conducted except that kinds of composite particles were changed variously, thereby obtaining resin compositions.

The essential production conditions and various properties of the obtained resin compositions are shown in Tables 36 to 40.

Examples 300 to 331

The same procedure as defined in Example 11 was conducted except that kinds of composite particles and kinds and amounts of resins were changed variously, thereby obtaining master batch pellets.

The essential production conditions are shown in Tables 41 and 42.

Examples 332 to 351

The same procedure as defined in Example 11 was conducted except that kinds of master batch pellets and kinds and amounts of resins were changed variously, thereby obtaining resin compositions.

The essential production conditions are shown in Table 43, and various properties of the obtained resin compositions are shown in Tables 44 and 45.

TABLE 1

| Kind of core particles | | | | BET specific | Properties of white inorganic particles | | | | | | | | | Light |
|---|---|---|---|---|---|---|---|---|---|---|---|---|---|---|
| | | | | | Hue | | | | | | | | resist- | ance |
| | | | Average particle size (μm) | surface area value (m²/g) | L* value[1] (-) | a* value[1] (-) | b* value[1] (-) | C* value[1] (-) | L* value[2] (-) | a* value[2] (-) | b* value[2] (-) | C* value[2] (-) | Hiding power (cm²/g) | (ΔE* value) (-) |
| | Kind | Shape | | | | | | | | | | | | |
| Core particles 1 | Titanium oxide | Granular | 0.25 | 10.3 | 94.43 | −0.58 | 3.25 | 3.30 | 96.63 | −0.58 | −0.69 | 0.90 | 1,560 | 6.15 |
| Core particles 2 | Titanium oxide | Granular | 0.008 | 59.3 | 92.15 | 0.32 | 5.67 | 5.68 | 94.43 | 0.32 | 1.26 | 1.30 | 320 | 7.31 |
| Core particles 3 | Zinc oxide | Granular | 0.18 | 18.3 | 88.83 | −2.14 | 8.37 | 8.64 | 90.27 | −2.14 | 4.13 | 4.65 | 730 | 5.86 |
| Core particles 4 | Silica | Spherical | 0.021 | 196.2 | 91.06 | 0.11 | 4.62 | 4.62 | 93.12 | 0.11 | 0.26 | 0.28 | 6 | 5.21 |
| Core particles 5 | Silica | Spherical | 0.005 | 312.6 | 90.26 | 0.12 | 5.72 | 5.72 | 92.16 | 0.12 | 1.31 | 1.32 | 6 | 5.46 |
| Core particles 6 | Precipitated barium sulfate | Granular | 0.059 | 21.3 | 89.80 | 0.31 | 5.43 | 5.44 | 91.62 | 0.31 | 1.03 | 1.08 | 13 | 5.92 |
| Core particles 7 | Pearl mica | Plate-shaped | 8.23 | 5.8 | 86.53 | 1.65 | 6.23 | 6.44 | 87.71 | 1.65 | 2.12 | 2.69 | 280 | 9.11 |

(Note)[1]: Measured by a portable spectrocolorimeter "COLOR-GUIDE 45/0" (manufactured by BYK CHEMIE JAPAN CO., LTD.)
(Note)[2]: Measured by a multi-spectro-colour-meter "MSC-IS-2D" (manufactured by SUGA TESTING MACHINES MANUFACTURING CO., LTD.)

TABLE 2

| Core particles | Kind of core particles | Surface-treating step Additives | | | Surface-treating step Coating material | | |
|---|---|---|---|---|---|---|---|
| | | Kind | Calculated as | Amount (wt. %) | Kind | Calculated as | Amount (wt. %) |
| Core particles 8 | Core particles 1 | Sodium aluminate | Al | 1.0 | A | Al | 0.98 |
| Core particles 9 | Core particles 2 | Water glass #3 | SiO₂ | 1.0 | S | SiO₂ | 0.98 |
| Core particles 10 | Core particles 3 | Sodium aluminate | Al | 2.0 | A | Al | 1.96 |
| Core particles 11 | Core particles 4 | Sodium aluminate | Al | 0.5 | A | Al | 0.49 |
| Core particles 12 | Core particles 5 | Aluminum sulfate | Al | 2.0 | A | Al | 1.96 |
| Core particles 13 | Core particles 6 | Sodium aluminate Water glass #3 | Al SiO₂ | 2.0 0.5 | A S | Al SiO₂ | 1.93 0.47 |
| Core particles 14 | Core particles 7 | Aluminum sulfate | Al | 0.5 | A | Al | 0.50 |

TABLE 3

| Kind of core particles | Properties of surface-treated white inorganic particles | |
|---|---|---|
| | Average particle size (μm) | BET specific surface area value (m²/g) |
| Core particles 8 | 0.25 | 12.1 |
| Core particles 9 | 0.008 | 61.2 |
| Core particles 10 | 0.18 | 18.6 |
| Core particles 11 | 0.022 | 186.3 |
| Core particles 12 | 0.005 | 296.4 |
| Core particles 13 | 0.061 | 21.9 |
| Core particles 14 | 8.23 | 5.6 |

| Kind of core particles | Properties of surface-treated white inorganic particles Hue | | | |
|---|---|---|---|---|
| | $L^*$ value[1] (-) | $a^*$ value[1] (-) | $b^*$ value[1] (-) | $c^*$ value[1] (-) |
| Core particles 8 | 94.31 | −0.46 | 3.41 | 3.44 |
| Core particles 9 | 91.90 | 0.56 | 5.93 | 5.96 |
| Core particles 10 | 88.31 | −1.86 | 9.36 | 9.54 |
| Core particles 11 | 90.95 | 0.09 | 4.46 | 4.46 |
| Core particles 12 | 90.11 | 0.11 | 5.84 | 5.84 |
| Core particles 13 | 89.30 | 0.44 | 5.20 | 5.21 |
| Core particles 14 | 86.71 | 1.46 | 5.89 | 6.07 |

| Kind of core particles | Properties of surface-treated white inorganic particles Hue | | | |
|---|---|---|---|---|
| | $L^*$ value[2] (μm) | $a^*$ value[2] (-) | $b^*$ value[2] (-) | $C^*$ value[2] (-) |
| Core particles 8 | 96.49 | −0.46 | −0.54 | 0.71 |
| Core particles 9 | 94.13 | 0.56 | 1.51 | 1.61 |
| Core particles 10 | 89.69 | −1.86 | 5.07 | 5.40 |
| Core particles 11 | 92.99 | 0.09 | 0.11 | 0.14 |
| Core particles 12 | 91.99 | 0.11 | 1.42 | 1.42 |
| Core particles 13 | 91.03 | 0.44 | 0.81 | 0.92 |
| Core particles 14 | 87.91 | 1.46 | 1.80 | 2.32 |

| Kind of core particles | Properties of surface-treated white inorganic particles | |
|---|---|---|
| | Hiding power (cm²/g) | Light resistance (ΔE* value) (-) |
| Core particles 8 | 1,480 | 5.86 |
| Core particles 9 | 310 | 7.01 |
| Core particles 10 | 710 | 5.12 |
| Core particles 11 | 6 | 5.06 |
| Core particles 12 | 6 | 5.13 |
| Core particles 13 | 14 | 5.32 |
| Core particles 14 | 260 | 8.71 |

(Note)[1] Measured by a portable spectrocolorimeter "COLOR-GUIDE 45/0"(manufactured by BYK CHEMIE JAPAN CO., LTD.)
(Note)[2] Measured by a multi-spectro-colour-meter "MSC-IS-2D"(manufactured by SUGA TESTING MACHINES MANUFACTURING CO., LTD.)

TABLE 4

| Organic pigment | Properties of organic pigment Kind |
|---|---|
| Organic pigment B-1 | Pigment blue (phthalocyanine-based pigment) |
| Organic pigment B-2 | Pigment blue (phthalocyanine-based pigment) |
| Organic pigment G-1 | Pigment green (phthalocyanine-based pigment) |
| Organic pigment R-1 | Pigment red (quinacridone-based pigment) |
| Organic pigment R-2 | Pigment red (quinacridone-based pigment) |
| Organic pigment R-3 | Pigment red (azo-based pigment) |
| Organic pigment Y-1 | Pigment yellow (azo-based pigment) |
| Organic pigment Y-2 | Pigment yellow (azo-based pigment) |

| Organic pigment | Properties of organic pigment | | | |
|---|---|---|---|---|
| | Particle shape | Average particle size (μm) | BET specific surface area value (m²/g) | Hiding power (cm²/g) |
| Organic pigment B-1 | Granular | 0.06 | 71.6 | 240 |
| Organic pigment B-2 | Granular | 0.08 | 56.3 | 272 |
| Organic pigment G-1 | Granular | 0.06 | 60.5 | 210 |
| Organic pigment R-1 | Granular | 0.58 | 19.3 | 480 |
| Organic pigment R-2 | Granular | 0.50 | 21.6 | 220 |
| Organic pigment R-3 | Granular | 0.55 | 18.6 | 380 |
| Organic pigment Y-1 | Granular | 0.73 | 10.5 | 320 |
| Organic pigment Y-2 | Granular | 0.65 | 12.3 | 280 |

| Organic pigment | Properties of organic pigment Hue | | |
|---|---|---|---|
| | $L^*$ value[1] (-) | $a^*$ value[1] (-) | $b^*$ value[1] (-) |
| Organic pigment B-1 | 5.20 | 9.14 | −21.84 |
| Organic pigment B-2 | 6.00 | 11.60 | −23.56 |
| Organic pigment G-1 | 12.29 | −18.31 | −3.40 |
| Organic pigment R-1 | 32.77 | 51.88 | 25.80 |

TABLE 4-continued

| | | | |
|---|---|---|---|
| Organic pigment R-2 | 21.03 | 58.26 | 26.02 |
| Organic pigment R-3 | 35.18 | 49.18 | 25.14 |
| Organic pigment Y-1 | 66.51 | 0.78 | 79.25 |
| Organic pigment Y-2 | 68.30 | 0.65 | 80.99 |

| | Properties of organic pigment | | | |
|---|---|---|---|---|
| | Hue | | | Light |
| Organic pigment | $L^*$ value[2] (-) | $a^*$ value[2] (-) | $b^*$ value[2] (-) | resistance ($\Delta E^*$ value) (-) |
| Organic pigment B-1 | 17.70 | 9.72 | −23.44 | 10.84 |
| Organic pigment B-2 | 17.32 | 11.60 | −26.53 | 10.21 |
| Organic pigment G-1 | 21.83 | −18.31 | −7.36 | 9.63 |
| Organic pigment R-1 | 36.99 | 51.88 | 20.57 | 14.65 |
| Organic pigment R-2 | 28.30 | 58.26 | 20.61 | 16.36 |
| Organic pigment R-3 | 39.31 | 49.18 | 19.77 | 18.60 |
| Organic pigment Y-1 | 66.80 | 0.78 | 70.92 | 17.33 |
| Organic pigment Y-2 | 68.58 | 0.65 | 72.86 | 19.65 |

(Note)[1] Measured by a portable spectrocolorimeter "COLOR-GUIDE 45/0"(manufactured by BYK CHEMIE JAPAN CO., LTD.)
(Note)[2] Measured by a multi-spectro-colour-meter "MSC-IS-2D"(manufactured by SUGA TESTING MACHINES MANUFACTURING CO., LTD.)

TABLE 5

| Examples and Comparative Examples | Kind of core particles |
|---|---|
| Example 12 | Core particles 1 |
| Example 13 | Core particles 2 |
| Example 14 | Core particles 3 |
| Example 15 | Core particles 4 |
| Example 16 | Core particles 5 |
| Example 17 | Core particles 6 |
| Example 18 | Core particles 7 |
| Example 19 | Core particles 8 |
| Example 20 | Core particles 9 |
| Example 21 | Core particles 10 |
| Example 22 | Core particles 11 |
| Example 23 | Core particles 12 |
| Example 24 | Core particles 13 |
| Example 25 | Core particles 14 |
| Example 26 | Core particles 1 |
| Example 27 | Core particles 6 |
| Comparative Example 1 | Core particles 1 |
| Comparative Example 2 | Core particles 1 |
| Comparative Example 3 | Core particles 1 |
| Comparative Example 4 | Core particles 1 |
| Comparative Example 5 | Core particles 4 |

TABLE 5-continued

| | Production of composite particles Coating step with gluing agent Additives | |
|---|---|---|
| Examples and Comparative Examples | Kind | Amount added (wt. part) |
| Example 12 | Methyl triethoxysilane | 0.5 |
| Example 13 | Isopropyltriisostearoyl titanate | 1.0 |
| Example 14 | Methyl triethoxysilane | 1.0 |
| Example 15 | Methyl triethoxysilane | 2.0 |
| Example 16 | Methyl hydrogen polysiloxane | 2.0 |
| Example 17 | Dimethyl dimethoxysilane | 4.0 |
| Example 18 | Phenyl triethoxysilane | 1.0 |
| Example 19 | Methyl trimethoxysilane | 2.0 |
| Example 20 | Polyvinyl alcohol | 1.0 |
| Example 21 | Methyl trimethoxysilane | 1.0 |
| Example 22 | γ-aminopropyl triethoxysilane | 5.0 |
| Example 23 | Polyvinyl alcohol | 1.0 |
| Example 24 | γ-aminopropyl triethoxysilane | 2.0 |
| Example 25 | Methyl hydrogen polysiloxane | 0.5 |
| Example 26 | γ-aminopropyl triethoxysilane | 1.0 |
| Example 27 | Methyl hydrogen polysiloxane | 1.0 |
| Comparative Example 1 | — | — |
| Comparative Example 2 | Methyl triethoxysilane | 1.0 |
| Comparative Example 3 | Methyl triethoxysilane | 0.005 |
| Comparative Example 4 | Methyl triethoxysilane | 1.0 |
| Comparative Example 5 | Methyl triethoxysilane | 1.0 |

| | Production of composite particles Coating step with gluing agent | | | |
|---|---|---|---|---|
| | Edge runner treatment | | Coating amount | |
| Examples and Comparative Examples | Linear load (N/cm) | Linear load (Kg/cm) | Time (min.) | Calculated as Si (wt. %) | Calculated as C (wt. %) |
| Example 12 | 588 | 60 | 20 | 0.08 | — |
| Example 13 | 294 | 30 | 30 | — | 0.74 |
| Example 14 | 588 | 60 | 20 | 0.15 | — |
| Example 15 | 588 | 60 | 30 | — | 0.13 |
| Example 16 | 588 | 60 | 20 | — | 0.53 |
| Example 17 | 735 | 75 | 20 | 0.89 | — |
| Example 18 | 441 | 45 | 30 | 0.14 | — |
| Example 19 | 588 | 60 | 20 | 0.40 | — |
| Example 20 | 294 | 30 | 30 | — | 0.54 |
| Example 21 | 588 | 60 | 20 | 0.20 | — |
| Example 22 | 735 | 75 | 30 | — | 0.77 |
| Example 23 | 588 | 60 | 30 | — | 0.54 |
| Example 24 | 588 | 60 | 30 | 0.25 | — |
| Example 25 | 441 | 45 | 30 | 0.21 | — |
| Example 26 | 588 | 60 | 20 | 0.12 | — |
| Example 27 | 588 | 60 | 30 | 0.42 | — |
| Comparative Example 1 | — | — | — | — | — |
| Comparative Example 2 | 588 | 60 | 20 | 0.15 | — |
| Comparative Example 3 | 588 | 60 | 20 | $6 \times 10^4$ | — |
| Comparative Example 4 | 588 | 60 | 20 | 0.15 | — |
| Comparative Example 5 | 588 | 60 | 30 | — | $4 \times 10^3$ |

TABLE 5-continued

Production of composite particles
Adhesion step with organic pigment
Organic pigment

| Examples and Comparative Examples | Kind | Amount adhered (wt. part) | Kind | Amount adhered (wt. part) |
|---|---|---|---|---|
| Example 12 | R-1 | 10.0 | — | — |
| Example 13 | R-1 | 50.0 | Y-1 | 30.0 |
| Example 14 | B-1 | 5.0 | — | — |
| Example 15 | B-1 | 50.0 | — | — |
| Example 16 | R-1 | 100.0 | — | — |
| Example 17 | Y-1 | 100.0 | Y-2 | 50.0 |
| Example 18 | Y-1 | 10.0 | — | — |
| Example 19 | R-1 | 30.0 | — | — |
| Example 20 | B-1 | 50.0 | Y-1 | 50.0 |
| Example 21 | B-1 | 30.0 | — | — |
| Example 22 | B-1 | 100.0 | — | — |
| Example 23 | R-1 | 40.0 | B-1 | 20.0 |
| Example 24 | G-1 | 50.0 | — | — |
| Example 25 | Y-1 | 10.0 | — | — |
| Example 26 | B-1 | 10.0 | — | — |
| Example 27 | G-1 | 150.0 | — | — |
| Comparative Example 1 | B-1 | 10.0 | — | — |
| Comparative Example 2 | — | — | — | — |
| Comparative Example 3 | B-1 | 10.0 | — | — |
| Comparative Example 4 | B-1 | 0.1 | — | — |
| Comparative Example 5 | B-1 | 750.0 | — | — |

Production of composite particles
Adhesion step with organic pigment

| Examples and Comparative Examples | Edge runner treatment Linear load (N/cm) | Edge runner treatment Linear load (Kg/cm) | Time (min.) | Amount adhered (calculated as C) (wt. %) |
|---|---|---|---|---|
| Example 12 | 588 | 60 | 20 | 6.96 |
| Example 13 | 441 | 45 | 75 | 30.66 |
| Example 14 | 588 | 60 | 30 | 3.12 |
| Example 15 | 588 | 60 | 60 | 22.14 |
| Example 16 | 441 | 45 | 90 | 38.41 |
| Example 17 | 735 | 75 | 240 | 33.88 |
| Example 18 | 588 | 60 | 20 | 4.80 |
| Example 19 | 588 | 60 | 20 | 17.71 |
| Example 20 | 588 | 60 | 90 | 30.74 |
| Example 21 | 735 | 75 | 20 | 15.33 |
| Example 22 | 735 | 75 | 90 | 33.19 |
| Example 23 | 588 | 60 | 60 | 27.37 |
| Example 24 | 588 | 60 | 60 | 11.97 |
| Example 25 | 588 | 60 | 20 | 4.82 |
| Example 26 | 588 | 60 | 300 | 5.98 |
| Example 27 | 588 | 60 | 210 | 21.65 |
| Comparative Example 1 | 588 | 60 | 20 | 5.98 |
| Comparative Example 2 | — | — | — | — |
| Comparative Example 3 | 588 | 60 | 20 | 6.00 |
| Comparative Example 4 | 588 | 60 | 20 | 0.06 |
| Comparative Example 5 | 588 | 60 | 30 | 58.53 |

TABLE 6

| Examples and Comparative Examples | Properties of composite particles Average particle size (μm) | Properties of composite particles BET specific surface area value (m$^2$/g) |
|---|---|---|
| Example 12 | 0.25 | 15.6 |
| Example 13 | 0.010 | 56.1 |
| Example 14 | 0.18 | 18.6 |
| Example 15 | 0.023 | 121.2 |
| Example 16 | 0.009 | 243.2 |
| Example 17 | 0.066 | 15.3 |
| Example 18 | 8.23 | 13.2 |
| Example 19 | 0.26 | 18.3 |
| Example 20 | 0.010 | 53.8 |
| Example 21 | 0.19 | 21.2 |
| Example 22 | 0.026 | 115.4 |
| Example 23 | 0.008 | 241.2 |
| Example 24 | 0.063 | 20.7 |
| Example 25 | 8.23 | 13.6 |
| Example 26 | 0.25 | 12.6 |
| Example 27 | 0.067 | 24.1 |
| Comparative Example 1 | 0.25 | 16.5 |
| Comparative Example 2 | 0.25 | 10.1 |
| Comparative Example 3 | 0.25 | 15.9 |
| Comparative Example 4 | 0.25 | 12.1 |
| Comparative Example 5 | 0.033 | 81.6 |

| Examples and Comparative Examples | Properties of composite particles Hue L* value[1] (-) | Properties of composite particles Hue a* value[1] (-) | Properties of composite particles Hue b* value[1] (-) |
|---|---|---|---|
| Example 12 | 54.65 | 47.89 | -0.06 |
| Example 13 | 51.64 | 31.26 | 25.78 |
| Example 14 | 64.62 | -6.42 | -29.62 |
| Example 15 | 11.58 | 8.60 | -18.04 |
| Example 16 | 55.57 | 48.32 | 23.96 |
| Example 17 | 80.08 | 2.13 | 76.21 |
| Example 18 | 81.06 | 1.36 | 87.56 |
| Example 19 | 44.28 | 54.22 | 6.85 |
| Example 20 | 33.97 | 18.59 | -6.85 |
| Example 21 | 31.63 | -7.64 | -31.96 |
| Example 22 | 10.59 | 8.80 | -18.59 |
| Example 23 | 51.78 | 38.83 | -0.11 |
| Example 24 | 16.84 | -15.82 | -11.84 |
| Example 25 | 81.32 | 1.16 | 86.32 |
| Example 26 | 11.57 | 2.13 | -10.49 |
| Example 27 | 14.63 | -14.34 | -10.82 |
| Comparative Example 1 | 56.52 | -2.68 | -24.65 |
| Comparative Example 2 | 91.32 | -0.32 | 2.86 |
| Comparative Example 3 | 55.33 | -2.56 | -25.12 |
| Comparative Example 4 | 73.26 | -0.14 | -3.84 |
| Comparative Example 5 | 7.07 | 9.46 | -19.88 |

| Examples and Comparative Examples | Properties of composite particles Hue L* value[2] (-) | Properties of composite particles Hue a* value[2] (-) | Properties of composite particles Hue b* value[2] (-) |
|---|---|---|---|
| Example 12 | 55.54 | 47.89 | -3.81 |
| Example 13 | 53.14 | 31.26 | 20.38 |
| Example 14 | 64.95 | -6.42 | -31.67 |
| Example 15 | 21.32 | 8.60 | -21.28 |
| Example 16 | 56.63 | 48.32 | 18.65 |
| Example 17 | 80.66 | 2.13 | 68.32 |
| Example 18 | 81.76 | 1.36 | 78.75 |

TABLE 6-continued

| | | | |
|---|---|---|---|
| Example 19 | 46.39 | 54.22 | 2.70 |
| Example 20 | 38.34 | −18.59 | −10.64 |
| Example 21 | 36.10 | −7.64 | −33.87 |
| Example 22 | 20.60 | 8.80 | −21.80 |
| Example 23 | 53.26 | 38.83 | −4.23 |
| Example 24 | 25.29 | −15.82 | −15.39 |
| Example 25 | 82.04 | 1.16 | 77.58 |
| Example 26 | 21.31 | 2.13 | −14.10 |
| Example 27 | 23.78 | −14.34 | −14.42 |
| Comparative Example 1 | 59.26 | −2.68 | −26.98 |
| Comparative Example 2 | 93.08 | −0.32 | −1.06 |
| Comparative Example 3 | 56.16 | −2.56 | −27.43 |
| Comparative Example 4 | 73.58 | −0.14 | −7.37 |
| Comparative Example 5 | 18.08 | 9.46 | −23.03 |

| Examples and Comparative Examples | Properties of composite particles | |
|---|---|---|
| | Tinting strength (%) | Hiding power (cm$^2$/g) |
| Example 12 | 164 | 1,520 |
| Example 13 | 208 | 490 |
| Example 14 | 138 | 760 |
| Example 15 | 138 | 520 |
| Example 16 | 173 | 500 |
| Example 17 | 158 | 480 |
| Example 18 | 129 | 320 |
| Example 19 | 193 | 1,490 |
| Example 20 | 200 | 510 |
| Example 21 | 216 | 730 |
| Example 22 | 164 | 560 |
| Example 23 | 163 | 480 |
| Example 24 | 146 | 460 |
| Example 25 | 132 | 360 |
| Example 26 | 150 | 1,540 |
| Example 27 | 176 | 560 |
| Comparative Example 1 | 100 | 1,430 |
| Comparative Example 2 | — | 1,480 |
| Comparative Example 3 | 109 | 1,460 |
| Comparative Example 4 | — | 1,470 |
| Comparative Example 5 | 208 | 620 |

| Examples and Comparative Examples | Properties of composite particles | | |
|---|---|---|---|
| | Light resistance (ΔE* value) (-) | Desorption percentage of organic pigment (%) | Degree of desorption of organic pigment (-) |
| Example 12 | 2.43 | 4.3 | — |
| Example 13 | 2.24 | 6.8 | — |
| Example 14 | 2.13 | 2.1 | — |
| Example 15 | 1.23 | — | 5 |
| Example 16 | 1.36 | — | 4 |
| Example 17 | 2.17 | 7.5 | — |
| Example 18 | 2.96 | 4.6 | — |
| Example 19 | 1.74 | 2.6 | — |
| Example 20 | 1.94 | 8.3 | — |
| Example 21 | 1.25 | 0.8 | — |
| Example 22 | 1.03 | — | 4 |
| Example 23 | 1.30 | — | 5 |
| Example 24 | 2.05 | 4.5 | — |
| Example 25 | 2.59 | 0.6 | — |
| Example 26 | 2.31 | 4.4 | — |
| Example 27 | 1.98 | 8.8 | — |
| Comparative Example 1 | 6.86 | 83.2 | — |
| Comparative Example 2 | 6.20 | — | — |
| Comparative Example 3 | 6.53 | 78.2 | — |
| Comparative Example 4 | 6.48 | — | — |
| Comparative Example 5 | 6.7 | — | 2 |

(Note)[1]:Measured by a portable spectrocolorimeter "COLOR-GUIDE 45/0"(manufactured by BYK CHEMIE JAPAN CO., LTD.)
(Note)[2]:Measured by a multi-spectro-colour-meter "MSC-IS-2D"(manufactured by SUGA TESTING MACHINES MANUFACTURING CO., LTD.)

TABLE 7

| Primary composite particles | Kind of core particles | Production of primary composite particles Coating step with gluing agent Additives | |
|---|---|---|---|
| | | Kind | Amount added (wt. part) |
| Primary composite particles 1 | Core particles 1 | Methyl triethoxysilane | 2.0 |
| Primary composite particles 2 | Core particles 2 | Isopropyltriisostearoyl titanate | 1.0 |
| Primary composite particles 3 | Core particles 3 | Methyl trimethoxysilane | 4.0 |
| Primary composite particles 4 | Core particles 4 | Methyl hydrogen polysiloxane | 5.0 |
| Primary composite particles 5 | Core particles 5 | γ-aminopropyl triethoxysilane | 0.5 |
| Primary composite particles 6 | Core particles 6 | Phenyl triethoxysilane | 1.5 |
| Primary composite particles 7 | Core particles 7 | Methyl hydrogen polysiloxane | 1.0 |
| Primary composite particles 8 | Core particles 8 | Methyl triethoxysilane | 3.0 |
| Primary composite particles 9 | Core particles 9 | Polyvinyl alcohol | 1.0 |
| Primary composite particles 10 | Core particles 10 | Methyl trimethoxysilane | 1.5 |
| Primary composite particles 11 | Core particles 11 | Methyl triethoxysilane | 1.5 |
| Primary composite particles 12 | Core particles 12 | Polyvinyl alcohol | 1.0 |
| Primary composite particles 13 | Core particles 13 | γ-aminopropyl triethoxysilane | 0.5 |
| Primary composite particles 14 | Core particles 14 | Methyl hydrogen polysiloxane | 2.0 |
| Primary composite particles 15 | Core particles 1 | — | — |
| Primary composite particles 16 | Core particles 1 | Methyl triethoxysilane | 0.005 |
| Primary composite particles 17 | Core particles 1 | Methyl triethoxysilane | 1.0 |

| Primary composite particles | Production of primary composite particles Coating step with gluing agent | | | |
|---|---|---|---|---|
| | Edge runner treatment | | Coating amount | |
| | Linear load | Time | Calculated as Si | Calculated as C |
| | (N/cm) (Kg/cm) | (min.) | (wt. %) | (wt. %) |
| Primary composite particles 1 | 392  40 | 20 | 0.30 | — |

TABLE 7-continued

| Primary composite particles | | | | | |
|---|---|---|---|---|---|
| Primary composite particles 2 | 588 | 60 | 30 | — | 0.74 |
| Primary composite particles 3 | 392 | 40 | 30 | 0.79 | — |
| Primary composite particles 4 | 588 | 60 | 20 | — | 1.30 |
| Primary composite particles 5 | 588 | 60 | 30 | — | 0.08 |
| Primary composite particles 6 | 588 | 60 | 20 | 0.20 | — |
| Primary composite particles 7 | 392 | 40 | 40 | 0.42 | — |
| Primary composite particles 8 | 784 | 80 | 50 | 0.45 | — |
| Primary composite particles 9 | 588 | 60 | 30 | — | 0.54 |
| Primary composite particles 10 | 588 | 60 | 60 | 0.30 | — |
| Primary composite particles 11 | 588 | 60 | 30 | — | 0.10 |
| Primary composite particles 12 | 588 | 60 | 60 | — | 0.54 |
| Primary composite particles 13 | 588 | 60 | 30 | 0.06 | — |
| Primary composite particles 14 | 588 | 60 | 40 | 0.83 | — |
| Primary composite particles 15 | — | — | — | — | — |
| Primary composite particles 16 | 588 | 60 | 30 | $6 \times 10^{-4}$ | — |
| Primary composite particles 17 | 588 | 60 | 30 | 0.15 | — |

Production of primary composite particles
Adhesion step with first colored adhesion layer
Organic pigment

| Primary composite particles | Kind | Amount adhered (wt. part) |
|---|---|---|
| Primary composite particles 1 | B-1 | 20.0 |
| Primary composite particles 2 | Y-1 | 120.0 |
| Primary composite particles 3 | R-1 | 40.0 |
| Primary composite particles 4 | B-1 | 100.0 |
| Primary composite particles 5 | R-1 | 50.0 |
| Primary composite particles 6 | Y-1 | 150.0 |
| Primary composite particles 7 | B-1 | 80.0 |
| Primary composite particles 8 | R-1 | 100.0 |
| Primary composite particles 9 | G-1 | 50.0 |
| Primary composite particles 10 | Y-1 | 150.0 |
| Primary composite particles 11 | B-1 | 50.0 |
| Primary composite particles 12 | Y-1 | 100.0 |
| Primary composite particles 13 | R-3 | 30.0 |
| Primary composite particles 14 | Y-1 | 50.0 |
| Primary composite particles 15 | Y-1 | 10.0 |
| Primary composite particles 16 | Y-1 | 10.0 |
| Primary composite particles 17 | Y-1 | 0.1 |

TABLE 7-continued

Production of primary composite particles
Adhesion step with first colored adhesion layer

| | Edge runner treatment | | | Amount adhered (calculated |
|---|---|---|---|---|
| Primary composite particles | Linear load (N/cm) | (Kg/cm) | Time (min.) | as C) (wt. %) |
| Primary composite particles 1 | 588 | 60 | 60 | 11.04 |
| Primary composite particles 2 | 588 | 60 | 180 | 30.81 |
| Primary composite particles 3 | 784 | 80 | 60 | 21.89 |
| Primary composite particles 4 | 588 | 60 | 120 | 33.15 |
| Primary composite particles 5 | 392 | 40 | 60 | 25.54 |
| Primary composite particles 6 | 588 | 60 | 120 | 33.89 |
| Primary composite particles 7 | 784 | 80 | 180 | 29.43 |
| Primary composite particles 8 | 588 | 60 | 360 | 38.26 |
| Primary composite particles 9 | 490 | 50 | 120 | 11.93 |
| Primary composite particles 10 | 588 | 60 | 300 | 31.88 |
| Primary composite particles 11 | 588 | 60 | 30 | 22.06 |
| Primary composite particles 12 | 294 | 30 | 60 | 28.29 |
| Primary composite particles 13 | 588 | 60 | 60 | 13.37 |
| Primary composite particles 14 | 784 | 80 | 90 | 17.62 |
| Primary composite particles 15 | 588 | 60 | 60 | 4.71 |
| Primary composite particles 16 | 588 | 60 | 60 | 4.73 |
| Primary composite particles 17 | 588 | 60 | 60 | 0.04 |

TABLE 8

Production of composite particles
Coating step with gluing agent
Additives

| Examples | Kind of primary composite particles | Kind | Amount added (wt. part) |
|---|---|---|---|
| Example 28 | Primary composite particles 1 | Methyl triethoxysilane | 3.0 |
| Example 29 | Primary composite particles 2 | Isopropyltriiso-stearoyl titanate | 1.0 |
| Example 30 | Primary composite particles 3 | Methyl trimethoxysilane | 5.0 |
| Example 31 | Primary composite particles 4 | Methyl triethoxysilane | 2.0 |
| Example 32 | Primary composite particles 5 | Methyl hydrogen polysiloxane | 1.0 |

TABLE 8-continued

| | | | |
|---|---|---|---|
| Example 33 | Primary composite particles 6 | Polyvinyl alcohol | 3.0 |
| Example 34 | Primary composite particles 7 | Methyl hydrogen polysiloxane | 2.0 |
| Example 35 | Primary composite particles 8 | Methyl triethoxysilane | 3.5 |
| Example 36 | Primary composite particles 9 | Methyl triethoxysilane | 1.5 |
| Example 37 | Primary composite particles 10 | Methyl trimethoxysilane | 1.0 |
| Example 38 | Primary composite particles 11 | Methyl triethoxysilane | 0.5 |
| Example 39 | Primary composite particles 12 | γ-aminopropyl triethoxysilane | 0.5 |
| Example 40 | Primary composite particles 13 | Dimethyl dimethoxysilane | 1.0 |
| Example 41 | Primary composite particles 14 | Methyl hydrogen polysiloxane | 1.0 |

Production of composite particles
Coating step with gluing agent

| | Edge runner treatment | | Coating amount | |
|---|---|---|---|---|
| | Linear load | Time | Calculated as Si | Calculated as C |
| Examples | (N/cm) | (Kg/cm) | (min.) | (wt. %) | (wt. %) |
| Example 28 | 588 | 60 | 30 | 0.45 | — |
| Example 29 | 588 | 60 | 30 | — | 0.74 |
| Example 30 | 294 | 30 | 20 | 0.97 | — |
| Example 31 | 441 | 45 | 60 | — | 0.13 |
| Example 32 | 588 | 60 | 30 | — | 0.26 |
| Example 33 | 294 | 30 | 60 | — | 1.55 |
| Example 34 | 784 | 80 | 20 | 0.82 | — |
| Example 35 | 735 | 75 | 20 | 0.52 | — |
| Example 36 | 588 | 60 | 30 | 0.23 | — |
| Example 37 | 588 | 60 | 30 | 0.20 | — |
| Example 38 | 294 | 30 | 60 | — | 0.03 |
| Example 39 | 392 | 40 | 60 | — | 0.08 |
| Example 40 | 490 | 50 | 30 | 0.23 | — |
| Example 41 | 441 | 45 | 30 | 0.42 | — |

Production of composite particles
Adhering step with second colored adhesion layer
Organic pigment

| Examples | Kind | Amount adhered (wt. part) |
|---|---|---|
| Example 28 | B-2 | 50.0 |
| Example 29 | Y-2 | 30.0 |
| Example 30 | R-2 | 25.0 |
| Example 31 | B-2 | 50.0 |
| Example 32 | R-2 | 50.0 |
| Example 33 | Y-2 | 50.0 |
| Example 34 | B-2 | 75.0 |
| Example 35 | R-2 | 40.0 |
| Example 36 | G-1 | 25.0 |
| Example 37 | Y-2 | 60.0 |
| Example 38 | B-2 | 100.0 |
| Example 39 | Y-2 | 80.0 |
| Example 40 | R-2 | 100.0 |
| Example 41 | Y-2 | 80.0 |

Production of composite particles
Adhering step with second colored adhesion layer

| | Edge runner treatment | | | Amount adhered (calculated as C) |
|---|---|---|---|---|
| | Linear load | | Time | |
| Examples | (N/cm) | (Kg/cm) | (min.) | (wt. %) |
| Example 28 | 588 | 60 | 120 | 22.14 |
| Example 29 | 588 | 60 | 120 | 12.96 |
| Example 30 | 392 | 40 | 60 | 15.25 |
| Example 31 | 735 | 75 | 180 | 22.13 |
| Example 32 | 588 | 60 | 180 | 25.48 |
| Example 33 | 588 | 60 | 60 | 18.77 |
| Example 34 | 588 | 60 | 150 | 28.49 |
| Example 35 | 294 | 30 | 60 | 21.87 |
| Example 36 | 441 | 45 | 60 | 7.09 |
| Example 37 | 441 | 45 | 60 | 19.97 |
| Example 38 | 588 | 60 | 120 | 33.21 |
| Example 39 | 588 | 60 | 120 | 25.00 |
| Example 40 | 588 | 60 | 60 | 38.33 |
| Example 41 | 735 | 75 | 60 | 23.60 |

TABLE 9

Production of composite particles
Coating step with gluing agent
Additives

| Examples | Kind of primary composite particles | Kind | Amount added (wt. part) |
|---|---|---|---|
| Example 42 | Primary composite particles 1 | Methyl triethoxysilane | 5.0 |
| Example 43 | Primary composite particles 2 | Isopropyltriisostearoyl titanate | 2.0 |
| Example 44 | Primary composite particles 3 | Methyl trimethoxysilane | 3.0 |
| Example 45 | Primary composite particles 4 | Methyl hydrogen polysiloxane | 1.0 |
| Example 46 | Primary composite particles 5 | Methyl triethoxysilane | 3.0 |
| Example 47 | Primary composite particles 6 | Polyvinyl alcohol | 2.0 |
| Example 48 | Primary composite particles 7 | Methyl hydrogen polysiloxane | 0.5 |
| Example 49 | Primary composite particles 8 | Methyl triethoxysilane | 3.0 |
| Example 50 | Primary composite particles 9 | Methyl triethoxysilane | 1.5 |
| Example 51 | Primary composite particles 10 | Methyl trimethoxysilane | 10.0 |
| Example 52 | Primary composite particles 11 | Methyl triethoxysilane | 1.0 |
| Example 53 | Primary composite particles 12 | γ-aminopropyl triethoxysilane | 0.5 |

TABLE 9-continued

| | | | |
|---|---|---|---|
| Example 54 | Primary composite particles 13 | Phenyl triethoxysilane | 2.0 |
| Example 55 | Primary composite particles 14 | Methyl hydrogen polysiloxane | 1.0 |

Production of composite particles
Coating step with gluing agent

| | Edge runner treatment | | Coating amount | |
|---|---|---|---|---|
| | Linear load | Time | Calculated as Si | Calculated as C |
| Examples | (N/cm) (Kg/cm) | (min.) | (wt. %) | (wt. %) |
| Example 42 | 588   60 | 20 | 0.72 | — |
| Example 43 | 588   60 | 30 | — | 1.43 |
| Example 44 | 735   75 | 30 | 0.59 | — |
| Example 45 | 588   60 | 20 | — | 0.27 |
| Example 46 | 392   40 | 30 | — | 0.19 |
| Example 47 | 392   40 | 60 | — | 1.06 |
| Example 48 | 588   60 | 30 | 0.21 | — |
| Example 49 | 294   30 | 20 | 0.45 | — |
| Example 50 | 588   60 | 30 | 0.23 | — |
| Example 51 | 441   45 | 30 | 1.87 | — |
| Example 52 | 392   40 | 30 | — | 0.06 |
| Example 53 | 735   75 | 20 | — | 0.08 |
| Example 54 | 588   60 | 30 | 0.27 | — |
| Example 55 | 588   60 | 30 | 0.42 | — |

Production of composite particles
Adhering step with second colored adhesion layer
Organic pigment

| Examples | Kind | Amount adhered (wt. part) |
|---|---|---|
| Example 42 | R-2 | 60.0 |
| Example 43 | B-1 | 120.0 |
| Example 44 | Y-2 | 150.0 |
| Example 45 | Y-1 | 80.0 |
| Example 46 | B-2 | 10.0 |
| Example 47 | B-2 | 60.0 |
| Example 48 | Y-2 | 200.0 |
| Example 49 | B-2 | 80.0 |
| Example 50 | Y-1 | 70.0 |
| Example 51 | R-2 | 40.0 |
| Example 52 | Y-2 | 50.0 |
| Example 53 | R-1 | 20.0 |
| Example 54 | B-1 | 20.0 |
| Example 55 | B-2 | 15.0 |

Production of composite particles
Adhering step with second colored adhesion layer

| | Edge runner treatment | | Amount adhered (calculated as C) |
|---|---|---|---|
| | Linear load | Time | |
| Examples | (N/cm) (Kg/cm) | (min.) | (wt. %) |
| Example 42 | 784   80 | 40 | 28.72 |
| Example 43 | 588   60 | 120 | 36.31 |
| Example 44 | 637   65 | 360 | 31.93 |
| Example 45 | 392   40 | 360 | 25.03 |
| Example 46 | 588   60 | 60 | 5.89 |
| Example 47 | 588   60 | 120 | 24.92 |
| Example 48 | 392   40 | 360 | 35.45 |
| Example 49 | 539   55 | 80 | 29.56 |
| Example 50 | 735   75 | 180 | 23.19 |
| Example 51 | 588   60 | 60 | 21.85 |
| Example 52 | 588   60 | 180 | 18.86 |
| Example 53 | 441   45 | 120 | 12.71 |
| Example 54 | 490   50 | 60 | 11.04 |
| Example 55 | 392   40 | 20 | 8.64 |

TABLE 10

Production of composite particles
Coating step with gluing agent
Additives

| Comparative Examples | Kind of primary composite particles | Kind | Amount added (wt. part) |
|---|---|---|---|
| Comparative Example 6 | Primary composite particles 15 | Methyl triethoxysilane | 1.0 |
| Comparative Example 7 | Primary composite particles 16 | Methyl triethoxysilane | 1.0 |
| Comparative Example 8 | Primary composite particles 17 | Methyl triethoxysilane | 1.0 |
| Comparative Example 9 | Primary composite particles 1 | — | — |
| Comparative Example 10 | Primary composite particles 1 | Methyl triethoxysilane | 0.005 |
| Comparative Example 11 | Primary composite particles 15 | Methyl triethoxysilane | 1.0 |
| Comparative Example 12 | Primary composite particles 16 | Methyl triethoxysilane | 1.0 |
| Comparative Example 13 | Primary composite particles 17 | Methyl triethoxysilane | 1.0 |
| Comparative Example 14 | Primary composite particles 1 | — | — |
| Comparative Example 15 | Primary composite particles 1 | Methyl triethoxysilane | 0.005 |
| Comparative Example 16 | Primary composite particles 1 | Methyl triethoxysilane | 2.0 |

Production of composite particles
Coating step with gluing agent

| | Edge runner treatment | | Coating amount Calculated as Si |
|---|---|---|---|
| Comparative Examples | Linear load (N/cm) (Kg/cm) | Time (min.) | (wt. %) |
| Comparative Example 6 | 392   40 | 30 | 0.15 |
| Comparative Example 7 | 588   60 | 20 | 0.15 |
| Comparative Example 8 | 441   45 | 30 | 0.15 |
| Comparative Example 9 | — — | — | — |
| Comparative Example 10 | 588   60 | 20 | 6 × 10⁻⁴ |
| Comparative Example 11 | 588   60 | 30 | 0.15 |

TABLE 10-continued

| Comparative Examples | | | | |
|---|---|---|---|---|
| Comparative Example 12 | 441 | 45 | 30 | 0.15 |
| Comparative Example 13 | 490 | 50 | 30 | 0.15 |
| Comparative Example 14 | — | — | — | — |
| Comparative Example 15 | 441 | 45 | 30 | $6 \times 10^{-4}$ |
| Comparative Example 16 | 588 | 60 | 30 | 0.30 |

Production of composite particles
Adhering step with second colored adhesion layer
Organic pigment

| Comparative Examples | Kind | Amount adhered (wt. part) |
|---|---|---|
| Comparative Example 6 | Y-2 | 10.0 |
| Comparative Example 7 | Y-2 | 10.0 |
| Comparative Example 8 | Y-2 | 0.1 |
| Comparative Example 9 | B-2 | 10.0 |
| Comparative Example 10 | B-2 | 10.0 |
| Comparative Example 11 | B-2 | 10.0 |
| Comparative Example 12 | B-2 | 10.0 |
| Comparative Example 13 | B-2 | 0.1 |
| Comparative Example 14 | Y-2 | 10.0 |
| Comparative Example 15 | Y-2 | 10.0 |
| Comparative Example 16 | Y-2 | 600.0 |

Production of composite particles
Adhering step with second colored adhesion layer

| Comparative Examples | Edge runner treatment | | | Amount adhered (calculated as C) (wt. %) |
|---|---|---|---|---|
| | Linear load (N/cm) | Linear load (Kg/cm) | Time (min.) | |
| Comparative Example 6 | 588 | 60 | 60 | 4.71 |
| Comparative Example 7 | 784 | 80 | 60 | 4.73 |
| Comparative Example 8 | 588 | 60 | 20 | 0.05 |
| Comparative Example 9 | 441 | 45 | 120 | 6.00 |
| Comparative Example 10 | 588 | 60 | 60 | 5.98 |
| Comparative Example 11 | 441 | 45 | 30 | 5.97 |
| Comparative Example 12 | 588 | 60 | 20 | 5.97 |
| Comparative Example 13 | 490 | 50 | 60 | 0.06 |
| Comparative Example 14 | 588 | 60 | 60 | 4.75 |
| Comparative Example 15 | 588 | 60 | 30 | 4.73 |
| Comparative Example 16 | 588 | 60 | 300 | 48.60 |

TABLE 11

| Examples | Properties of composite particles | |
|---|---|---|
| | Average particle size (μm) | BET specific surface area value (m²/g) |
| Example 28 | 0.27 | 11.6 |
| Example 29 | 0.012 | 48.6 |
| Example 30 | 0.19 | 18.8 |
| Example 31 | 0.027 | 183.2 |
| Example 32 | 0.009 | 276.5 |
| Example 33 | 0.068 | 19.1 |
| Example 34 | 8.25 | 7.1 |
| Example 35 | 0.27 | 12.3 |
| Example 36 | 0.011 | 58.6 |
| Example 37 | 0.20 | 18.8 |
| Example 38 | 0.028 | 163.6 |
| Example 39 | 0.012 | 178.8 |
| Example 40 | 0.067 | 20.6 |
| Example 41 | 8.26 | 5.9 |

| Examples | Properties of composite particles Hue | | |
|---|---|---|---|
| | L* value[1] (-) | a* value[1] (-) | b* value[1] (-) |
| Example 28 | 9.56 | 8.26 | 20.08 |
| Example 29 | 69.33 | 1.73 | 78.15 |
| Example 30 | 30.19 | 49.62 | 21.58 |
| Example 31 | 7.93 | 10.53 | -21.76 |
| Example 32 | 31.73 | 54.63 | 25.05 |
| Example 33 | 67.84 | 0.76 | 79.37 |
| Example 34 | 11.34 | 6.36 | -19.26 |
| Example 35 | 28.88 | 51.33 | 20.84 |
| Example 36 | 12.13 | -16.65 | -1.36 |
| Example 37 | 63.20 | 1.26 | 81.00 |
| Example 38 | 6.47 | 10.63 | -22.12 |
| Example 39 | 66.82 | 0.63 | 79.71 |
| Example 40 | 25.43 | 56.13 | 24.91 |
| Example 41 | 71.34 | 0.91 | 82.87 |

| Examples | Properties of composite particles Hue | | |
|---|---|---|---|
| | L* value[2] (-) | a* value[2] (-) | b* value[2] (-) |
| Example 28 | 19.86 | 8.26 | -23.22 |
| Example 29 | 69.59 | 1.73 | 70.16 |
| Example 30 | 35.35 | 49.62 | 16.39 |
| Example 31 | 18.69 | 10.53 | -24.82 |
| Example 32 | 36.56 | 54.63 | 19.68 |
| Example 33 | 68.13 | 0.76 | 71.32 |
| Example 34 | 21.14 | 6.36 | -22.44 |
| Example 35 | 34.32 | 51.33 | 15.68 |
| Example 36 | 22.12 | -16.65 | -5.42 |
| Example 37 | 63.67 | 1.26 | 72.87 |
| Example 38 | 17.65 | 10.63 | -25.16 |
| Example 39 | 67.13 | 0.63 | 71.65 |
| Example 40 | 31.65 | 56.13 | 19.55 |
| Example 41 | 71.59 | 0.91 | 74.65 |

| Examples | Properties of composite particles | |
|---|---|---|
| | Tinting strength (%) | Hiding power (cm²/g) |
| Example 28 | 240 | 1,610 |
| Example 29 | 243 | 510 |
| Example 30 | 223 | 780 |
| Example 31 | 254 | 540 |
| Example 32 | 252 | 520 |
| Example 33 | 236 | 480 |
| Example 34 | 254 | 410 |
| Example 35 | 238 | 1,530 |
| Example 36 | 238 | 470 |
| Example 37 | 232 | 790 |
| Example 38 | 256 | 540 |

TABLE 11-continued

| Examples | | |
|---|---|---|
| Example 39 | 243 | 490 |
| Example 40 | 222 | 530 |
| Example 41 | 218 | 450 |

| | Properties of composite particles | | |
|---|---|---|---|
| Examples | Light resistance (ΔE* value) (−) | Desorption percentage of organic pigment (%) | Degree of desorption of organic pigment (−) |
| Example 28 | 2.10 | 6.0 | — |
| Example 29 | 2.11 | 6.8 | — |
| Example 30 | 2.88 | 6.0 | — |
| Example 31 | 1.04 | — | 5 |
| Example 32 | 1.32 | — | 5 |
| Example 33 | 2.06 | 6.9 | — |
| Example 34 | 2.16 | 7.3 | — |
| Example 35 | 1.66 | 4.0 | — |
| Example 36 | 1.63 | 3.8 | — |
| Example 37 | 1.68 | 4.6 | — |
| Example 38 | 0.95 | — | 5 |
| Example 39 | 1.59 | — | 5 |
| Example 40 | 1.69 | 4.0 | — |
| Example 41 | 1.14 | 4.1 | — |

(Note) [1] Measured by a portable spectrocolorimeter "COLOR-GUIDE 45/0" (manufactured by BYK CHEMIE JAPAN CO. LTD.)
(Note) [2] Measured by a multi-spectro-colour-meter "MSC-IS-2D" (manufactured by SUGA TESTING MACHINES MANUFACTURING CO., LTD.)

TABLE 12

| | Properties of composite particles | |
|---|---|---|
| Examples | Average particle size (μm) | BET specific surface area value (m²/g) |
| Example 42 | 0.27 | 12.8 |
| Example 43 | 0.018 | 47.8 |
| Example 44 | 0.20 | 19.1 |
| Example 45 | 0.030 | 179.6 |
| Example 46 | 0.008 | 278.8 |
| Example 47 | 0.068 | 24.6 |
| Example 48 | 8.25 | 7.9 |
| Example 49 | 0.27 | 13.3 |
| Example 50 | 0.014 | 51.2 |
| Example 51 | 0.20 | 18.9 |
| Example 52 | 0.027 | 156.8 |
| Example 53 | 0.010 | 171.9 |
| Example 54 | 0.068 | 21.9 |
| Example 55 | 8.26 | 6.1 |

| | Properties of composite particles Hue | | |
|---|---|---|---|
| Examples | L* value[1] (−) | a* value[1] (−) | b* value[1] (−) |
| Example 42 | 20.07 | 31.32 | 10.62 |
| Example 43 | 14.78 | −15.26 | 7.79 |
| Example 44 | 42.65 | 21.32 | 51.17 |
| Example 45 | 40.49 | −14.11 | 1.69 |
| Example 46 | 9.31 | 39.14 | 2.19 |
| Example 47 | 12.01 | −13.99 | 11.37 |
| Example 48 | 30.77 | 3.24 | 24.57 |
| Example 49 | 16.52 | 26.33 | 10.92 |
| Example 50 | 12.03 | 13.65 | 19.78 |
| Example 51 | 21.49 | 31.53 | 46.50 |
| Example 52 | 12.39 | −12.59 | 3.12 |
| Example 53 | 38.11 | 28.26 | 41.83 |
| Example 54 | 9.27 | 30.16 | 0.13 |
| Example 55 | 31.92 | 3.24 | −16.78 |

TABLE 12-continued

| | Properties of composite particles Hue | | |
|---|---|---|---|
| Examples | L* value[2] (−) | a* value[2] (−) | b* value[2] (−) |
| Example 42 | 27.58 | 31.32 | 5.97 |
| Example 43 | 28.65 | −15.26 | 3.28 |
| Example 44 | 45.44 | 21.32 | 44.52 |
| Example 45 | 43.64 | −14.11 | −2.52 |
| Example 46 | 19.68 | 39.14 | −2.05 |
| Example 47 | 21.63 | −13.99 | 6.68 |
| Example 48 | 35.80 | 3.24 | −19.23 |
| Example 49 | 24.93 | 26.33 | 6.25 |
| Example 50 | 21.64 | −13.65 | 14.67 |
| Example 51 | 28.65 | 31.53 | 40.08 |
| Example 52 | 22.29 | −12.59 | −1.16 |
| Example 53 | 41.69 | 28.26 | 35.64 |
| Example 54 | 19.65 | 30.16 | −4.01 |
| Example 55 | 36.71 | 3.24 | −20.08 |

| | Properties of composite particles | |
|---|---|---|
| Examples | Tinting strength (%) | Hiding power (cm²/g) |
| Example 42 | 225 | 1,890 |
| Example 43 | 251 | 530 |
| Example 44 | 230 | 830 |
| Example 45 | 226 | 530 |
| Example 46 | 223 | 490 |
| Example 47 | 241 | 510 |
| Example 48 | 244 | 430 |
| Example 49 | 255 | 2,130 |
| Example 50 | 249 | 500 |
| Example 51 | 231 | 990 |
| Example 52 | 248 | 510 |
| Example 53 | 249 | 480 |
| Example 54 | 241 | 530 |
| Example 55 | 217 | 560 |

| | Properties of composite particles | | |
|---|---|---|---|
| Examples | Light resistance (ΔE* value) (−) | Desorption percentage of organic pigment (%) | Degree of desorption of organic pigment (−) |
| Example 42 | 2.32 | 6.9 | — |
| Example 43 | 1.64 | 8.7 | — |
| Example 44 | 2.16 | 8.6 | — |
| Example 45 | 1.23 | — | 5 |
| Example 46 | 1.41 | — | 5 |
| Example 47 | 1.82 | 8.6 | — |
| Example 48 | 2.32 | 8.9 | — |
| Example 49 | 1.68 | 5.6 | — |
| Example 50 | 1.72 | 4.1 | — |
| Example 51 | 1.65 | 5.7 | — |
| Example 52 | 1.18 | — | 5 |
| Example 53 | 1.36 | — | 5 |
| Example 54 | 1.72 | 4.9 | — |
| Example 55 | 1.62 | 3.1 | — |

(Note) [1] Measured by a portable spectrocolorimeter "COLOR-GUIDE 45/0" (manufactured by BYK CHEMIE JAPAN CO., LTD.)
(Note) [2] Measured by a multi-spectro-colour-meter "MSC-IS-2D" (manufactured by SUGA TESTING MACHINES MANUFACTURING CO., LTD.)

TABLE 13

| | Properties of composite particles | |
|---|---|---|
| Comparative Examples | Average particle size (μm) | BET specific surface area value (m²/g) |
| Comparative Example 6 | 0.26 | 11.3 |

TABLE 13-continued

| Comparative Examples | L* value[1] (-) | a* value[1] (-) | b* value[1] (-) |
|---|---|---|---|
| Comparative Example 7 | 0.26 | | 12.6 |
| Comparative Example 8 | 0.25 | | 13.2 |
| Comparative Example 9 | 0.26 | | 14.3 |
| Comparative Example 10 | 0.26 | | 10.6 |
| Comparative Example 11 | 0.26 | | 11.6 |
| Comparative Example 12 | 0.26 | | 17.3 |
| Comparative Example 13 | 0.25 | | 18.1 |
| Comparative Example 14 | 0.26 | | 12.6 |
| Comparative Example 15 | 0.26 | | 13.6 |
| Comparative Example 16 | 0.28 | | 12.1 |

Properties of composite particles Hue

| Comparative Examples | L* value[1] (-) | a* value[1] (-) | b* value[1] (-) |
|---|---|---|---|
| Comparative Example 6 | 62.50 | 0.90 | 77.60 |
| Comparative Example 7 | 65.30 | 0.69 | 78.61 |
| Comparative Example 8 | 90.84 | 1.26 | 7.16 |
| Comparative Example 9 | 66.29 | 5.26 | −21.52 |
| Comparative Example 10 | 64.25 | 3.10 | 18.62 |
| Comparative Example 11 | 63.00 | 1.32 | −15.98 |
| Comparative Example 12 | 58.10 | 0.18 | −19.56 |
| Comparative Example 13 | 61.19 | 1.96 | −16.39 |
| Comparative Example 14 | 30.84 | 15.14 | −10.82 |
| Comparative Example 15 | 28.22 | 20.12 | −8.85 |
| Comparative Example 16 | 68.04 | −4.26 | 62.59 |

Properties of composite particles Hue

| Comparative Examples | L* value[2] (-) | a* value[2] (-) | b* value[2] (-) |
|---|---|---|---|
| Comparative Example 6 | 63.01 | 0.90 | 69.64 |
| Comparative Example 7 | 65.67 | 0.69 | 70.60 |
| Comparative Example 8 | 92.85 | 1.26 | 2.68 |
| Comparative Example 9 | 66.62 | 5.26 | −24.59 |
| Comparative Example 10 | 64.66 | 3.10 | −21.83 |
| Comparative Example 11 | 63.48 | 1.32 | −19.32 |
| Comparative Example 12 | 58.93 | 0.18 | −22.72 |
| Comparative Example 13 | 61.78 | 1.96 | −19.71 |
| Comparative Example 14 | 35.86 | 15.14 | −14.42 |
| Comparative Example 15 | 33.81 | 20.12 | −12.54 |
| Comparative Example 16 | 68.32 | −4.26 | 55.37 |

Properties of composite particles

| Comparative Examples | Tinting strength (%) | Hiding power (cm$^2$/g) |
|---|---|---|
| Comparative Example 6 | 106 | 1,460 |
| Comparative Example 7 | 103 | 1,400 |
| Comparative Example 8 | 101 | 1,460 |
| Comparative Example 9 | 131 | 1,510 |
| Comparative Example 10 | 131 | 1,500 |
| Comparative Example 11 | 121 | 1,420 |
| Comparative Example 12 | 124 | 1,460 |
| Comparative Example 13 | 101 | 1,480 |
| Comparative Example 14 | 116 | 1,510 |
| Comparative Example 15 | 116 | 1,460 |
| Comparative Example 16 | 198 | 1,630 |

Properties of composite particles

| Examples | Light resistance (ΔE* value) (-) | Desorption percentage of organic pigment (%) |
|---|---|---|
| Comparative Example 6 | 6.56 | 64.3 |
| Comparative Example 7 | 6.34 | 56.2 |
| Comparative Example 8 | 7.13 | — |
| Comparative Example 9 | 8.12 | 71.3 |
| Comparative Example 10 | 6.15 | 73.8 |
| Comparative Example 11 | 8.36 | 61.6 |
| Comparative Example 12 | 7.36 | 73.2 |
| Comparative Example 13 | 6.53 | — |
| Comparative Example 14 | 7.01 | 68.6 |
| Comparative Example 15 | 7.81 | 67.2 |
| Comparative Example 16 | 6.17 | 56.3 |

(Note) [1]: Measured by a portable spectrocolorimeter "COLOR-GUIDE 45/0" (manufactured by BYK CHEMIE JAPAN CO., LTD.)
(Note) [2] Measured by a multi-spectro-colour-meter "MSC-IS-2D" (manufactured by SUGA TESTING MACHINES MANUFACTURING CO., LTD.)

TABLE 14

| | Production of paint | Properties of paint | |
|---|---|---|---|
| Examples | Kind of composite particles | Viscosity (cP) | Storage stability (-) |
| Example 56 | Example 12 | 1,024 | 0.90 |
| Example 57 | Example 13 | 922 | 0.76 |
| Example 58 | Example 14 | 1,152 | 0.83 |
| Example 59 | Example 15 | 870 | 0.78 |
| Example 60 | Example 16 | 845 | 0.64 |

TABLE 14-continued

| Examples | | | |
|---|---|---|---|
| Example 61 | Example 17 | 1,100 | 0.95 |
| Example 62 | Example 18 | 1,050 | 0.84 |
| Example 63 | Example 19 | 998 | 0.54 |
| Example 64 | Example 20 | 1,075 | 0.43 |
| Example 65 | Example 21 | 1,062 | 0.21 |
| Example 66 | Example 22 | 1,050 | 0.36 |
| Example 67 | Example 23 | 1,024 | 0.21 |
| Example 68 | Example 24 | 998 | 0.55 |
| Example 69 | Example 25 | 1,203 | 0.38 |
| Example 70 | Example 26 | 973 | 0.91 |
| Example 71 | Example 27 | 947 | 0.88 |

| | Properties of coating film | | | |
|---|---|---|---|---|
| | 60° gloss (%) | Hue | | |
| Examples | | L* value[1] (—) | a* value[1] (—) | b* value[1] (—) |
| Example 56 | 93 | 55.51 | 48.99 | −1.03 |
| Example 57 | 93 | 52.99 | 31.88 | 26.07 |
| Example 58 | 96 | 63.32 | −5.63 | −27.32 |
| Example 59 | 94 | 14.76 | 9.13 | −17.38 |
| Example 60 | 96 | 57.26 | 48.61 | 24.36 |
| Example 61 | 93 | 82.35 | 2.65 | 77.47 |
| Example 62 | 93 | 81.93 | 0.93 | 84.56 |
| Example 63 | 97 | 46.52 | 53.16 | 5.63 |
| Example 64 | 98 | 35.39 | −18.11 | −6.15 |
| Example 65 | 86 | 31.83 | −7.63 | −28.39 |
| Example 66 | 96 | 11.28 | 9.13 | −17.37 |
| Example 67 | 93 | 52.48 | 40.12 | 0.52 |
| Example 68 | 97 | 17.13 | −16.64 | −9.77 |
| Example 69 | 91 | 82.03 | 0.83 | 85.36 |
| Example 70 | 92 | 12.49 | 2.48 | −11.00 |
| Example 71 | 94 | 15.16 | −15.06 | −8.96 |

| | Properties of coating film Hue | | |
|---|---|---|---|
| Examples | L* value[2] (—) | a* value[2] (—) | b* value[2] (—) |
| Example 56 | 56.33 | 48.99 | −4.72 |
| Example 57 | 54.33 | 31.88 | 20.65 |
| Example 58 | 63.69 | −5.63 | −29.50 |
| Example 59 | 23.64 | 9.13 | −20.65 |
| Example 60 | 58.16 | 48.61 | 19.03 |
| Example 61 | 83.13 | 2.65 | 69.52 |
| Example 62 | 82.70 | 0.93 | 75.93 |
| Example 63 | 48.31 | 53.16 | 1.55 |
| Example 64 | 39.64 | −18.11 | −9.98 |
| Example 65 | 36.25 | −7.63 | −30.51 |
| Example 66 | 21.10 | 9.13 | −20.64 |
| Example 67 | 53.88 | 40.12 | −3.64 |
| Example 68 | 25.49 | −16.64 | −13.42 |
| Example 69 | 82.80 | 0.83 | 76.68 |
| Example 70 | 21.98 | 2.48 | −14.59 |
| Example 71 | 24.14 | −15.06 | −12.20 |

| | Properties of coating film | |
|---|---|---|
| Examples | Light resistance (ΔE* value) (—) | Transparency (linear absorption) (μm⁻¹) |
| Example 56 | 2.77 | — |
| Example 57 | 2.64 | 0.0813 |
| Example 58 | 2.59 | — |
| Example 59 | 1.46 | 0.0836 |
| Example 60 | 1.68 | 0.0812 |
| Example 61 | 2.31 | 0.0794 |
| Example 62 | 3.14 | 0.0703 |
| Example 63 | 1.93 | — |
| Example 64 | 2.24 | 0.0821 |
| Example 65 | 1.64 | — |
| Example 66 | 1.23 | 0.0844 |
| Example 67 | 1.46 | 0.0796 |
| Example 68 | 2.23 | 0.0772 |
| Example 69 | 2.03 | 0.0716 |
| Example 70 | 2.70 | — |
| Example 71 | 2.15 | 0.0837 |

(Note)
[1]: Measured by a portable spectrocolorimeter "COLOR-GUIDE 45/0" (manufactured by BYK CHEMIE JAPAN CO., LTD.)

(Note)
[2]: Measured by a multi-spectro-colour-meter "MSC-IS-2D" (manufactured by SUGA TESTING MACHINES MANUFACTURING CO., LTD.)

TABLE 15

| | Production of paint | Properties of paint | |
|---|---|---|---|
| Examples | Kind of composite particles | Viscosity (cP) | Storage stability (—) |
| Example 72 | Example 28 | 973 | 0.86 |
| Example 73 | Example 29 | 1,256 | 0.78 |
| Example 74 | Example 30 | 1,050 | 0.83 |
| Example 75 | Example 31 | 984 | 0.64 |
| Example 76 | Example 32 | 1,019 | 0.68 |
| Example 77 | Example 33 | 983 | 0.89 |
| Example 78 | Example 34 | 1,024 | 0.78 |
| Example 79 | Example 35 | 998 | 0.43 |
| Example 80 | Example 36 | 1,256 | 0.35 |
| Example 81 | Example 37 | 1,024 | 0.42 |
| Example 82 | Example 38 | 972 | 0.33 |
| Example 83 | Example 39 | 1,031 | 0.26 |
| Example 84 | Example 40 | 1,152 | 0.44 |
| Example 85 | Example 41 | 896 | 0.36 |

| | Properties of coating film | | | |
|---|---|---|---|---|
| | 60° gloss (%) | Hue | | |
| Examples | | L* value[1] (—) | a* value[1] (—) | b* value[1] (—) |
| Example 72 | 94 | 10.17 | 7.21 | −21.25 |
| Example 73 | 91 | 71.07 | 1.13 | 81.81 |
| Example 74 | 93 | 33.10 | 49.21 | 22.36 |
| Example 75 | 93 | 9.27 | 10.69 | −18.41 |
| Example 76 | 92 | 32.45 | 53.26 | 26.55 |
| Example 77 | 91 | 68.90 | 1.09 | 80.42 |
| Example 78 | 94 | 12.29 | 7.34 | −20.63 |
| Example 79 | 98 | 31.13 | 49.63 | 15.89 |
| Example 80 | 97 | 13.65 | −16.84 | −3.41 |
| Example 81 | 96 | 66.34 | 1.26 | 83.47 |
| Example 82 | 98 | 7.19 | 9.64 | −21.62 |
| Example 83 | 99 | 68.08 | 1.26 | 81.30 |
| Example 84 | 95 | 26.09 | 58.32 | 27.12 |
| Example 85 | 97 | 77.72 | 0.93 | 79.38 |

| | Properties of coating film Hue | | |
|---|---|---|---|
| Examples | L* value[2] (—) | a* value[2] (—) | b* value[2] (—) |
| Example 72 | 20.30 | 7.21 | −24.33 |
| Example 73 | 71.32 | 1.13 | 73.64 |
| Example 74 | 37.65 | 49.21 | 17.13 |
| Example 75 | 19.65 | 10.69 | −21.63 |
| Example 76 | 37.13 | 53.26 | 21.11 |
| Example 77 | 69.16 | 1.09 | 72.32 |
| Example 78 | 21.83 | 7.34 | −23.74 |
| Example 79 | 36.09 | 49.63 | 10.98 |
| Example 80 | 23.13 | −16.84 | −7.37 |
| Example 81 | 66.67 | 1.26 | 75.22 |
| Example 82 | 18.16 | 9.64 | −24.68 |
| Example 83 | 68.36 | 1.26 | 73.16 |
| Example 84 | 32.16 | 58.32 | 21.65 |
| Example 85 | 78.15 | 0.93 | 71.33 |

TABLE 15-continued

| | Properties of coating film | |
|---|---|---|
| Examples | Light resistance (ΔE* value) (-) | Transparency (linear absorption) (μm$^{-1}$) |
| Example 72 | 2.68 | — |
| Example 73 | 2.66 | 0.0824 |
| Example 74 | 2.13 | — |
| Example 75 | 1.48 | 0.0838 |
| Example 76 | 1.76 | 0.0829 |
| Example 77 | 2.34 | 0.0796 |
| Example 78 | 2.13 | 0.0812 |
| Example 79 | 1.68 | — |
| Example 80 | 1.71 | 0.0758 |
| Example 81 | 1.66 | — |
| Example 82 | 1.26 | 0.0820 |
| Example 83 | 1.61 | 0.0772 |
| Example 84 | 1.68 | 0.0816 |
| Example 85 | 1.69 | 0.0738 |

(Note)
[1]: Measured by a portable spectrocolorimeter "COLOR-GUIDE 45/0" (manufactured by BYK CHEMIE JAPAN CO., LTD.)
(Note)
[2]: Measured by a multi-spectro-colour-meter "MSC-IS-2D" (manufactured by SUGA TESTING MACHINES MANUFACTURING CO., LTD.)

TABLE 16

| | Production of paint | Properties of paint | |
|---|---|---|---|
| Examples | Kind of composite particles | Viscosity (cP) | Storage stability (-) |
| Example 86 | Example 42 | 922 | 0.78 |
| Example 87 | Example 43 | 1,114 | 0.69 |
| Example 88 | Example 44 | 1,050 | 0.68 |
| Example 89 | Example 45 | 1,024 | 0.63 |
| Example 90 | Example 46 | 963 | 0.64 |
| Example 91 | Example 47 | 1,256 | 0.83 |
| Example 92 | Example 48 | 1,152 | 0.71 |
| Example 93 | Example 49 | 998 | 0.36 |
| Example 94 | Example 50 | 983 | 0.35 |
| Example 95 | Example 51 | 1,050 | 0.41 |
| Example 96 | Example 52 | 1,021 | 0.26 |
| Example 97 | Example 53 | 944 | 0.26 |
| Example 98 | Example 54 | 1,157 | 0.40 |
| Example 99 | Example 55 | 973 | 0.21 |

| | Properties of coating film | | | |
|---|---|---|---|---|
| | 60° | Hue | | |
| Examples | gloss (%) | L* value[1] (-) | a* value[1] (-) | b* value[1] (-) |
| Example 86 | 90 | 24.86 | 34.62 | 11.92 |
| Example 87 | 92 | 21.06 | -14.11 | 7.53 |
| Example 88 | 91 | 43.49 | 25.66 | 56.73 |
| Example 89 | 92 | 39.84 | -13.64 | 1.00 |
| Example 90 | 93 | 12.01 | 37.84 | 2.49 |
| Example 91 | 91 | 15.42 | -12.95 | 12.21 |
| Example 92 | 94 | 30.78 | 4.62 | -18.06 |
| Example 93 | 99 | 18.37 | 27.83 | 14.60 |
| Example 94 | 103 | 16.11 | -11.62 | 18.98 |
| Example 95 | 101 | 24.37 | 29.65 | 43.66 |
| Example 96 | 100 | 3.51 | -13.16 | 1.67 |
| Example 97 | 104 | 40.10 | 27.65 | 43.60 |
| Example 98 | 98 | 11.58 | 29.66 | -1.30 |
| Example 99 | 99 | 34.79 | 5.62 | -19.59 |

TABLE 16-continued

| | Properties of coating film Hue | | |
|---|---|---|---|
| Examples | L* value[2] (-) | a* value[2] (-) | b* value[2] (-) |
| Example 86 | 31.21 | 34.62 | 7.20 |
| Example 87 | 28.32 | -14.11 | 3.03 |
| Example 88 | 46.14 | 25.66 | 49.80 |
| Example 89 | 43.11 | -13.64 | -3.18 |
| Example 90 | 21.63 | 37.84 | -1.76 |
| Example 91 | 24.12 | -12.95 | 7.48 |
| Example 92 | 35.81 | 4.62 | -21.30 |
| Example 93 | 26.31 | 27.83 | 9.75 |
| Example 94 | 24.63 | -11.62 | 13.91 |
| Example 95 | 30.84 | 29.65 | 37.38 |
| Example 96 | 15.56 | -13.16 | -2.54 |
| Example 97 | 43.32 | 27.65 | 37.32 |
| Example 98 | 21.32 | 29.66 | -5.37 |
| Example 99 | 39.00 | 5.62 | -22.75 |

| | Properties of coating film | |
|---|---|---|
| Examples | Light resistance (ΔE* value) (-) | Transparency (linear absorption) (μm$^{-1}$) |
| Example 86 | 2.73 | — |
| Example 87 | 1.98 | 0.0837 |
| Example 88 | 2.16 | — |
| Example 89 | 1.53 | 0.0830 |
| Example 90 | 1.76 | 0.0791 |
| Example 91 | 2.11 | 0.0807 |
| Example 92 | 2.36 | 0.0812 |
| Example 93 | 1.51 | — |
| Example 94 | 1.84 | 0.0783 |
| Example 95 | 1.53 | — |
| Example 96 | 1.26 | 0.0786 |
| Example 97 | 1.53 | 0.0768 |
| Example 98 | 1.86 | 0.0799 |
| Example 99 | 1.67 | 0.0791 |

(Note)
[1]: Measured by a portable spectrocolorimeter "COLOR-GUIDE 45/0" (manufactured by BYK CHEMIE JAPAN CO., LTD.)
(Note)
[2]: Measured by a multi-spectro-colour-meter "MSC-IS-2D" (manufactured by SUGA TESTING MACHINES MANUFACTURING CO., LTD.)

TABLE 17

| | Production of paint Kind of organic pigments or composite particles | Properties of paint | |
|---|---|---|---|
| Comparative Examples | | Viscosity (cP) | Storage stability (-) |
| Comparative Example 17 | Organic pigment B-1 | 12,560 | 2.69 |
| Comparative Example 18 | Organic pigment B-2 | 13,814 | 3.13 |
| Comparative Example 19 | Organic pigment G-1 | 9,621 | 2.16 |
| Comparative Example 20 | Organic pigment R-1 | 11,211 | 2.11 |
| Comparative Example 21 | Organic pigment R-2 | 13,264 | 3.26 |
| Comparative Example 22 | Organic pigment R-3 | 9,863 | 2.43 |
| Comparative Example 23 | Organic pigment Y-1 | 7,652 | 3.16 |
| Comparative Example 24 | Organic pigment Y-2 | 6,835 | 2.93 |
| Comparative Example 25 | Comparative Example 1 | 12,186 | 2.13 |

TABLE 17-continued

| Comparative Examples | | | |
|---|---|---|---|
| Comparative Example 26 | Comparative Example 2 | 1,050 | 1.69 |
| Comparative Example 27 | Comparative Example 3 | 10,240 | 2.11 |
| Comparative Example 28 | Comparative Example 4 | 1,664 | 1.83 |
| Comparative Example 29 | Comparative Example 5 | 2,650 | 2.16 |

| | Properties of coating film | | | |
|---|---|---|---|---|
| | 60° | Hue | | |
| Comparative Examples | gloss (%) | L* value[1] (−) | a* value[1] (−) | b* value[1] (−) |
| Comparative Example 17 | 66 | 7.41 | 8.96 | −19.51 |
| Comparative Example 18 | 63 | 6.98 | 11.20 | −26.01 |
| Comparative Example 19 | 58 | 12.36 | −18.48 | −4.51 |
| Comparative Example 20 | 63 | 32.83 | 52.16 | 26.81 |
| Comparative Example 21 | 68 | 23.46 | 59.13 | 27.15 |
| Comparative Example 22 | 71 | 37.66 | 48.65 | 25.50 |
| Comparative Example 23 | 56 | 67.54 | 1.11 | 79.69 |
| Comparative Example 24 | 53 | 69.10 | 1.63 | 81.30 |
| Comparative Example 25 | 58 | 57.32 | −2.64 | −23.54 |
| Comparative Example 26 | 71 | 90.66 | 0.60 | 2.38 |
| Comparative Example 27 | 64 | 56.83 | −2.13 | −24.93 |
| Comparative Example 28 | 73 | 74.63 | −0.98 | −3.66 |
| Comparative Example 29 | 68 | 9.27 | 10.26 | −18.43 |

| | Properties of coating film Hue | | |
|---|---|---|---|
| Comparative Examples | L* value[2] (−) | a* value[2] (−) | b* value[2] (−) |
| Comparative Example 17 | 18.32 | 8.96 | −22.68 |
| Comparative Example 18 | 18.01 | 11.20 | −28.86 |
| Comparative Example 19 | 22.27 | −18.48 | −8.42 |
| Comparative Example 20 | 37.43 | 52.16 | 21.36 |
| Comparative Example 21 | 30.14 | 59.13 | 21.68 |
| Comparative Example 22 | 41.32 | 48.65 | 20.11 |
| Comparative Example 23 | 67.83 | 1.11 | 71.63 |
| Comparative Example 24 | 69.36 | 1.63 | 73.16 |
| Comparative Example 25 | 58.00 | −2.64 | −25.94 |
| Comparative Example 26 | 92.33 | 0.60 | −1.51 |
| Comparative Example 27 | 57.55 | −2.13 | −27.25 |
| Comparative Example 28 | 74.99 | −0.98 | −7.20 |
| Comparative Example 29 | 19.65 | 10.26 | −21.65 |

| | Properties of coating film | |
|---|---|---|
| Comparative Examples | Light resistance (ΔE* value) (−) | Transparency (linear absorption) (μm$^{-1}$) |
| Comparative Example 17 | 10.23 | 0.1262 |
| Comparative Example 18 | 10.24 | 0.1365 |
| Comparative Example 19 | 9.93 | 0.1126 |
| Comparative Example 20 | 13.84 | 0.1962 |
| Comparative Example 21 | 17.16 | 0.1123 |
| Comparative Example 22 | 18.32 | 0.1843 |
| Comparative Example 23 | 17.56 | 0.1468 |
| Comparative Example 24 | 19.32 | 0.1365 |
| Comparative Example 25 | 7.68 | — |
| Comparative Example 26 | 6.90 | — |
| Comparative Example 27 | 6.96 | — |
| Comparative Example 28 | 6.72 | — |
| Comparative Example 29 | 10.26 | — |

(Note)
[1]: Measured by a portable spectrocolorimeter "COLOR-GUIDE 45/0" (manufactured by BYK CHEMIE JAPAN CO., LTD.)
(Note)
[2]: Measured by a multi-spectro-colour-meter "MSC-IS-2D" (manufactured by SUGA TESTING MACHINES MANUFACTURING CO., LTD.)

TABLE 18

| | Production of paint | Properties of paint | |
|---|---|---|---|
| Comparative Examples | Kind of composite particles | Viscosity (cP) | Storage stability (−) |
| Comparative Example 30 | Comparative Example 6 | 4,832 | 2.31 |
| Comparative Example 31 | Comparative Example 7 | 16,212 | 2.31 |
| Comparative Example 32 | Comparative Example 8 | 2,164 | 2.16 |
| Comparative Example 33 | Comparative Example 9 | 13,212 | 2.46 |
| Comparative Example 34 | Comparative Example 10 | 4,321 | 2.13 |
| Comparative Example 35 | Comparative Example 11 | 5,662 | 2.13 |
| Comparative Example 36 | Comparative Example 12 | 8,962 | 2.46 |
| Comparative Example 37 | Comparative Example 13 | 2,011 | 2.52 |
| Comparative Example 38 | Comparative Example 14 | 9,099 | 2.18 |
| Comparative Example 39 | Comparative Example 15 | 10,113 | 2.29 |
| Comparative Example 40 | Comparative Example 16 | 18,432 | 2.11 |

TABLE 18-continued

| | Properties of coating film | | | |
|---|---|---|---|---|
| | 60° | Hue | | |
| Comparative Examples | gloss (%) | L* value[1] (-) | a* value[1] (-) | b* value[1] (-) |
| Comparative Example 30 | 61 | 63.05 | 1.93 | 76.41 |
| Comparative Example 31 | 65 | 66.06 | 2.62 | 72.96 |
| Comparative Example 32 | 66 | 89.02 | 3.82 | 7.47 |
| Comparative Example 33 | 68 | 61.49 | 5.21 | −19.61 |
| Comparative Example 34 | 71 | 66.07 | 2.92 | −16.35 |
| Comparative Example 35 | 66 | 61.50 | 2.16 | −12.70 |
| Comparative Example 36 | 63 | 64.01 | 1.68 | −20.63 |
| Comparative Example 37 | 66 | 65.04 | 2.34 | −16.78 |
| Comparative Example 38 | 62 | 32.16 | 16.12 | −14.10 |
| Comparative Example 39 | 65 | 30.69 | 21.11 | −10.61 |
| Comparative Example 40 | 70 | 65.26 | 1.04 | 58.26 |

| | Properties of coating film | | |
|---|---|---|---|
| | Hue | | |
| Comparative Examples | L* value[2] (-) | a* value[2] (-) | b* value[2] (-) |
| Comparative Example 30 | 63.53 | 1.93 | 68.51 |
| Comparative Example 31 | 66.40 | 2.62 | 65.23 |
| Comparative Example 32 | 90.70 | 3.82 | 2.97 |
| Comparative Example 33 | 62.06 | 5.21 | −22.77 |
| Comparative Example 34 | 66.41 | 2.92 | −19.67 |
| Comparative Example 35 | 62.07 | 2.16 | −16.20 |
| Comparative Example 36 | 64.44 | 1.68 | −23.74 |
| Comparative Example 37 | 65.42 | 2.34 | −20.08 |
| Comparative Example 38 | 36.90 | 16.12 | −17.53 |
| Comparative Example 39 | 35.74 | 21.11 | −14.22 |
| Comparative Example 40 | 65.63 | 1.04 | 51.26 |

| | Properties of coating film | |
|---|---|---|
| Comparative Examples | Light resistance (ΔE* value) (-) | Transparency (linear absorption) (μm$^{-1}$) |
| Comparative Example 30 | 6.82 | — |
| Comparative Example 31 | 6.56 | — |
| Comparative Example 32 | 6.25 | — |
| Comparative Example 33 | 5.83 | — |
| Comparative Example 34 | 6.58 | — |
| Comparative Example 35 | 7.32 | — |
| Comparative Example 36 | 8.16 | — |
| Comparative Example 37 | 7.77 | — |
| Comparative Example 38 | 6.21 | — |
| Comparative Example 39 | 5.92 | — |
| Comparative Example 40 | 6.68 | — |

(Note)
[1]: Measured by a portable spectrocolorimeter "COLOR-GUIDE 45/0" (manufactured by BYK CHEMIE JAPAN CO., LTD.)

(Note)
[2]: Measured by a multi-spectro-colour-meter "MSC-IS-2D" (manufactured by SUGA TESTING MACHINES MANUFACTURING CO., LTD.)

TABLE 19

| | Production of solvent-based pigment dispersion (mill base) | |
|---|---|---|
| | Composite particles | |
| Examples | Kind | Amount blended (wt. part) |
| Example 100 | Example 12 | 40 |
| Example 101 | Example 15 | 40 |
| Example 102 | Example 16 | 40 |
| Example 103 | Example 17 | 40 |
| Example 104 | Example 18 | 40 |
| Example 105 | Example 20 | 40 |
| Example 106 | Example 21 | 40 |
| Example 107 | Example 22 | 40 |
| Example 108 | Example 12 | 45 |
| Example 109 | Example 15 | 45 |
| Example 110 | Example 12 | 90 |
| Example 111 | Example 15 | 90 |
| Example 112 | Example 12 | 20 |
| Example 113 | Example 12 | 10 |
| Example 114 | Example 12 | 20 |

| | Production of solvent-based pigment dispersion (mill base) | | | |
|---|---|---|---|---|
| | Resin | | Solvent | |
| Examples | Kind | Amount blended (wt. part) | Kind | Amount blended (wt. part) |
| Example 100 | Amino alkyd resin | 20 | Thinner | 40 |
| Example 101 | Amino alkyd resin | 20 | Thinner | 40 |
| Example 102 | Amino alkyd resin | 20 | Thinner | 40 |
| Example 103 | Amino alkyd resin | 20 | Thinner | 40 |
| Example 104 | Amino alkyd resin | 20 | Thinner | 40 |
| Example 105 | Amino alkyd resin | 20 | Thinner | 40 |
| Example 106 | Amino alkyd resin | 20 | Thinner | 40 |
| Example 107 | Amino alkyd resin | 20 | Thinner | 40 |
| Example 108 | Nitrocellulose | 50 | Ethyl acetate | 5 |
| Example 109 | Nitrocellulose | 50 | Ethyl acetate | 5 |
| Example 110 | Rosin-modified phenol resin | 10 | — | — |
| Example 111 | Rosin-modified phenol resin | 10 | — | — |
| Example 112 | Alkyd resin Melamine resin | 50 20 | Xylene | 10 |
| Example 113 | Nitrocellulose | 90 | — | — |
| Example 114 | Urethane resin | 80 | — | — |

TABLE 20

| | Production of pigment dispersion (mill base) Composite particles | |
|---|---|---|
| Examples | Kind | Amount blended (wt. part) |
| Example 115 | Example 28 | 40 |
| Example 116 | Example 31 | 40 |
| Example 117 | Example 32 | 40 |
| Example 118 | Example 33 | 40 |
| Example 119 | Example 34 | 40 |
| Example 120 | Example 36 | 40 |
| Example 121 | Example 37 | 40 |
| Example 122 | Example 38 | 40 |
| Example 123 | Example 42 | 40 |
| Example 124 | Example 45 | 40 |
| Example 125 | Example 47 | 40 |
| Example 126 | Example 48 | 40 |
| Example 127 | Example 28 | 45 |
| Example 128 | Example 31 | 45 |
| Example 129 | Example 28 | 90 |
| Example 130 | Example 31 | 90 |
| Example 131 | Example 28 | 20 |
| Example 132 | Example 28 | 10 |
| Example 133 | Example 28 | 20 |

| | Production of pigment dispersion (mill base) | | | |
|---|---|---|---|---|
| | Resin | | Solvent | |
| Examples | Kind | Amount blended (wt. part) | Kind | Amount blended (wt. part) |
| Example 115 | Amino alkyd resin | 20 | Thinner | 40 |
| Example 116 | Amino alkyd resin | 20 | Thinner | 40 |
| Example 117 | Amino alkyd resin | 20 | Thinner | 40 |
| Example 118 | Amino alkyd resin | 20 | Thinner | 40 |
| Example 119 | Amino alkyd resin | 20 | Thinner | 40 |
| Example 120 | Amino alkyd resin | 20 | Thinner | 40 |
| Example 121 | Amino alkyd resin | 20 | Thinner | 40 |
| Example 122 | Amino alkyd resin | 20 | Thinner | 40 |
| Example 123 | Amino alkyd resin | 20 | Thinner | 40 |
| Example 124 | Amino alkyd resin | 20 | Thinner | 40 |
| Example 125 | Amino alkyd resin | 20 | Thinner | 40 |
| Example 126 | Amino alkyd resin | 20 | Thinner | 40 |
| Example 127 | Nitrocellulose | 50 | Ethyl acetate | 5 |
| Example 128 | Nitrocellulose | 50 | Ethyl acetate | 5 |
| Example 129 | Rosin-modified phenol resin | 10 | — | — |
| Example 130 | Rosin-modified phenol resin | 10 | — | — |
| Example 131 | Alkyd resin Melamine resin | 50 20 | Xylene | 10 |
| Example 132 | Nitrocellulose | 90 | — | — |
| Example 133 | Urethane resin | 80 | — | — |

TABLE 21

| | Production of paint Solvent-based pigment dispersion | |
|---|---|---|
| Examples | Solvent-based pigment dispersion | Amount blended (wt. part) |
| Example 134 | Example 100 | 39.0 |
| Example 135 | Example 101 | 39.0 |
| Example 136 | Example 102 | 39.0 |
| Example 137 | Example 103 | 39.0 |
| Example 138 | Example 104 | 39.0 |
| Example 139 | Example 105 | 39.0 |
| Example 140 | Example 106 | 39.0 |
| Example 141 | Example 107 | 39.0 |

TABLE 21-continued

| | Production of paint Resin | |
|---|---|---|
| Examples | Kind | Amount blended (wt. part) |
| Example 134 | Amino alkyd resin | 61.0 |
| Example 135 | Amino alkyd resin | 61.0 |
| Example 136 | Amino alkyd resin | 61.0 |
| Example 137 | Amino alkyd resin | 61.0 |
| Example 138 | Amino alkyd resin | 61.0 |
| Example 139 | Amino alkyd resin | 61.0 |
| Example 140 | Amino alkyd resin | 61.0 |
| Example 141 | Amino alkyd resin | 61.0 |

TABLE 22

| | Production of paint Solvent-based pigment dispersion | |
|---|---|---|
| Examples | Kind | Amount blended (wt. part) |
| Example 142 | Example 115 | 39.0 |
| Example 143 | Example 116 | 39.0 |
| Example 144 | Example 117 | 39.0 |
| Example 145 | Example 118 | 39.0 |
| Example 146 | Example 119 | 39.0 |
| Example 147 | Example 120 | 39.0 |
| Example 148 | Example 121 | 39.0 |
| Example 149 | Example 122 | 39.0 |
| Example 150 | Example 123 | 39.0 |
| Example 151 | Example 124 | 39.0 |
| Example 152 | Example 125 | 39.0 |
| Example 153 | Example 126 | 39.0 |

| | Production of paint Resin | |
|---|---|---|
| Examples | Kind | Amount blended (wt. part) |
| Example 142 | Amino alkyd resin | 61.0 |
| Example 143 | Amino alkyd resin | 61.0 |
| Example 144 | Amino alkyd resin | 61.0 |
| Example 145 | Amino alkyd resin | 61.0 |
| Example 146 | Amino alkyd resin | 61.0 |
| Example 147 | Amino alkyd resin | 61.0 |
| Example 148 | Amino alkyd resin | 61.0 |
| Example 149 | Amino alkyd resin | 61.0 |
| Example 150 | Amino alkyd resin | 61.0 |
| Example 151 | Amino alkyd resin | 61.0 |
| Example 152 | Amino alkyd resin | 61.0 |
| Example 153 | Amino alkyd resin | 61.0 |

TABLE 23

| | Properties of paint | |
|---|---|---|
| Examples | Viscosity (cP) | Storage stability (—) |
| Example 134 | 873 | 0.86 |
| Example 135 | 724 | 0.71 |
| Example 136 | 703 | 0.60 |
| Example 137 | 914 | 0.90 |
| Example 138 | 856 | 0.81 |
| Example 139 | 870 | 0.41 |
| Example 140 | 853 | 0.19 |
| Example 141 | 847 | 0.33 |

TABLE 23-continued

| | Properties of coating film | | | |
|---|---|---|---|---|
| | 60° | Hue | | |
| Examples | gloss (%) | L* value[1] (-) | a* value[1] (-) | b* value[1] (-) |
| Example 134 | 100 | 55.79 | 49.18 | -0.03 |
| Example 135 | 103 | 14.82 | 9.03 | -17.59 |
| Example 136 | 104 | 57.48 | 48.59 | 24.45 |
| Example 137 | 101 | 79.59 | 2.64 | 77.06 |
| Example 138 | 102 | 82.36 | 1.16 | 84.41 |
| Example 139 | 107 | 35.57 | -18.13 | -6.22 |
| Example 140 | 96 | 33.70 | -7.36 | -28.95 |
| Example 141 | 109 | 15.04 | 9.12 | -17.98 |

| | Properties of coating film Hue | | |
|---|---|---|---|
| Examples | L* value[2] (-) | a* value[2] (-) | b* value[2] (-) |
| Example 134 | 56.83 | 49.18 | -4.16 |
| Example 135 | 23.68 | 9.03 | -20.85 |
| Example 136 | 58.36 | 48.59 | 19.11 |
| Example 137 | 80.13 | 2.64 | 69.13 |
| Example 138 | 83.14 | 1.16 | 76.12 |
| Example 139 | 39.63 | -18.13 | -10.04 |
| Example 140 | 38.13 | -7.36 | -31.65 |
| Example 141 | 23.84 | 9.12 | -21.22 |

| | Properties of coating film | |
|---|---|---|
| Examples | Light resistance (ΔE* value) (-) | Transparency (linear absorption) (μm$^{-1}$) |
| Example 134 | 2.56 | — |
| Example 135 | 1.41 | 0.0683 |
| Example 136 | 1.65 | 0.0644 |
| Example 137 | 2.24 | 0.0598 |
| Example 138 | 2.84 | 0.0546 |
| Example 139 | 2.07 | 0.0695 |
| Example 140 | 1.54 | — |
| Example 141 | 1.16 | 0.0702 |

(Note)
[1]: Measured by a portable spectrocolorimeter "COLOR-GUIDE 45/0" (manufactured by BYK CHEMIE JAPAN CO., LTD.)
(Note)
[2]: Measured by a multi-spectro-colour-meter "MSC-IS-2D" (manufactured by SUGA TESTING MACHINES MANUFACTURING CO., LTD.)

TABLE 24

| | Properties of paint | |
|---|---|---|
| Examples | Viscosity (cP) | Storage stability (-) |
| Example 142 | 823 | 0.83 |
| Example 143 | 842 | 0.61 |
| Example 144 | 897 | 0.65 |
| Example 145 | 830 | 0.85 |
| Example 146 | 872 | 0.76 |
| Example 147 | 1,111 | 0.34 |
| Example 148 | 894 | 0.38 |
| Example 149 | 826 | 0.31 |
| Example 150 | 778 | 0.75 |
| Example 151 | 901 | 0.60 |
| Example 152 | 1,094 | 0.80 |
| Example 153 | 1,003 | 0.69 |

TABLE 24-continued

| | Properties of coating film | | | |
|---|---|---|---|---|
| | 60° | Hue | | |
| Examples | gloss (%) | L* value[1] (-) | a* value[1] (-) | b* value[1] (-) |
| Example 142 | 102 | 9.66 | 7.74 | -20.67 |
| Example 143 | 104 | 71.13 | 10.32 | -20.02 |
| Example 144 | 102 | 32.49 | 53.32 | 25.84 |
| Example 145 | 99 | 8.59 | 1.01 | 80.26 |
| Example 146 | 104 | 34.02 | 7.14 | -20.39 |
| Example 147 | 106 | 69.27 | -16.38 | -2.63 |
| Example 148 | 105 | 14.41 | 1.51 | 81.86 |
| Example 149 | 110 | 28.93 | 10.12 | -21.75 |
| Example 150 | 98 | 13.16 | 32.50 | 11.41 |
| Example 151 | 100 | 64.93 | -13.76 | 1.08 |
| Example 152 | 100 | 8.81 | -13.18 | 12.03 |
| Example 153 | 104 | 68.90 | 4.03 | -17.29 |

| | Properties of coating film Hue | | |
|---|---|---|---|
| Examples | L* value[2] (-) | a* value[2] (-) | b* value[2] (-) |
| Example 142 | 19.93 | 7.74 | -23.78 |
| Example 143 | 71.38 | 10.32 | -23.16 |
| Example 144 | 37.16 | 53.32 | 20.44 |
| Example 145 | 19.16 | 1.01 | 72.17 |
| Example 146 | 38.38 | 7.14 | -23.51 |
| Example 147 | 69.53 | -16.38 | -6.63 |
| Example 148 | 23.38 | 1.51 | 73.69 |
| Example 149 | 34.36 | 10.12 | -24.81 |
| Example 150 | 22.80 | 32.50 | 6.72 |
| Example 151 | 65.31 | -13.76 | -3.10 |
| Example 152 | 19.32 | -13.18 | 7.31 |
| Example 153 | 69.16 | 4.03 | 20.57 |

| | Properties of coating film | |
|---|---|---|
| Examples | Light resistance (ΔE* value) (-) | Transparency (linear absorption) (μm$^{-1}$) |
| Example 142 | 2.53 | — |
| Example 143 | 1.33 | 0.0698 |
| Example 144 | 1.67 | 0.0681 |
| Example 145 | 2.23 | 0.0612 |
| Example 146 | 2.04 | 0.0643 |
| Example 147 | 1.68 | 0.0588 |
| Example 148 | 1.63 | — |
| Example 149 | 1.22 | 0.0687 |
| Example 150 | 2.61 | — |
| Example 151 | 1.46 | 0.0701 |
| Example 152 | 2.06 | 0.0674 |
| Example 153 | 2.27 | 0.0672 |

(Note)
[1]: Measured by a portable spectrocolorimeter "COLOR-GUIDE 45/0" (manufactured by BYK CHEMIE JAPAN CO., LTD.)
(Note)
[2]: Measured by a multi-spectro-colour-meter "MSC-IS-2D" (manufactured by SUGA TESTING MACHINES MANUFACTURING CO., LTD.)

TABLE 25

| | Production of water-based paint | Properties of paint | |
|---|---|---|---|
| Examples | Kind of composite particles | Viscosity (cP) | Storage stability (-) |
| Example 154 | Example 12 | 2,073 | 0.88 |
| Example 155 | Example 13 | 2,560 | 0.57 |
| Example 156 | Example 14 | 2,150 | 0.64 |

TABLE 25-continued

| Example 157 | Example 15 | 1,883 | 0.59 |
| Example 158 | Example 16 | 1,964 | 0.58 |
| Example 159 | Example 17 | 2,123 | 0.91 |
| Example 160 | Example 18 | 2,380 | 0.90 |
| Example 161 | Example 19 | 2,150 | 0.41 |
| Example 162 | Example 20 | 2,262 | 0.40 |
| Example 163 | Example 21 | 2,022 | 0.31 |
| Example 164 | Example 22 | 2,586 | 0.28 |
| Example 165 | Example 23 | 2,301 | 0.29 |
| Example 166 | Example 24 | 2,284 | 0.42 |
| Example 167 | Example 25 | 2,176 | 0.41 |
| Example 168 | Example 26 | 2,169 | 0.90 |
| Example 169 | Example 27 | 2,048 | 0.92 |

|  | Properties of coating film | | |
| --- | --- | --- | --- |
|  | 60° gloss (%) | Hue | | |
| Examples | | L* value[1] (−) | a* value[1] (−) | b* value[1] (−) |
| Example 154 | 91 | 54.32 | 47.13 | −0.96 |
| Example 155 | 92 | 53.38 | 29.66 | 24.46 |
| Example 156 | 93 | 62.16 | −5.32 | −25.32 |
| Example 157 | 94 | 14.33 | 9.86 | −17.37 |
| Example 158 | 92 | 57.99 | 46.36 | 22.24 |
| Example 159 | 86 | 80.69 | 1.14 | 73.75 |
| Example 160 | 86 | 80.16 | 0.90 | 79.63 |
| Example 161 | 93 | 45.36 | 52.26 | 4.92 |
| Example 162 | 96 | 35.60 | −16.37 | −8.45 |
| Example 163 | 96 | 30.36 | −6.98 | −27.32 |
| Example 164 | 98 | 13.45 | 6.81 | −21.28 |
| Example 165 | 95 | 55.01 | 41.38 | 1.57 |
| Example 166 | 92 | 17.34 | −13.65 | −9.95 |
| Example 167 | 90 | 81.63 | 0.64 | 84.31 |
| Example 168 | 92 | 14.76 | 1.41 | −9.41 |
| Example 169 | 94 | 15.69 | −13.12 | −9.19 |

|  | Properties of coating film Hue | | |
| --- | --- | --- | --- |
| Examples | L* value[2] (−) | a* value[2] (−) | b* value[2] (−) |
| Example 154 | 55.24 | 47.13 | −4.66 |
| Example 155 | 54.68 | 29.66 | 19.12 |
| Example 156 | 62.57 | −5.32 | −27.61 |
| Example 157 | 23.32 | 9.86 | −20.64 |
| Example 158 | 58.83 | 46.36 | 17.01 |
| Example 159 | 81.32 | 1.14 | 65.98 |
| Example 160 | 80.80 | 0.90 | 71.28 |
| Example 161 | 47.31 | 52.26 | 0.88 |
| Example 162 | 39.65 | −16.37 | −12.16 |
| Example 163 | 35.12 | −6.98 | −29.50 |
| Example 164 | 22.68 | 6.81 | −24.36 |
| Example 165 | 56.13 | 41.38 | −2.64 |
| Example 166 | 25.63 | −13.65 | −13.59 |
| Example 167 | 82.37 | 0.64 | 75.69 |
| Example 168 | 23.64 | 1.41 | −13.08 |
| Example 169 | 24.50 | −13.12 | −12.87 |

|  | Properties of coating film | |
| --- | --- | --- |
| Examples | Light resistance (ΔE* value) (−) | Transparency (linear absorption) (μm$^{-1}$) |
| Example 154 | 2.68 | — |
| Example 155 | 2.59 | 0.0863 |
| Example 156 | 2.43 | — |
| Example 157 | 1.48 | 0.0872 |
| Example 158 | 1.63 | 0.0844 |
| Example 159 | 2.36 | 0.0818 |
| Example 160 | 3.51 | 0.0763 |
| Example 161 | 1.99 | — |
| Example 162 | 2.16 | 0.0810 |
| Example 163 | 1.78 | — |
| Example 164 | 1.33 | 0.0879 |
| Example 165 | 1.56 | 0.0798 |
| Example 166 | 2.49 | 0.0773 |
| Example 167 | 2.44 | 0.0818 |
| Example 168 | 2.74 | — |
| Example 169 | 2.39 | 0.0899 |

(Note)
[1]: Measured by a portable spectrocolorimeter "COLOR-GUIDE 45/0" (manufactured by BYK CHEMIE JAPAN CO., LTD.)

(Note)
[2]: Measured by a multi-spectro-colour-meter "MSC-IS-2D" (manufactured by SUGA TESTING MACHINES MANUFACTURING CO., LTD.)

TABLE 26

|  | Production of water-based paint | Properties of paint | |
| --- | --- | --- | --- |
| Examples | Kind of composite particles | Viscosity (cP) | Storage stability (−) |
| Example 170 | Example 28 | 2,048 | 0.76 |
| Example 171 | Example 29 | 2,162 | 0.93 |
| Example 172 | Example 30 | 1,920 | 0.56 |
| Example 173 | Example 31 | 1,983 | 0.54 |
| Example 174 | Example 32 | 1,862 | 0.53 |
| Example 175 | Example 33 | 2,014 | 0.90 |
| Example 176 | Example 34 | 1,818 | 0.75 |
| Example 177 | Example 35 | 1,997 | 0.44 |
| Example 178 | Example 36 | 2,026 | 0.36 |
| Example 179 | Example 37 | 1,971 | 0.42 |
| Example 180 | Example 38 | 1,969 | 0.36 |
| Example 181 | Example 39 | 2,156 | 0.35 |
| Example 182 | Example 40 | 2,048 | 0.45 |
| Example 183 | Example 41 | 1,741 | 0.22 |

|  | Properties of coating film | | | |
| --- | --- | --- | --- | --- |
|  | 60° gloss (%) | Hue | | |
| Examples | | L* value[1] (−) | a* value[1] (−) | b* value[1] (−) |
| Example 170 | 93 | 10.20 | 9.21 | −19.25 |
| Example 171 | 95 | 71.07 | 1.68 | 82.35 |
| Example 172 | 91 | 30.64 | 49.63 | 22.42 |
| Example 173 | 94 | 11.46 | 13.62 | −18.41 |
| Example 174 | 96 | 34.40 | 51.24 | 26.81 |
| Example 175 | 94 | 64.94 | 0.32 | 80.25 |
| Example 176 | 90 | 14.96 | 8.26 | −20.54 |
| Example 177 | 103 | 26.47 | 52.62 | 20.31 |
| Example 178 | 98 | 2.21 | −19.63 | −4.74 |
| Example 179 | 100 | 62.03 | 3.26 | 80.64 |
| Example 180 | 103 | 8.31 | 13.62 | −20.00 |
| Example 181 | 100 | 68.08 | 2.61 | 81.85 |
| Example 182 | 98 | 28.12 | 58.65 | 26.60 |
| Example 183 | 98 | 72.37 | 0.03 | 81.83 |

|  | Properties of coating film Hue | | |
| --- | --- | --- | --- |
| Examples | L* value[2] (−) | a* value[2] (−) | b* value[2] (−) |
| Example 170 | 20.32 | 9.21 | −22.43 |
| Example 171 | 71.32 | 1.68 | 74.16 |
| Example 172 | 35.70 | 49.63 | 17.18 |
| Example 173 | 21.23 | 13.62 | −21.63 |
| Example 174 | 38.69 | 51.24 | 21.36 |
| Example 175 | 65.32 | 0.32 | 72.16 |
| Example 176 | 23.78 | 8.26 | −23.66 |
| Example 177 | 32.45 | 52.62 | 15.18 |
| Example 178 | 14.65 | −19.63 | −8.64 |
| Example 179 | 62.57 | 3.26 | 72.53 |
| Example 180 | 18.96 | 13.62 | −23.14 |
| Example 181 | 68.36 | 2.61 | 73.68 |
| Example 182 | 33.73 | 58.65 | 21.61 |

TABLE 26-continued

| Examples | | | |
|---|---|---|---|
| Example 183 | 72.62 | 0.03 | 73.66 |

| | Properties of coating film | |
|---|---|---|
| Examples | Light resistance ($\Delta E^*$ value) (−) | Transparency (linear absorption) ($\mu m^{-1}$) |
| Example 170 | 2.56 | — |
| Example 171 | 2.56 | 0.0862 |
| Example 172 | 2.63 | — |
| Example 173 | 1.49 | 0.0872 |
| Example 174 | 1.63 | 0.0855 |
| Example 175 | 2.48 | 0.0838 |
| Example 176 | 2.65 | 0.0832 |
| Example 177 | 1.86 | — |
| Example 178 | 1.80 | 0.0786 |
| Example 179 | 1.77 | — |
| Example 180 | 1.32 | 0.0851 |
| Example 181 | 1.82 | 0.0797 |
| Example 182 | 1.99 | 0.0834 |
| Example 183 | 1.72 | 0.0893 |

(Note)
[1]: Measured by a portable spectrocolorimeter "COLOR-GUIDE 45/0" (manufactured by BYK CHEMIE JAPAN CO., LTD.)
(Note)
[2]: Measured by a multi-spectro-colour-meter "MSC-IS-2D" (manufactured by SUGA TESTING MACHINES MANUFACTURING CO., LTD.)

TABLE 27

| | Production of water-based paint | Properties of paint | |
|---|---|---|---|
| Examples | Kind of composite particles | Viscosity (cP) | Storage stability (−) |
| Example 184 | Example 42 | 1,946 | 0.65 |
| Example 185 | Example 43 | 2,048 | 0.63 |
| Example 186 | Example 44 | 1,997 | 0.68 |
| Example 187 | Example 45 | 2,560 | 0.65 |
| Example 188 | Example 46 | 2,078 | 0.64 |
| Example 189 | Example 47 | 1,997 | 0.71 |
| Example 190 | Example 48 | 2,074 | 0.53 |
| Example 191 | Example 49 | 1,971 | 0.21 |
| Example 192 | Example 50 | 1,870 | 0.17 |
| Example 193 | Example 51 | 1,920 | 0.16 |
| Example 194 | Example 52 | 1,946 | 0.14 |
| Example 195 | Example 53 | 2,048 | 0.15 |
| Example 196 | Example 54 | 2,160 | 0.34 |
| Example 197 | Example 55 | 2,074 | 0.33 |

| | Properties of coating film | | | |
|---|---|---|---|---|
| | 60° gloss (%) | Hue | | |
| Examples | | $L^*$ value[1] (−) | $a^*$ value[1] (−) | $b^*$ value[1] (−) |
| Example 184 | 96 | 20.41 | 28.65 | 14.59 |
| Example 185 | 95 | 16.11 | −13.18 | 9.22 |
| Example 186 | 87 | 44.68 | 22.11 | 53.57 |
| Example 187 | 94 | 41.31 | −12.87 | 3.28 |
| Example 188 | 96 | 12.00 | 37.68 | 3.16 |
| Example 189 | 92 | 10.60 | −11.76 | 9.86 |
| Example 190 | 95 | 28.28 | 1.68 | −17.77 |
| Example 191 | 98 | 18.32 | 21.68 | 11.98 |
| Example 192 | 101 | 15.24 | −16.32 | −8.43 |
| Example 193 | 99 | 22.96 | 32.65 | 44.62 |
| Example 194 | 104 | 0.26 | −14.54 | 1.83 |
| Example 195 | 102 | 40.09 | 29.63 | 44.97 |
| Example 196 | 99 | 12.03 | 32.48 | −2.11 |
| Example 197 | 99 | 32.70 | 4.69 | −19.54 |

TABLE 27-continued

| | Properties of coating film Hue | | |
|---|---|---|---|
| Examples | $L^*$ value[2] (−) | $a^*$ value[2] (−) | $b^*$ value[2] (−) |
| Example 184 | 27.83 | 28.65 | 9.74 |
| Example 185 | 24.63 | −13.18 | 4.64 |
| Example 186 | 47.14 | 22.11 | 46.80 |
| Example 187 | 44.32 | −12.87 | −1.01 |
| Example 188 | 21.62 | 37.68 | −1.13 |
| Example 189 | 20.61 | −11.76 | 5.24 |
| Example 190 | 33.85 | 1.68 | −21.02 |
| Example 191 | 26.27 | 21.68 | 7.26 |
| Example 192 | 23.99 | −16.32 | −12.14 |
| Example 193 | 29.76 | 32.65 | 38.29 |
| Example 194 | 13.29 | −14.54 | −2.39 |
| Example 195 | 43.31 | 29.63 | 38.62 |
| Example 196 | 21.64 | 32.48 | −6.14 |
| Example 197 | 37.33 | 4.69 | −22.71 |

| | Properties of coating film | |
|---|---|---|
| Examples | Light resistance ($\Delta E^*$ value) (−) | Transparency (linear absorption) ($\mu m^{-1}$) |
| Example 184 | 2.32 | — |
| Example 185 | 1.71 | 0.0871 |
| Example 186 | 2.16 | — |
| Example 187 | 1.44 | 0.0866 |
| Example 188 | 1.56 | 0.840 |
| Example 189 | 1.94 | 0.0851 |
| Example 190 | 2.09 | 0.0892 |
| Example 191 | 1.78 | — |
| Example 192 | 1.74 | 0.0801 |
| Example 193 | 1.68 | — |
| Example 194 | 1.25 | 0.0808 |
| Example 195 | 1.48 | 0.0792 |
| Example 196 | 1.76 | 0.0826 |
| Example 197 | 1.86 | 0.0864 |

(Note)
[1]: Measured by a portable spectrocolorimeter "COLOR-GUIDE 45/0" (manufactured by BYK CHEMIE JAPAN CO., LTD.)
(Note)
[2]: Measured by a multi-spectro-colour-meter "MSC-IS-2D" (manufactured by SUGA TESTING MACHINES MANUFACTURING CO., LTD.)

TABLE 28

| | Production of water-based paint Kind of organic pigments or composite particles | Properties of paint | |
|---|---|---|---|
| Comparative Examples | | Viscosity (cP) | Storage stability (−) |
| Comparative Example 41 | Organic pigment B-1 | 18,623 | 3.13 |
| Comparative Example 42 | Organic pigment B-2 | 19,632 | 4.12 |
| Comparative Example 43 | Organic pigment G-1 | 21,560 | 3.14 |
| Comparative Example 44 | Organic pigment R-1 | 23,121 | 2.86 |
| Comparative Example 45 | Organic pigment R-2 | 18,621 | 3.16 |
| Comparative Example 46 | Organic pigment R-3 | 14,683 | 2.98 |
| Comparative Example 47 | Organic pigment Y-1 | 15,612 | 3.14 |
| Comparative Example 48 | Organic pigment Y-2 | 19,123 | 3.16 |

TABLE 28-continued

| Comparative Examples | | | |
|---|---|---|---|
| Comparative Example 49 | Comparative Example 1 | 21,914 | 1.59 |
| Comparative Example 50 | Comparative Example 2 | 2,202 | 2.56 |
| Comparative Example 51 | Comparative Example 3 | 20,198 | 1.71 |
| Comparative Example 52 | Comparative Example 4 | 2,432 | 2.31 |
| Comparative Example 53 | Comparative Example 5 | 5,680 | 2.18 |

| | Properties of coating film | | | |
|---|---|---|---|---|
| | 60° gloss (%) | Hue L* value[1] (−) | a* value[1] (−) | b* value[1] (−) |
| Comparative Examples | | | | |
| Comparative Example 41 | 56 | 6.45 | 7.14 | −17.86 |
| Comparative Example 42 | 51 | 6.53 | 10.91 | −23.15 |
| Comparative Example 43 | 46 | 12.10 | −16.21 | −7.26 |
| Comparative Example 44 | 56 | 29.95 | 50.16 | 23.61 |
| Comparative Example 45 | 61 | 20.84 | 57.61 | 25.01 |
| Comparative Example 46 | 63 | 33.74 | 44.16 | 22.35 |
| Comparative Example 47 | 28 | 62.68 | 0.08 | 74.36 |
| Comparative Example 48 | 65 | 67.01 | 1.10 | 77.06 |
| Comparative Example 49 | 46 | 56.66 | −2.16 | −23.60 |
| Comparative Example 50 | 59 | 89.03 | 0.32 | 2.26 |
| Comparative Example 51 | 50 | 56.32 | −1.83 | −24.62 |
| Comparative Example 52 | 66 | 73.16 | −0.82 | −3.22 |
| Comparative Example 53 | 48 | 7.84 | 11.62 | −16.70 |

| | Properties of coating film Hue | | |
|---|---|---|---|
| Comparative Examples | L* value[2] (−) | a* value[2] (−) | b* value[2] (−) |
| Comparative Example 41 | 17.64 | 7.14 | −21.11 |
| Comparative Example 42 | 17.69 | 10.91 | −26.14 |
| Comparative Example 43 | 22.10 | −16.21 | −10.60 |
| Comparative Example 44 | 35.16 | 50.16 | −18.32 |
| Comparative Example 45 | 23.16 | 57.61 | 19.65 |
| Comparative Example 46 | 38.16 | 44.16 | 17.12 |
| Comparative Example 47 | 63.18 | 0.08 | 66.56 |
| Comparative Example 48 | 67.32 | 1.10 | 69.13 |
| Comparative Example 49 | 57.39 | −2.16 | −25.99 |
| Comparative Example 50 | 90.50 | 0.32 | −1.62 |
| Comparative Example 51 | 57.07 | −1.83 | 26.95 |
| Comparative Example 52 | 73.48 | −0.82 | −6.79 |
| Comparative Example 53 | 18.63 | 11.62 | −20.01 |

TABLE 28-continued

| | Properties of coating film | |
|---|---|---|
| Comparative Examples | Light resistance (ΔE* value) (−) | Transparency (linear absorption) (μm$^{-1}$) |
| Comparative Example 41 | 12.16 | 0.1962 |
| Comparative Example 42 | 11.32 | 0.2036 |
| Comparative Example 43 | 10.91 | 0.1863 |
| Comparative Example 44 | 15.62 | 0.2562 |
| Comparative Example 45 | 19.32 | 0.1723 |
| Comparative Example 46 | 19.69 | 0.2364 |
| Comparative Example 47 | 19.23 | 0.2264 |
| Comparative Example 48 | 21.62 | 0.2446 |
| Comparative Example 49 | 7.01 | — |
| Comparative Example 50 | 8.12 | — |
| Comparative Example 51 | 7.63 | — |
| Comparative Example 52 | 7.31 | — |
| Comparative Example 53 | 11.16 | — |

(Note)
[1]: Measured by a portable spectrocolorimeter "COLOR-GUIDE 45/0" (manufactured by BYK CHEMIE JAPAN CO., LTD.)
(Note)
[2]: Measured by a multi-spectro-colour-meter "MSC-IS-2D" (manufactured by SUGA TESTING MACHINES MANUFACTURING CO., LTD.)

TABLE 29

| | Production of water-based paint | Properties of paint | |
|---|---|---|---|
| Comparative Examples | Kind of composite particles | Viscosity (cP) | Storage stability (−) |
| Comparative Example 54 | Comparative Example 6 | 5,652 | 1.68 |
| Comparative Example 55 | Comparative Example 7 | 18,683 | 2.32 |
| Comparative Example 56 | Comparative Example 8 | 3,162 | 2.15 |
| Comparative Example 57 | Comparative Example 9 | 19,683 | 2.56 |
| Comparative Example 58 | Comparative Example 10 | 4,683 | 1.63 |
| Comparative Example 59 | Comparative Example 11 | 5,862 | 1.86 |
| Comparative Example 60 | Comparative Example 12 | 15,623 | 2.92 |
| Comparative Example 61 | Comparative Example 13 | 2,836 | 2.33 |
| Comparative Example 62 | Comparative Example 14 | 18,632 | 2.14 |
| Comparative Example 63 | Comparative Example 15 | 21,621 | 2.56 |
| Comparative Example 64 | Comparative Example 16 | 25,600 | 2.84 |

TABLE 29-continued

| | Properties of coating film | | | |
|---|---|---|---|---|
| | 60° gloss (%) | Hue | | |
| Comparative Examples | | L* value[1] (−) | a* value[1] (−) | b* value[1] (−) |
| Comparative Example 54 | 56 | 63.05 | 1.86 | 76.24 |
| Comparative Example 55 | 58 | 68.11 | 1.21 | 74.96 |
| Comparative Example 56 | 63 | 81.66 | 1.58 | 10.41 |
| Comparative Example 57 | 54 | 68.83 | 6.68 | −19.56 |
| Comparative Example 58 | 63 | 66.65 | 2.19 | −20.65 |
| Comparative Example 59 | 61 | 65.78 | 2.22 | −17.28 |
| Comparative Example 60 | 56 | 59.81 | 1.01 | −18.76 |
| Comparative Example 61 | 61 | 58.92 | 2.38 | −17.07 |
| Comparative Example 62 | 53 | 34.09 | 15.24 | −10.98 |
| Comparative Example 63 | 48 | 30.64 | 22.68 | −7.74 |
| Comparative Example 64 | 42 | 65.81 | −2.82 | 59.72 |

| | Properties of coating film | | |
|---|---|---|---|
| | Hue | | |
| Comparative Examples | L* value[2] (−) | a* value[2] (−) | b* value[2] (−) |
| Comparative Example 54 | 63.53 | 1.86 | 68.35 |
| Comparative Example 55 | 68.39 | 1.21 | 67.13 |
| Comparative Example 56 | 82.37 | 1.58 | 5.77 |
| Comparative Example 57 | 69.10 | 6.68 | −22.72 |
| Comparative Example 58 | 66.97 | 2.19 | −23.76 |
| Comparative Example 59 | 66.13 | 2.22 | −20.56 |
| Comparative Example 60 | 60.50 | 1.01 | −21.96 |
| Comparative Example 61 | 59.68 | 2.38 | −20.36 |
| Comparative Example 62 | 38.44 | 15.24 | −14.57 |
| Comparative Example 63 | 35.70 | 22.68 | −11.49 |
| Comparative Example 64 | 66.16 | −2.82 | 52.64 |

| | Properties of coating film | |
|---|---|---|
| Comparative Examples | Light resistance (ΔE* value) (−) | Transparency (linear absorption) (μm⁻¹) |
| Comparative Example 54 | 7.32 | — |
| Comparative Example 55 | 6.83 | — |
| Comparative Example 56 | 5.21 | — |
| Comparative Example 57 | 6.38 | — |
| Comparative Example 58 | 7.62 | — |
| Comparative Example 59 | 6.66 | — |
| Comparative Example 60 | 5.92 | — |
| Comparative Example 61 | 6.31 | — |
| Comparative Example 62 | 5.73 | — |
| Comparative Example 63 | 7.83 | — |
| Comparative Example 64 | 8.93 | — |

(Note)
[1]: Measured by a portable spectrocolorimeter "COLOR-GUIDE 45/0" (manufactured by BYK CHEMIE JAPAN CO., LTD.)

(Note)
[2]: Measured by a multi-spectro-colour-meter "MSC-IS-2D" (manufactured by SUGA TESTING MACHINES MANUFACTURING CO., LTD.)

TABLE 30

| | Production of water-based pigment dispersion (mill base) | |
|---|---|---|
| | Composite particles | |
| Examples | Kind | Amount blended (wt. part) |
| Example 198 | Example 12 | 40.8 |
| Example 199 | Example 15 | 40.8 |
| Example 200 | Example 16 | 40.8 |
| Example 201 | Example 17 | 40.8 |
| Example 202 | Example 18 | 40.8 |
| Example 203 | Example 20 | 40.8 |
| Example 204 | Example 21 | 40.8 |
| Example 205 | Example 22 | 40.8 |
| Example 206 | Example 12 | 30.0 |
| Example 207 | Example 15 | 30.0 |
| Example 208 | Example 15 | 10.8 |
| Example 209 | Example 16 | 10.8 |
| Example 210 | Example 12 | 40.6 |
| Example 211 | Example 12 | 23.0 |
| Example 212 | Example 12 | 10.0 |
| Example 213 | Example 12 | 10.0 |
| Example 214 | Example 12 | 40.0 |

| | Production of water-based pigment dispersion (mill base) | |
|---|---|---|
| | Resin | |
| Examples | Kind | Amount blended (wt. part) |
| Example 198 | Water-soluble alkyd resin | 29.6 |
| Example 199 | Water-soluble alkyd resin | 29.6 |
| Example 200 | Water-soluble alkyd resin | 29.6 |
| Example 201 | Water-soluble alkyd resin | 29.6 |
| Example 202 | Water-soluble alkyd resin | 29.6 |
| Example 203 | Water-soluble alkyd resin | 29.6 |
| Example 204 | Water-soluble alkyd resin | 29.6 |
| Example 205 | Water-soluble alkyd resin | 29.6 |
| Example 206 | Water-soluble acrylic resin | 56.0 |
| Example 207 | Water-soluble acrylic resin | 56.0 |
| Example 208 | Styrene-acrylic acid-methacrylate resin | 10.8 |
| Example 209 | Styrene-acrylic acid-methacrylate resin | 10.8 |
| Example 210 | Polyoxyethylene-alkylamine | 10.2 |
| Example 211 | Styrene-acrylic resin | 5.0 |
| | Styrene-acrylic emulsion | 30.0 |
| Example 212 | Water-soluble acrylic resin | 15.0 |
| | Melamine resin | 5.0 |
| Example 213 | Water-soluble polyester resin | 15.0 |
| | Melamine resin | 5.0 |
| Example 214 | Water-soluble urethane resin | 40.0 |

TABLE 30-continued

Production of water-based pigment dispersion (mill base)
Additives

| Examples | Kind | Amount blended (wt. part) |
|---|---|---|
| Example 198 | Anti-foaming agent | 0.3 |
| Example 199 | Anti-foaming agent | 0.3 |
| Example 200 | Anti-foaming agent | 0.3 |
| Example 201 | Anti-foaming agent | 0.3 |
| Example 202 | Anti-foaming agent | 0.3 |
| Example 203 | Anti-foaming agent | 0.3 |
| Example 204 | Anti-foaming agent | 0.3 |
| Example 205 | Anti-foaming agent | 0.3 |
| Example 206 | — | — |
| Example 207 | — | — |
| Example 208 | Glycerine | 5.4 |
| Example 209 | Glycerine | 5.4 |
| Example 210 | Ethylene glycol | 10.2 |
| Example 211 | polyethylene wax | 2.0 |
| Example 212 | — | — |
| Example 213 | — | — |
| Example 214 | — | — |

Production of water-based pigment dispersion (mill base)
Solvent

| Examples | Kind | Amount blended (wt. part) |
|---|---|---|
| Example 198 | Water | 15.8 |
|  | Butylcellosolve | 13.5 |
| Example 199 | Water | 15.8 |
|  | Butylcellosolve | 13.5 |
| Example 200 | Water | 15.8 |
|  | Butylcellosolve | 13.5 |
| Example 201 | Water | 15.8 |
|  | Butylcellosolve | 13.5 |
| Example 202 | Water | 15.8 |
|  | Butylcellosolve | 13.5 |
| Example 203 | Water | 15.8 |
|  | Butylcellosolve | 13.5 |
| Example 204 | Water | 15.8 |
|  | Butylcellosolve | 13.5 |
| Example 205 | Water | 15.8 |
|  | Butylcellosolve | 13.5 |
| Example 206 | Water | 14.0 |
| Example 207 | Water | 14.0 |
| Example 208 | Water | 62.2 |
|  | Isopropyl alcohol | 10.8 |
| Example 209 | Water | 62.2 |
|  | Isopropyl alcohol | 10.8 |
| Example 210 | Water | 39.1 |
| Example 211 | Water | 30.0 |
|  | Isopropyl alcohol | 10.0 |
| Example 212 | Water | 70.0 |
| Example 213 | Water | 70.0 |
| Example 214 | Ethanol | 20.0 |

TABLE 31

Production of water-based pigment dispersion (mill base)
Composite particles

| Examples | Kind | Amount blended (wt. part) |
|---|---|---|
| Examples 215 | Examples 28 | 40.8 |
| Examples 216 | Examples 31 | 40.8 |
| Examples 217 | Examples 32 | 40.8 |
| Examples 218 | Examples 33 | 40.8 |
| Examples 219 | Examples 34 | 40.8 |
| Examples 220 | Examples 36 | 40.8 |
| Examples 221 | Examples 37 | 40.8 |
| Examples 222 | Examples 38 | 40.8 |
| Examples 223 | Examples 42 | 40.8 |
| Examples 224 | Examples 45 | 40.8 |
| Examples 225 | Examples 47 | 40.8 |
| Examples 226 | Examples 48 | 40.8 |
| Examples 227 | Examples 28 | 30.0 |
| Examples 228 | Examples 31 | 30.0 |
| Examples 229 | Examples 31 | 10.8 |
| Examples 230 | Examples 32 | 10.8 |
| Examples 231 | Examples 28 | 40.6 |
| Examples 232 | Examples 28 | 23.0 |
| Examples 233 | Examples 28 | 10.0 |
| Examples 234 | Examples 28 | 10.0 |
| Examples 235 | Examples 28 | 40.0 |

Production of water-based pigment dispersion (mill base)
Resin

| Examples | Kind | Amount blended (wt. part) |
|---|---|---|
| Examples 215 | Water-soluble alkyd resin | 29.6 |
| Examples 216 | Water-soluble alkyd resin | 29.6 |
| Examples 217 | Water-soluble alkyd resin | 29.6 |
| Examples 218 | Water-soluble alkyd resin | 29.6 |
| Examples 219 | Water-soluble alkyd resin | 29.6 |
| Examples 220 | Water-soluble alkyd resin | 29.6 |
| Examples 221 | Water-soluble alkyd resin | 29.6 |
| Examples 222 | Water-soluble alkyd resin | 29.6 |
| Examples 223 | Water-soluble alkyd resin | 29.6 |
| Examples 224 | Water-soluble alkyd resin | 29.6 |
| Examples 225 | Water-soluble alkyd resin | 29.6 |
| Examples 226 | Water-soluble alkyd resin | 29.6 |
| Examples 227 | Water-soluble acrylic resin | 56.0 |
| Examples 228 | Water-soluble acrylic resin | 56.0 |
| Examples 229 | Styrene-acrylic acid-methacrylate resin | 10.8 |
| Examples 230 | Styrene-acrylic acid-methacrylate resin | 10.8 |
| Examples 231 | Polyoxyethylene-alkylamine | 10.2 |
| Examples 232 | Styrene-acrylic resin | 5.0 |
|  | Styrene-acrylic emulsion | 30.0 |
| Examples 233 | Water-soluble acrylic resin | 15.0 |
|  | Melamine resin | 5.0 |
| Examples 234 | Water-soluble polyester resin | 15.0 |
|  | Melamine resin | 5.0 |
| Examples 235 | Water-soluble urethane resin | 40.0 |

Production of water-based pigment dispersion (mill base)
Additives

| Examples | Kind | Amount blended (wt. part) |
|---|---|---|
| Examples 215 | Anti-foaming agent | 0.3 |
| Examples 216 | Anti-foaming agent | 0.3 |
| Examples 217 | Anti-foaming agent | 0.3 |
| Examples 218 | Anti-foaming agent | 0.3 |
| Examples 219 | Anti-foaming agent | 0.3 |
| Examples 220 | Anti-foaming agent | 0.3 |
| Examples 221 | Anti-foaming agent | 0.3 |
| Examples 222 | Anti-foaming agent | 0.3 |
| Examples 223 | Anti-foaming agent | 0.3 |
| Examples 224 | Anti-foaming agent | 0.3 |
| Examples 225 | Anti-foaming agent | 0.3 |
| Examples 226 | Anti-foaming agent | 0.3 |
| Examples 227 | — | — |
| Examples 228 | — | — |
| Examples 229 | Glycerine | 5.4 |
| Examples 230 | Glycerine | 5.4 |
| Examples 231 | Ethylene glycol | 10.2 |
| Examples 232 | polyethylene wax | 2.0 |
| Examples 233 | — | — |
| Examples 234 | — | — |
| Examples 235 | — | — |

TABLE 31-continued

Production of water-based pigment dispersion (mill base)
Solvent

| Examples | Kind | Amount blended (wt. part) |
|---|---|---|
| Examples 215 | Water | 15.8 |
| | Butylcellosolve | 13.5 |
| Examples 216 | Water | 15.8 |
| | Butylcellosolve | 13.5 |
| Examples 217 | Water | 15.8 |
| | Butylcellosolve | 13.5 |
| Examples 218 | Water | 15.8 |
| | Butylcellosolve | 13.5 |
| Examples 219 | Water | 15.8 |
| | Butylcellosolve | 13.5 |
| Examples 220 | Water | 15.8 |
| | Butylcellosolve | 13.5 |
| Examples 221 | Water | 15.8 |
| | Butylcellosolve | 13.5 |
| Examples 222 | Water | 15.8 |
| | Butylcellosolve | 13.5 |
| Examples 223 | Water | 15.8 |
| | Butylcellosolve | 13.5 |
| Examples 224 | Water | 15.8 |
| | Butylcellosolve | 13.5 |
| Examples 225 | Water | 15.8 |
| | Butylcellosolve | 13.5 |
| Examples 226 | Water | 15.8 |
| | Butylcellosolve | 13.5 |
| Examples 227 | Water | 14.0 |
| Examples 228 | Water | 14.0 |
| Examples 229 | Water | 62.2 |
| | Isopropyl alcohol | 10.8 |
| Examples 230 | Water | 62.2 |
| | Isopropyl alcohol | 10.8 |
| Examples 231 | Water | 39.1 |
| Examples 232 | Water | 30.0 |
| | Isopropyl alcohol | 10.0 |
| Examples 233 | Water | 70.0 |
| Examples 234 | Water | 70.0 |
| Examples 235 | Ethanol | 20.0 |

TABLE 32

Production of paint
Water-based pigment dispersion

| Examples | Kind | Amount blended (wt. part) |
|---|---|---|
| Examples 236 | Example 198 | 30.4 |
| Examples 237 | Example 199 | 30.4 |
| Examples 238 | Example 200 | 30.4 |
| Examples 239 | Example 201 | 30.4 |
| Examples 240 | Example 202 | 30.4 |
| Examples 241 | Example 203 | 30.4 |
| Examples 242 | Example 204 | 30.4 |
| Examples 243 | Example 205 | 30.4 |

Production of paint
Resin

| Examples | Kind | Amount blended (wt. part) |
|---|---|---|
| Examples 236 | Water-soluble alkyd resin | 46.2 |
| | Water-soluble melamine resin | 12.6 |
| Examples 237 | Water-soluble alkyd resin | 46.2 |
| | Water-soluble melamine resin | 12.6 |
| Examples 238 | Water-soluble alkyd resin | 46.2 |
| | Water-soluble melamine resin | 12.6 |
| Examples 239 | Water-soluble alkyd resin | 46.2 |
| | Water-soluble melamine resin | 12.6 |

TABLE 32-continued

| Examples 240 | Water-soluble alkyd resin | 46.2 |
|---|---|---|
| | Water-soluble melamine resin | 12.6 |
| Examples 241 | Water-soluble alkyd resin | 46.2 |
| | Water-soluble melamine resin | 12.6 |
| Examples 242 | Water-soluble alkyd resin | 46.2 |
| | Water-soluble melamine resin | 12.6 |
| Examples 243 | Water-soluble alkyd resin | 46.2 |
| | Water-soluble melamine resin | 12.6 |

Production of paint
Additives

| Examples | Kind | Amount blended (wt. part) |
|---|---|---|
| Examples 236 | Anti-foaming agent | 0.1 |
| Examples 237 | Anti-foaming agent | 0.1 |
| Examples 238 | Anti-foaming agent | 0.1 |
| Examples 239 | Anti-foaming agent | 0.1 |
| Examples 240 | Anti-foaming agent | 0.1 |
| Examples 241 | Anti-foaming agent | 0.1 |
| Examples 242 | Anti-foaming agent | 0.1 |
| Examples 243 | Anti-foaming agent | 0.1 |

Production of paint
Solvent

| Examples | Kind | Amount blended (wt. part) |
|---|---|---|
| Examples 236 | Water | 9.1 |
| Examples 237 | Water | 9.1 |
| Examples 238 | Water | 9.1 |
| Examples 239 | Water | 9.1 |
| Examples 240 | Water | 9.1 |
| Examples 241 | Water | 9.1 |
| Examples 242 | Water | 9.1 |
| Examples 243 | Water | 9.1 |

TABLE 33

Production of paint
Water-based pigment dispersion

| Examples | Kind | Amount blended (wt. part) |
|---|---|---|
| Examples 244 | Examples 215 | 30.4 |
| Examples 245 | Examples 216 | 30.4 |
| Examples 246 | Examples 217 | 30.4 |
| Examples 247 | Examples 218 | 30.4 |
| Examples 248 | Examples 219 | 30.4 |
| Examples 249 | Examples 220 | 30.4 |
| Examples 250 | Examples 221 | 30.4 |
| Examples 251 | Examples 222 | 30.4 |
| Examples 252 | Examples 223 | 30.4 |
| Examples 253 | Examples 224 | 30.4 |
| Examples 254 | Examples 225 | 30.4 |
| Examples 255 | Examples 226 | 30.4 |

Production of paint
Resin

| Examples | Kind | Amount blended (wt. part) |
|---|---|---|
| Examples 244 | Water-soluble alkyd resin | 46.2 |
| | Water-soluble melamine resin | 12.6 |
| Examples 245 | Water-soluble alkyd resin | 46.2 |
| | Water-soluble melamine resin | 12.6 |
| Examples 246 | Water-soluble alkyd resin | 46.2 |
| | Water-soluble melamine resin | 12.6 |
| Examples 247 | Water-soluble alkyd resin | 46.2 |
| | Water-soluble melamine resin | 12.6 |
| Examples 248 | Water-soluble alkyd resin | 46.2 |
| | Water-soluble melamine resin | 12.6 |

TABLE 33-continued

| Examples | | Amount |
|---|---|---|
| Examples 249 | Water-soluble alkyd resin | 46.2 |
| | Water-soluble melamine resin | 12.6 |
| Examples 250 | Water-soluble alkyd resin | 46.2 |
| | Water-soluble melamine resin | 12.6 |
| Examples 251 | Water-soluble alkyd resin | 46.2 |
| | Water-soluble melamine resin | 12.6 |
| Examples 252 | Water-soluble alkyd resin | 46.2 |
| | Water-soluble melamine resin | 12.6 |
| Examples 253 | Water-soluble alkyd resin | 46.2 |
| | Water-soluble melamine resin | 12.6 |
| Examples 254 | Water-soluble alkyd resin | 46.2 |
| | Water-soluble melamine resin | 12.6 |
| Examples 255 | Water-soluble alkyd resin | 46.2 |
| | Water-soluble melamine resin | 12.6 |

| | Production of paint Additives | |
|---|---|---|
| Examples | Kind | Amount blended (wt. part) |
| Examples 244 | Anti-foaming agent | 0.1 |
| Examples 245 | Anti-foaming agent | 0.1 |
| Examples 246 | Anti-foaming agent | 0.1 |
| Examples 247 | Anti-foaming agent | 0.1 |
| Examples 248 | Anti-foaming agent | 0.1 |
| Examples 249 | Anti-foaming agent | 0.1 |
| Examples 250 | Anti-foaming agent | 0.1 |
| Examples 251 | Anti-foaming agent | 0.1 |
| Examples 252 | Anti-foaming agent | 0.1 |
| Examples 253 | Anti-foaming agent | 0.1 |
| Examples 254 | Anti-foaming agent | 0.1 |
| Examples 255 | Anti-foaming agent | 0.1 |

| | Production of paint Solvent | |
|---|---|---|
| Examples | Kind | Amount blended (wt. part) |
| Examples 244 | Water | 9.1 |
| Examples 245 | Water | 9.1 |
| Examples 246 | Water | 9.1 |
| Examples 247 | Water | 9.1 |
| Examples 248 | Water | 9.1 |
| Examples 249 | Water | 9.1 |
| Examples 250 | Water | 9.1 |
| Examples 251 | Water | 9.1 |
| Examples 252 | Water | 9.1 |
| Examples 253 | Water | 9.1 |
| Examples 254 | Water | 9.1 |
| Examples 255 | Water | 9.1 |

TABLE 34

| | Properties of paint | |
|---|---|---|
| Examples | Viscosity (cP) | Storage stability (−) |
| Examples 236 | 1,563 | 0.84 |
| Examples 237 | 1,462 | 0.55 |
| Examples 238 | 1,382 | 0.55 |
| Examples 239 | 1,563 | 0.86 |
| Examples 240 | 1,481 | 0.84 |
| Examples 241 | 1,586 | 0.36 |
| Examples 242 | 1,396 | 0.27 |
| Examples 243 | 1,280 | 0.19 |

TABLE 34-continued

| | Properties of coating film | | | |
|---|---|---|---|---|
| | 60° | Hue | | |
| Examples | Gloss (%) | L* value[1] (−) | a* value[1] (−) | b* value[1] (−) |
| Examples 236 | 96 | 57.43 | 47.32 | 0.53 |
| Examples 237 | 98 | 14.82 | 8.16 | −18.42 |
| Examples 238 | 96 | 58.05 | 47.32 | 23.28 |
| Examples 239 | 92 | 77.88 | 1.57 | 74.73 |
| Examples 240 | 93 | 80.06 | 1.01 | 83.58 |
| Examples 241 | 101 | 34.99 | −17.63 | −7.82 |
| Examples 242 | 103 | 29.91 | −7.32 | −28.92 |
| Examples 243 | 105 | 8.81 | 7.68 | −19.46 |

| | Properties of coating film Hue | | |
|---|---|---|---|
| Examples | L* value[2] (−) | a* value[2] (−) | b* value[2] (−) |
| Examples 236 | 58.32 | 47.32 | −3.63 |
| Examples 237 | 23.68 | 8.16 | −21.64 |
| Examples 238 | 58.88 | 47.32 | 18.00 |
| Examples 239 | 78.32 | 1.57 | 66.91 |
| Examples 240 | 80.64 | 1.01 | 75.33 |
| Examples 241 | 39.16 | −17.63 | −11.56 |
| Examples 242 | 35.13 | −7.32 | −31.62 |
| Examples 243 | 19.32 | 7.68 | −22.63 |

| | Properties of coating film | |
|---|---|---|
| Examples | Light resistance (ΔE* value) (−) | Transparency (linear absorption) (μm$^{-1}$) |
| Examples 236 | 2.53 | — |
| Examples 237 | 1.38 | 0.0722 |
| Examples 238 | 1.60 | 0.0695 |
| Examples 239 | 2.15 | 0.0678 |
| Examples 240 | 3.36 | 0.0626 |
| Examples 241 | 2.06 | 0.0663 |
| Examples 242 | 1.67 | — |
| Examples 243 | 1.29 | 0.0715 |

(Note)
[1]: Measured by a portable spectrocolorimeter "COLOR-GUIDE 45/0" (manufactured by BYK CHEMIE JAPAN CO., LTD.)
(Note)
[2]: Measured by a multi-spectro-colour-meter "MSC-IS-2D" (manufactured by SUGA TESTING MACHINES MANUFACTURING CO., LTD.)

TABLE 35

| | Properties of water-based paint | |
|---|---|---|
| Examples | Viscosity (cP) | Storage stability (−) |
| Examples 244 | 1,463 | 0.70 |
| Examples 245 | 1,563 | 0.49 |
| Examples 246 | 1,496 | 0.48 |
| Examples 247 | 1,583 | 0.85 |
| Examples 248 | 1,462 | 0.62 |
| Examples 249 | 1,386 | 0.31 |
| Examples 250 | 1,260 | 0.36 |
| Examples 251 | 1,496 | 0.32 |
| Examples 252 | 1,515 | 0.60 |
| Examples 253 | 1,516 | 0.61 |
| Examples 254 | 1,493 | 0.66 |
| Examples 255 | 1,486 | 0.47 |

TABLE 35-continued

| | Properties of coating film | | | |
|---|---|---|---|---|
| | 60° | Hue | | |
| Examples | Gloss (%) | L* value[1] (-) | a* value[1] (-) | b* value[1] (-) |
| Examples 244 | 97 | 11.58 | 9.11 | -19.39 |
| Examples 245 | 98 | 9.31 | 11.99 | -20.02 |
| Examples 246 | 100 | 33.08 | 53.16 | 25.83 |
| Examples 247 | 99 | 71.07 | 1.02 | 80.25 |
| Examples 248 | 97 | 11.40 | 7.63 | -18.75 |
| Examples 249 | 103 | 13.16 | -17.12 | -7.16 |
| Examples 250 | 105 | 67.83 | 1.66 | 80.22 |
| Examples 251 | 108 | 7.19 | 11.16 | -21.07 |
| Examples 252 | 101 | 20.84 | 29.16 | 12.37 |
| Examples 253 | 98 | 41.45 | -13.64 | 3.00 |
| Examples 254 | 97 | 14.76 | -12.03 | 10.41 |
| Examples 255 | 101 | 32.07 | 2.16 | -17.72 |

| | Properties of coating film Hue | | |
|---|---|---|---|
| Examples | L* value[2] (-) | a* value[2] (-) | b* value[2] (-) |
| Examples 244 | 21.32 | 9.11 | -22.56 |
| Examples 245 | 19.68 | 11.99 | -23.16 |
| Examples 246 | 37.63 | 53.16 | 20.43 |
| Examples 247 | 71.32 | 1.02 | 72.16 |
| Examples 248 | 21.19 | 7.63 | -21.95 |
| Examples 249 | 22.80 | -17.12 | -10.50 |
| Examples 250 | 68.12 | 1.66 | 72.13 |
| Examples 251 | 18.16 | 11.16 | -24.16 |
| Examples 252 | 28.16 | 29.16 | 7.63 |
| Examples 253 | 44.44 | -13.64 | -1.28 |
| Examples 254 | 23.64 | -12.03 | 5.77 |
| Examples 255 | 36.83 | 2.16 | -20.98 |

| | Properties of coating film | |
|---|---|---|
| Examples | Light resistance (ΔE* value) (-) | Transparency (linear absorption) (μm$^{-1}$) |
| Examples 244 | 2.44 | — |
| Examples 245 | 1.41 | 0.0720 |
| Examples 246 | 1.58 | 0.0702 |
| Examples 247 | 2.42 | 0.0695 |
| Examples 248 | 2.60 | 0.0688 |
| Examples 249 | 1.73 | 0.0636 |
| Examples 250 | 1.69 | — |
| Examples 251 | 1.26 | 0.0701 |
| Examples 252 | 2.25 | — |
| Examples 253 | 1.40 | 0.0726 |
| Examples 254 | 1.88 | 0.0697 |
| Examples 255 | 2.01 | 0.0734 |

(Note)
[1]: Measured by a portable spectrocolorimeter "COLOR-GUIDE 45/0" (manufactured by BYK CHEMIE JAPAN CO., LTD.)
(Note)
[2]: Measured by a multi-spectro-colour-meter "MSC-IS-2D" (manufactured by SUGA TESTING MACHINES MANUFACTURING CO., LTD.)

TABLE 36

| Examples | Production of resin composition Kind of composite particles | Properties of resin composition Dispersing condition (-) |
|---|---|---|
| Examples 256 | Examples 12 | 5 |
| Examples 257 | Examples 13 | 4 |
| Examples 258 | Examples 14 | 5 |
| Examples 259 | Examples 15 | 5 |
| Examples 260 | Examples 16 | 5 |
| Examples 261 | Examples 17 | 5 |
| Examples 262 | Examples 18 | 5 |
| Examples 263 | Examples 19 | 5 |
| Examples 264 | Examples 20 | 5 |
| Examples 265 | Examples 21 | 4 |
| Examples 266 | Examples 22 | 4 |
| Examples 267 | Examples 23 | 5 |
| Examples 268 | Examples 24 | 5 |
| Examples 269 | Examples 25 | 5 |
| Examples 270 | Examples 26 | 5 |
| Examples 271 | Examples 27 | 4 |

| | Properties of resin composition Hue | | |
|---|---|---|---|
| Examples | L* value[1] (-) | a* value[1] (-) | b* value[1] (-) |
| Examples 256 | 55.66 | 45.26 | -0.86 |
| Examples 257 | 53.87 | 33.16 | 23.16 |
| Examples 258 | 65.32 | -4.68 | -25.01 |
| Examples 259 | 8.52 | 6.43 | -15.26 |
| Examples 260 | 53.32 | 45.16 | 20.30 |
| Examples 261 | 76.31 | 4.62 | 73.16 |
| Examples 262 | 80.11 | 0.87 | 82.63 |
| Examples 263 | 47.32 | 50.69 | 4.65 |
| Examples 264 | 34.96 | -16.14 | -2.68 |
| Examples 265 | 31.62 | -6.31 | -26.63 |
| Examples 266 | 12.00 | 5.42 | -15.28 |
| Examples 267 | 53.98 | 35.62 | 2.58 |
| Examples 268 | 17.13 | -16.54 | -7.73 |
| Examples 269 | 83.21 | 0.46 | 84.34 |
| Examples 270 | 9.94 | 4.18 | -6.83 |
| Examples 271 | 16.12 | -17.16 | -8.98 |

| | Properties of resin composition Hue | | |
|---|---|---|---|
| Examples | L* value[2] (-) | a* value[2] (-) | b* value[2] (-) |
| Examples 256 | 56.47 | 45.26 | -4.56 |
| Examples 257 | 55.11 | 33.16 | 17.89 |
| Examples 258 | 65.63 | -4.68 | -27.32 |
| Examples 259 | 19.11 | 6.43 | -18.64 |
| Examples 260 | 54.62 | 45.16 | 15.17 |
| Examples 261 | 76.62 | 4.62 | 65.42 |
| Examples 262 | 80.75 | 0.87 | 74.11 |
| Examples 263 | 49.00 | 50.69 | 0.63 |
| Examples 264 | 39.14 | -16.14 | -6.68 |
| Examples 265 | 36.09 | -6.31 | -28.85 |
| Examples 266 | 21.62 | 5.42 | -18.66 |
| Examples 267 | 55.21 | 35.62 | -1.68 |
| Examples 268 | 25.49 | -16.54 | -11.48 |
| Examples 269 | 84.08 | 0.46 | 75.72 |
| Examples 270 | 20.13 | 4.18 | -10.62 |
| Examples 271 | 24.79 | -17.16 | -12.67 |

| | Properties of resin composition | |
|---|---|---|
| Examples | Light resistance (ΔE* value) (-) | Transparency (linear absorption) (μm$^{-1}$) |
| Examples 256 | 2.83 | — |
| Examples 257 | 2.38 | 0.0804 |
| Examples 258 | 2.54 | — |
| Examples 259 | 1.36 | 0.0848 |
| Examples 260 | 1.55 | 0.0813 |
| Examples 261 | 2.38 | 0.0786 |
| Examples 262 | 3.25 | 0.0766 |
| Examples 263 | 1.66 | — |
| Examples 264 | 2.26 | 0.0814 |
| Examples 265 | 1.43 | — |
| Examples 266 | 1.34 | 0.0858 |
| Examples 267 | 1.56 | 0.0764 |
| Examples 268 | 2.24 | 0.0748 |
| Examples 269 | 2.34 | 0.0813 |

TABLE 36-continued

| Examples 270 | 2.56 | — |
| Examples 271 | 2.22 | 0.0867 |

(Note)
[1]: Measured by a portable spectrocolorimeter "COLOR-GUIDE 45/0" (manufactured by BYK CHEMIE JAPAN CO., LTD.)
(Note)
[2]: Measured by a multi-spectro-colour-meter "MSC-IS-2D" (manufactured by SUGA TESTING MACHINES MANUFACTURING CO., LTD.)

TABLE 37

| Examples | Production of resin composition Kind of composite particles | Properties of resin composition Dispersing condition (−) |
|---|---|---|
| Examples 272 | Examples 28 | 5 |
| Examples 273 | Examples 29 | 5 |
| Examples 274 | Examples 30 | 5 |
| Examples 275 | Examples 31 | 5 |
| Examples 276 | Examples 32 | 5 |
| Examples 277 | Examples 33 | 5 |
| Examples 278 | Examples 34 | 5 |
| Examples 279 | Examples 35 | 5 |
| Examples 280 | Examples 36 | 5 |
| Examples 281 | Examples 37 | 5 |
| Examples 282 | Examples 38 | 5 |
| Examples 283 | Examples 39 | 5 |
| Examples 284 | Examples 40 | 5 |
| Examples 285 | Examples 41 | 5 |

| | Properties of resin composition Hue | | |
|---|---|---|---|
| Examples | L* value[1] (−) | a* value[1] (−) | b* value[1] (−) |
| Examples 272 | 7.83 | 8.93 | −19.52 |
| Examples 273 | 66.64 | 0.11 | 76.01 |
| Examples 274 | 25.86 | 43.11 | 20.38 |
| Examples 275 | 6.79 | 8.64 | −18.08 |
| Examples 276 | 29.94 | 50.16 | 23.94 |
| Examples 277 | 65.31 | 0.52 | 74.97 |
| Examples 278 | 9.55 | 5.24 | −19.56 |
| Examples 279 | 26.26 | 46.32 | 19.84 |
| Examples 280 | 13.14 | −14.11 | −6.43 |
| Examples 281 | 59.93 | 1.16 | 71.92 |
| Examples 282 | 4.33 | 8.32 | −20.00 |
| Examples 283 | 68.04 | 0.82 | 77.09 |
| Examples 284 | 26.06 | 54.00 | 22.36 |
| Examples 285 | 66.62 | −1.03 | 72.93 |

| | Properties of resin composition Hue | | |
|---|---|---|---|
| Examples | L* value[2] (−) | a* value[2] (−) | b* value[2] (−) |
| Examples 272 | 18.62 | 8.93 | −22.69 |
| Examples 273 | 66.96 | 0.11 | 68.13 |
| Examples 274 | 31.98 | 43.11 | 15.24 |
| Examples 275 | 17.88 | 8.64 | −21.32 |
| Examples 276 | 35.15 | 50.16 | 18.63 |
| Examples 277 | 65.68 | 0.52 | 67.14 |
| Examples 278 | 19.85 | 5.24 | −22.72 |
| Examples 279 | 32.29 | 46.32 | 14.73 |
| Examples 280 | 22.79 | −14.11 | −9.81 |
| Examples 281 | 60.61 | 1.16 | 64.24 |
| Examples 282 | 16.14 | 8.32 | −23.14 |
| Examples 283 | 68.32 | 0.82 | 69.16 |
| Examples 284 | 32.13 | 54.00 | 17.13 |
| Examples 285 | 66.94 | −1.03 | 65.20 |

TABLE 37-continued

| | Properties of resin composition | |
|---|---|---|
| Examples | Light resistance (ΔE* value) (−) | Transparency (linear absorption) (μm$^{-1}$) |
| Examples 272 | 2.66 | — |
| Examples 273 | 2.43 | 0.00833 |
| Examples 274 | 2.62 | — |
| Examples 275 | 1.42 | 0.0856 |
| Examples 276 | 1.56 | 0.0836 |
| Examples 277 | 2.43 | 0.0779 |
| Examples 278 | 2.43 | 0.0816 |
| Examples 279 | 1.86 | — |
| Examples 280 | 1.86 | 0.0761 |
| Examples 281 | 1.63 | — |
| Examples 282 | 1.23 | 0.0838 |
| Examples 283 | 1.64 | 0.0795 |
| Examples 284 | 1.86 | 0.0812 |
| Examples 285 | 1.32 | 0.0888 |

(Note) 1): Measured by a portable spectrocolorimeter "COLOR-GUIDE 45/0" (manufactured by BYK CHEMIE JAPAN CO., LTD.)
(Note) 2): Measured by a multi-spectro-colour-meter "MSC-IS-2D" (manufactured by SUGA TESTING MACHINES MANUFACTURING CO., LTD.)

TABLE 38

| Examples | Production of resin composition Kind of composite particles | Properties of resin composition Dispersing condition (−) |
|---|---|---|
| Examples 286 | Examples 42 | 5 |
| Examples 287 | Examples 43 | 4 |
| Examples 288 | Examples 44 | 5 |
| Examples 289 | Examples 45 | 5 |
| Examples 290 | Examples 46 | 5 |
| Examples 291 | Examples 47 | 4 |
| Examples 292 | Examples 48 | 5 |
| Examples 293 | Examples 49 | 5 |
| Examples 294 | Examples 50 | 5 |
| Examples 295 | Examples 51 | 5 |
| Examples 296 | Examples 52 | 5 |
| Examples 297 | Examples 53 | 5 |
| Examples 298 | Examples 54 | 5 |
| Examples 299 | Examples 55 | 5 |

| | Properties of resin composition Hue | | |
|---|---|---|---|
| Examples | L* value[1] (−) | a* value[1] (−) | b* value[1] (−) |
| Examples 286 | 19.61 | 25.62 | 6.63 |
| Examples 287 | 15.43 | −12.14 | 11.00 |
| Examples 288 | 39.63 | 20.66 | 46.37 |
| Examples 289 | 37.68 | −12.51 | 2.89 |
| Examples 290 | 9.95 | 36.11 | 5.01 |
| Examples 291 | 12.71 | −10.65 | 8.88 |
| Examples 292 | 28.20 | 2.16 | −12.70 |
| Examples 293 | 11.36 | 21.21 | 9.74 |
| Examples 294 | 12.82 | −11.68 | 16.06 |
| Examples 295 | 19.95 | 30.66 | 41.35 |
| Examples 296 | −0.12 | −15.16 | 0.85 |
| Examples 297 | 37.34 | 25.16 | 38.34 |
| Examples 298 | 10.63 | 26.13 | 3.12 |
| Examples 299 | 28.20 | 1.68 | −12.67 |

| | Properties of resin composition Hue | | |
|---|---|---|---|
| Examples | L* value[2] (−) | a* value[2] (−) | b* value[2] (−) |
| Examples 286 | 27.23 | 25.62 | 2.17 |

TABLE 38-continued

| Examples | | | |
|---|---|---|---|
| Examples 287 | 24.13 | −12.14 | 6.33 |
| Examples 288 | 42.93 | 20.66 | 39.95 |
| Examples 289 | 41.34 | −12.51 | −1.38 |
| Examples 290 | 20.14 | 36.11 | 0.63 |
| Examples 291 | 22.14 | −10.65 | 4.31 |
| Examples 292 | 33.79 | 2.16 | −16.20 |
| Examples 293 | 21.16 | 21.21 | 5.13 |
| Examples 294 | 22.22 | −11.68 | 11.14 |
| Examples 295 | 27.49 | 30.66 | 35.18 |
| Examples 296 | 13.03 | −15.16 | −3.32 |
| Examples 297 | 41.06 | 25.16 | 32.32 |
| Examples 298 | 20.63 | 26.13 | −1.16 |
| Examples 299 | 33.79 | 1.68 | −16.17 |

| | Properties of resin composition | |
|---|---|---|
| Examples | Light resistance ($\Delta E^*$ value) (−) | Transparency (linear absorption) ($\mu m^{-1}$) |
| Examples 286 | 2.58 | — |
| Examples 287 | 1.84 | 0.0841 |
| Examples 288 | 2.61 | — |
| Examples 289 | 1.48 | 0.0832 |
| Examples 290 | 1.65 | 0.0783 |
| Examples 291 | 2.03 | 0.0826 |
| Examples 292 | 2.16 | 0.0832 |
| Examples 293 | 1.12 | — |
| Examples 294 | 1.81 | 0.0788 |
| Examples 295 | 1.44 | — |
| Examples 296 | 1.22 | 0.0817 |
| Examples 297 | 1.48 | 0.0775 |
| Examples 298 | 1.80 | 0.0829 |
| Examples 299 | 1.62 | 0.0883 |

(Note) 1): Measured by a portable spectrocolorimeter "COLOR-GUIDE 45/0" (manufactured by BYK CHEMIE JAPAN CO., LTD.)
(Note) 2): Measured by a multi-spectro-colour-meter "MSC-IS-2D" (manufactured by SUGA TESTING MACHINES MANUFACTURING CO., LTD.)

TABLE 39

| Comparative Examples | Production of resin composition Kind of organic pigments or composite particles | Properties of resin composition Dispersing condition (−) |
|---|---|---|
| Comparative Examples 65 | Organic pigment B-1 | 2 |
| Comparative Examples 66 | Organic pigment B-2 | 1 |
| Comparative Examples 67 | Organic pigment G-1 | 2 |
| Comparative Examples 68 | Organic pigment R-1 | 2 |
| Comparative Examples 69 | Organic pigment R-2 | 2 |
| Comparative Examples 70 | Organic pigment R-3 | 1 |
| Comparative Examples 71 | Organic pigment Y-1 | 1 |
| Comparative Examples 72 | Organic pigment Y-2 | 1 |
| Comparative Examples 73 | Comparative Examples 1 | 2 |
| Comparative Examples 74 | Comparative Examples 2 | 3 |
| Comparative Examples 75 | Comparative Examples 3 | 2 |
| Comparative Examples 76 | Comparative Examples 4 | 3 |
| Comparative Examples 77 | Comparative Examples 5 | 2 |

TABLE 39-continued

| | Properties of resin composition Hue | | |
|---|---|---|---|
| Comparative Examples | $L^*$ value[1] (−) | $a^*$ value[1] (−) | $b^*$ value[1] (−) |
| Comparative Examples 65 | 6.81 | 7.63 | −17.38 |
| Comparative Examples 66 | 3.17 | 9.34 | −21.02 |
| Comparative Examples 67 | 13.13 | −16.14 | −6.54 |
| Comparative Examples 68 | 32.42 | 49.16 | 23.68 |
| Comparative Examples 69 | 20.80 | 56.32 | 22.39 |
| Comparative Examples 70 | 31.18 | 46.12 | 21.62 |
| Comparative Examples 71 | 63.69 | 0.66 | 74.11 |
| Comparative Examples 72 | 66.34 | 0.32 | 76.04 |
| Comparative Examples 73 | 57.88 | −2.10 | −24.96 |
| Comparative Examples 74 | 88.63 | 0.31 | 2.01 |
| Comparative Examples 75 | 55.56 | −1.80 | −25.83 |
| Comparative Examples 76 | 73.32 | −0.78 | −3.01 |
| Comparative Examples 77 | 5.74 | 6.42 | 15.78 |

| | Properties of resin composition Hue | | |
|---|---|---|---|
| Comparative Examples | $L^*$ value[2] (−) | $a^*$ value[2] (−) | $b^*$ value[2] (−) |
| Comparative Examples 65 | 17.89 | 7.63 | −20.65 |
| Comparative Examples 66 | 15.32 | 9.34 | −24.11 |
| Comparative Examples 67 | 22.78 | −16.14 | −9.92 |
| Comparative Examples 68 | 37.11 | 49.16 | 18.38 |
| Comparative Examples 69 | 28.13 | 56.32 | 17.16 |
| Comparative Examples 70 | 36.13 | 46.12 | 16.42 |
| Comparative Examples 71 | 64.13 | 0.66 | 66.32 |
| Comparative Examples 72 | 66.67 | 0.32 | 68.16 |
| Comparative Examples 73 | 58.52 | −2.10 | −27.27 |
| Comparative Examples 74 | 90.05 | 0.31 | −1.86 |
| Comparative Examples 75 | 56.37 | −1.80 | −28.09 |
| Comparative Examples 76 | 73.64 | −0.78 | −6.59 |
| Comparative Examples 77 | 17.13 | 6.42 | −19.13 |

| | Properties of resin composition | |
|---|---|---|
| Comparative Examples | Light resistance ($\Delta E^*$ value) (−) | Transparency (linear absorption) ($\mu m^{-1}$) |
| Comparative Examples 65 | 11.24 | 0.2227 |
| Comparative Examples 66 | 11.15 | 0.2321 |
| Comparative Examples 67 | 9.42 | 0.2124 |

TABLE 39-continued

| Comparative Examples | | |
|---|---|---|
| Comparative Examples 68 | 15.68 | 0.3263 |
| Comparative Examples 69 | 17.23 | 0.2162 |
| Comparative Examples 70 | 19.26 | 0.2963 |
| Comparative Examples 71 | 17.78 | 0.2816 |
| Comparative Examples 72 | 20.01 | 0.2614 |
| Comparative Examples 73 | 7.68 | — |
| Comparative Examples 74 | 7.00 | — |
| Comparative Examples 75 | 7.22 | — |
| Comparative Examples 76 | 7.18 | — |
| Comparative Examples 77 | 10.98 | — |

(Note) 1): Measured by a portable spectrocolorimeter "COLOR-GUIDE 45/0" (manufactured by BYK CHEMIE JAPAN CO., LTD.)
(Note) 2): Measured by a multi-spectro-colour-meter "MSC-IS-2D" (manufactured by SUGA TESTING MACHINES MANUFACTURING CO., LTD.)

TABLE 40

| Comparative Examples | Production of resin composition Kind of composite particles | Properties of resin composition Dispersing condition (–) |
|---|---|---|
| Comparative Examples 78 | Comparative Examples 6 | 2 |
| Comparative Examples 79 | Comparative Examples 7 | 3 |
| Comparative Examples 80 | Comparative Examples 8 | 2 |
| Comparative Examples 81 | Comparative Examples 9 | 2 |
| Comparative Examples 82 | Comparative Examples 10 | 2 |
| Comparative Examples 83 | Comparative Examples 11 | 2 |
| Comparative Examples 84 | Comparative Examples 12 | 3 |
| Comparative Examples 85 | Comparative Examples 13 | 2 |
| Comparative Examples 86 | Comparative Examples 14 | 2 |
| Comparative Examples 87 | Comparative Examples 15 | 3 |
| Comparative Examples 88 | Comparative Examples 16 | 2 |

| | Properties of resin composition Hue | | |
|---|---|---|---|
| Comparative Examples | $L^*$ value[1] (–) | $a^*$ value[1] (–) | $b^*$ value[1] (–) |
| Comparative Examples 78 | 58.10 | 0.08 | 75.42 |
| Comparative Examples 79 | 59.44 | 0.19 | 72.96 |
| Comparative Examples 80 | 88.69 | 1.01 | 4.19 |
| Comparative Examples 81 | 63.05 | 3.32 | −20.11 |
| Comparative Examples 82 | 56.33 | 1.68 | −17.10 |
| Comparative Examples 83 | 60.53 | 0.09 | −14.79 |
| Comparative Examples 84 | 58.66 | 0.29 | −15.67 |
| Comparative Examples 85 | 59.97 | −0.88 | −13.80 |
| Comparative Examples 86 | 28.20 | 12.11 | −8.85 |
| Comparative Examples 87 | 25.00 | 16.23 | −6.08 |
| Comparative Examples 88 | 66.40 | −1.32 | 58.14 |

| | Properties of resin composition Hue | | |
|---|---|---|---|
| Comparative Examples | $L^*$ value[2] (–) | $a^*$ value[2] (–) | $b^*$ value[2] (–) |
| Comparative Examples 78 | 58.93 | 0.08 | 67.57 |
| Comparative Examples 79 | 60.16 | 0.19 | 65.23 |
| Comparative Examples 80 | 90.31 | 1.01 | −0.15 |
| Comparative Examples 81 | 63.53 | 3.32 | −23.25 |
| Comparative Examples 82 | 57.32 | 1.68 | −20.39 |
| Comparative Examples 83 | 61.17 | 0.09 | −18.19 |
| Comparative Examples 84 | 59.44 | 0.29 | −19.03 |
| Comparative Examples 85 | 60.65 | −0.88 | −17.25 |
| Comparative Examples 86 | 33.79 | 12.11 | −12.54 |
| Comparative Examples 87 | 31.32 | 16.23 | −9.91 |
| Comparative Examples 88 | 66.73 | −1.32 | 51.14 |

| | Properties of resin composition | |
|---|---|---|
| Comparative Examples | Light resistance ($\Delta E^*$ value) (–) | Transparency (linear absorption) ($\mu m^{-1}$) |
| Comparative Examples 78 | 7.62 | — |
| Comparative Examples 79 | 7.82 | — |
| Comparative Examples 80 | 6.91 | — |
| Comparative Examples 81 | 6.66 | — |
| Comparative Examples 82 | 7.31 | — |
| Comparative Examples 83 | 7.26 | — |
| Comparative Examples 84 | 7.25 | — |
| Comparative Examples 85 | 7.88 | — |
| Comparative Examples 86 | 6.96 | — |
| Comparative Examples 87 | 6.83 | — |
| Comparative Examples 88 | 7.19 | — |

(Note) 1): Measured by a portable spectrocolorimeter "COLOR-GUIDE 45/0" (manufactured by BYK CHEMIE JAPAN CO., LTD.)
(Note) 2): Measured by a multi-spectro-colour-meter "MSC-IS-2D" (manufactured by SUGA TESTING MACHINES MANUFACTURING CO., LTD.)

TABLE 41

Production of master batch pellet — Composite particles

| Examples | Kind | Amount blended (wt. part) |
|---|---|---|
| Examples 300 | Examples 12 | 20.0 |
| Examples 301 | Examples 15 | 20.0 |
| Examples 302 | Examples 16 | 20.0 |
| Examples 303 | Examples 17 | 20.0 |
| Examples 304 | Examples 18 | 20.0 |
| Examples 305 | Examples 20 | 20.0 |
| Examples 306 | Examples 21 | 20.0 |
| Examples 307 | Examples 22 | 20.0 |
| Examples 308 | Examples 12 | 20.0 |
| Examples 309 | Examples 15 | 20.0 |
| Examples 310 | Examples 17 | 20.0 |
| Examples 311 | Examples 12 | 30.0 |
| Examples 312 | Examples 15 | 30.0 |
| Examples 313 | Examples 12 | 30.0 |

Production of master batch pellet — Resin

| Examples | Kind | Amount blended (wt. part) |
|---|---|---|
| Examples 300 | Polyvinyl chloride resin | 80.0 |
| Examples 301 | Polyvinyl chloride resin | 80.0 |
| Examples 302 | Polyvinyl chloride resin | 80.0 |
| Examples 303 | Polyvinyl chloride resin | 80.0 |
| Examples 304 | Polyvinyl chloride resin | 80.0 |
| Examples 305 | Polyvinyl chloride resin | 80.0 |
| Examples 306 | Polyvinyl chloride resin | 80.0 |
| Examples 307 | Polyvinyl chloride resin | 80.0 |
| Examples 308 | Styrene-acrylic copolymer resin | 80.0 |
| Examples 309 | Styrene-acrylic copolymer resin | 80.0 |
| Examples 310 | Styrene-acrylic copolymer resin | 80.0 |
| Examples 311 | Low-density polyethylene | 70.0 |
| Examples 312 | Polypropylene | 70.0 |
| Examples 313 | High-density polyethylene | 70.0 |

Master batch pellet

| Examples | Shape | Average major diameter (average length) (mm) | Average minor diameter (average diameter) (mm) |
|---|---|---|---|
| Examples 300 | Cylindrical | 4.3 | 3.2 |
| Examples 301 | Cylindrical | 3.8 | 3.1 |
| Examples 302 | Cylindrical | 4.1 | 3.0 |
| Examples 303 | Cylindrical | 4.3 | 2.9 |
| Examples 304 | Cylindrical | 4.2 | 3.1 |
| Examples 305 | Cylindrical | 3.9 | 3.2 |
| Examples 306 | Cylindrical | 3.2 | 3.3 |
| Examples 307 | Cylindrical | 3.8 | 3.2 |
| Examples 308 | Cylindrical | 3.9 | 3.3 |
| Examples 309 | Cylindrical | 4.1 | 3.2 |
| Examples 310 | Cylindrical | 4.3 | 3.2 |
| Examples 311 | Cylindrical | 4.2 | 3.0 |
| Examples 312 | Cylindrical | 4.3 | 3.1 |
| Examples 313 | Cylindrical | 4.0 | 3.0 |

TABLE 42

Production of master batch pellet — Composite particles

| Examples | Kind | Amount blended (wt. part) |
|---|---|---|
| Examples 314 | Examples 28 | 20.0 |
| Examples 315 | Examples 31 | 20.0 |
| Examples 316 | Examples 32 | 20.0 |
| Examples 317 | Examples 33 | 20.0 |
| Examples 318 | Examples 34 | 20.0 |
| Examples 319 | Examples 36 | 20.0 |
| Examples 320 | Examples 37 | 20.0 |
| Examples 321 | Examples 38 | 20.0 |
| Examples 322 | Examples 42 | 20.0 |
| Examples 323 | Examples 45 | 20.0 |
| Examples 324 | Examples 47 | 20.0 |
| Examples 325 | Examples 48 | 20.0 |
| Examples 326 | Examples 28 | 20.0 |
| Examples 327 | Examples 31 | 20.0 |
| Examples 328 | Examples 33 | 20.0 |
| Examples 329 | Examples 28 | 30.0 |
| Examples 330 | Examples 31 | 30.0 |
| Examples 331 | Examples 28 | 30.0 |

Production of master batch pellet — Resin

| Examples | Kind | Amount blended (wt. part) |
|---|---|---|
| Examples 314 | Polyvinyl chloride resin | 80.0 |
| Examples 315 | Polyvinyl chloride resin | 80.0 |
| Examples 316 | Polyvinyl chloride resin | 80.0 |
| Examples 317 | Polyvinyl chloride resin | 80.0 |
| Examples 318 | Polyvinyl chloride resin | 80.0 |
| Examples 319 | Polyvinyl chloride resin | 80.0 |
| Examples 320 | Polyvinyl chloride resin | 80.0 |
| Examples 321 | Polyvinyl chloride resin | 80.0 |
| Examples 322 | Polyvinyl chloride resin | 80.0 |
| Examples 323 | Polyvinyl chloride resin | 80.0 |
| Examples 324 | Polyvinyl chloride resin | 80.0 |
| Examples 325 | Polyvinyl chloride resin | 80.0 |
| Examples 326 | Styrene-acrylic copolymer resin | 80.0 |
| Examples 327 | Styrene-acrylic copolymer resin | 80.0 |
| Examples 328 | Styrene-acrylic copolymer resin | 80.0 |
| Examples 329 | Low-density polyethylene | 70.0 |
| Examples 330 | Polypropylene | 70.0 |
| Examples 331 | High-density polyethylene | 70.0 |

Master batch pellet

| Examples | Shape | Average major diameter (average length) (mm) | Average minor diameter (average diameter) (mm) |
|---|---|---|---|
| Examples 314 | Cylindrical | 4.1 | 3.1 |
| Examples 315 | Cylindrical | 4.0 | 3.0 |
| Examples 316 | Cylindrical | 4.3 | 2.9 |
| Examples 317 | Cylindrical | 4.1 | 3.0 |
| Examples 318 | Cylindrical | 3.8 | 3.1 |
| Examples 319 | Cylindrical | 4.0 | 3.0 |
| Examples 320 | Cylindrical | 3.9 | 3.2 |
| Examples 321 | Cylindrical | 4.1 | 3.1 |
| Examples 322 | Cylindrical | 4.2 | 3.2 |
| Examples 323 | Cylindrical | 3.9 | 3.1 |
| Examples 324 | Cylindrical | 4.0 | 3.0 |
| Examples 325 | Cylindrical | 4.1 | 2.9 |
| Examples 326 | Cylindrical | 4.0 | 3.3 |
| Examples 327 | Cylindrical | 3.8 | 3.2 |
| Examples 328 | Cylindrical | 3.7 | 3.2 |
| Examples 329 | Cylindrical | 4.0 | 3.3 |
| Examples 330 | Cylindrical | 4.1 | 3.0 |
| Examples 331 | Cylindrical | 4.2 | 3.1 |

TABLE 43

Production of resin composition
Master batch pellet

| Examples | Kind | Amount blended (wt. part) |
|---|---|---|
| Examples 332 | Examples 300 | 25.0 |
| Examples 333 | Examples 301 | 25.0 |
| Examples 334 | Examples 302 | 25.0 |
| Examples 335 | Examples 303 | 25.0 |
| Examples 336 | Examples 304 | 25.0 |
| Examples 337 | Examples 305 | 25.0 |
| Examples 338 | Examples 306 | 25.0 |
| Examples 339 | Examples 307 | 25.0 |
| Examples 340 | Examples 314 | 25.0 |
| Examples 341 | Examples 315 | 25.0 |
| Examples 342 | Examples 316 | 25.0 |
| Examples 343 | Examples 317 | 25.0 |
| Examples 344 | Examples 318 | 25.0 |
| Examples 345 | Examples 319 | 25.0 |
| Examples 346 | Examples 320 | 25.0 |
| Examples 347 | Examples 321 | 25.0 |
| Examples 348 | Examples 322 | 25.0 |
| Examples 349 | Examples 323 | 25.0 |
| Examples 350 | Examples 324 | 25.0 |
| Examples 351 | Examples 325 | 25.0 |
| Examples 332 | Polyvinyl chloride resin | 74.5 |
| Examples 333 | Polyvinyl chloride resin | 74.5 |
| Examples 334 | Polyvinyl chloride resin | 74.5 |
| Examples 335 | Polyvinyl chloride resin | 74.5 |
| Examples 336 | Polyvinyl chloride resin | 74.5 |
| Examples 337 | Polyvinyl chloride resin | 74.5 |
| Examples 338 | Polyvinyl chloride resin | 74.5 |
| Examples 339 | Polyvinyl chloride resin | 74.5 |
| Examples 340 | Polyvinyl chloride resin | 74.5 |
| Examples 341 | Polyvinyl chloride resin | 74.5 |
| Examples 342 | Polyvinyl chloride resin | 74.5 |
| Examples 343 | Polyvinyl chloride resin | 74.5 |
| Examples 344 | Polyvinyl chloride resin | 74.5 |
| Examples 345 | Polyvinyl chloride resin | 74.5 |
| Examples 346 | Polyvinyl chloride resin | 74.5 |
| Examples 347 | Polyvinyl chloride resin | 74.5 |
| Examples 348 | Polyvinyl chloride resin | 74.5 |
| Examples 349 | Polyvinyl chloride resin | 74.5 |
| Examples 350 | Polyvinyl chloride resin | 74.5 |
| Examples 351 | Polyvinyl chloride resin | 74.5 |
| Examples 332 | Calcium stearate | 0.5 |
| Examples 333 | Calcium stearate | 0.5 |
| Examples 334 | Calcium stearate | 0.5 |
| Examples 335 | Calcium stearate | 0.5 |
| Examples 336 | Calcium stearate | 0.5 |
| Examples 337 | Calcium stearate | 0.5 |
| Examples 338 | Calcium stearate | 0.5 |
| Examples 339 | Calcium stearate | 0.5 |
| Examples 340 | Calcium stearate | 0.5 |
| Examples 341 | Calcium stearate | 0.5 |
| Examples 342 | Calcium stearate | 0.5 |
| Examples 343 | Calcium stearate | 0.5 |
| Examples 344 | Calcium stearate | 0.5 |
| Examples 345 | Calcium stearate | 0.5 |
| Examples 346 | Calcium stearate | 0.5 |
| Examples 347 | Calcium stearate | 0.5 |
| Examples 348 | Calcium stearate | 0.5 |
| Examples 349 | Calcium stearate | 0.5 |
| Examples 350 | Calcium stearate | 0.5 |
| Examples 351 | Calcium stearate | 0.5 |

TABLE 44

Properties of resin composition

| Examples | Dispersing condition (-) | Hue L* value[1] (-) | Hue a* value[1] (-) | Hue b* value[1] (-) | Hue L* value[2] (-) | Hue a* value[2] (-) | Hue b* value[2] (-) | Light resistance (ΔE* value) (-) | Transparency (linear absorption) (μm$^{-1}$) |
|---|---|---|---|---|---|---|---|---|---|
| Examples 332 | 5 | 55.01 | 45.18 | −0.03 | 56.13 | 46.18 | −4.16 | 2.78 | — |
| Examples 333 | 5 | 11.50 | 6.83 | −16.29 | 21.26 | 6.83 | −19.62 | 1.27 | 0.0761 |
| Examples 334 | 5 | 56.11 | 38.64 | 21.40 | 57.12 | 46.64 | 16.21 | 1.48 | 0.0722 |
| Examples 335 | 5 | 79.59 | 1.62 | 77.06 | 80.13 | 3.62 | 69.13 | 2.26 | 0.0698 |
| Examples 336 | 5 | 81.31 | 1.21 | 83.38 | 81.99 | 1.21 | 75.14 | 3.03 | 0.0675 |
| Examples 337 | 5 | 33.54 | −7.63 | −4.23 | 38.00 | −17.63 | −8.15 | 2.11 | 0.0703 |
| Examples 338 | 5 | 32.32 | −5.16 | −28.24 | 37.03 | −7.16 | −30.98 | 1.36 | — |
| Examples 339 | 5 | 11.27 | 7.96 | −16.33 | 21.09 | 7.96 | −19.65 | 1.26 | 0.0766 |

(Note)
[1] Measured by a portable spectrocolorimeter "COLOR-GUIDE 45/0" (manufactured by BYK CHEMIE JAPAN CO., LTD.)

(Note)
[2] Measured by a multi-spectro-colour-meter "MSC-IS-2D" (manufactured by SUGA TESTING MACHINES MANUFACTURING CO., LTD.)

TABLE 45

| | Properties of resin composition | | | |
|---|---|---|---|---|
| | | Hue | | |
| Examples | Dispersing condition (-) | L* value[1] (-) | a* value[1] (-) | b* value[1] (-) |
| Examples 340 | 5 | 9.94 | 8.12 | −20.02 |
| Examples 341 | 5 | 7.80 | 9.13 | −19.81 |
| Examples 342 | 5 | 30.54 | 52.14 | 24.72 |
| Examples 343 | 5 | 69.87 | 0.56 | 77.23 |
| Examples 344 | 5 | 11.91 | 5.77 | −18.86 |
| Examples 345 | 5 | 12.26 | −15.13 | −4.63 |
| Examples 346 | 5 | 63.67 | 1.82 | 76.01 |
| Examples 347 | 5 | 6.64 | 9.63 | −21.15 |
| Examples 348 | 5 | 20.80 | 28.16 | 9.21 |
| Examples 349 | 5 | 41.08 | −13.13 | 2.65 |
| Examples 350 | 5 | 12.74 | −11.65 | 10.06 |
| Examples 351 | 5 | 29.51 | 2.63 | −13.83 |

| | Properties of resin composition Hue | | |
|---|---|---|---|
| Examples | L* value[2] (-) | a* value[2] (-) | b* value[2] (-) |
| Examples 340 | 20.13 | 8.12 | −23.16 |
| Examples 341 | 18.60 | 9.13 | −22.96 |
| Examples 342 | 35.62 | 52.14 | 19.37 |
| Examples 343 | 70.12 | 0.56 | 69.29 |
| Examples 344 | 21.56 | 5.77 | −22.06 |
| Examples 345 | 22.20 | −15.13 | −8.53 |
| Examples 346 | 64.11 | 1.82 | 68.13 |
| Examples 347 | 17.77 | 9.63 | −24.24 |
| Examples 348 | 28.13 | 28.16 | 4.63 |
| Examples 349 | 44.13 | −13.13 | −1.61 |
| Examples 350 | 22.16 | −11.65 | 5.43 |
| Examples 351 | 34.81 | 2.63 | −17.28 |

| | Properties of resin composition | |
|---|---|---|
| Examples | Light resistance ($\Delta E^*$ value) (-) | Transparency (linear absorption) ($\mu m^{-1}$) |
| Examples 340 | 2.53 | — |
| Examples 341 | 1.36 | 0.0766 |
| Examples 342 | 1.46 | 0.0747 |
| Examples 343 | 2.35 | 0.0685 |
| Examples 344 | 2.38 | 0.0731 |
| Examples 345 | 1.69 | 0.0673 |
| Examples 346 | 1.60 | — |
| Examples 347 | 1.13 | 0.0754 |
| Examples 348 | 2.50 | — |
| Examples 349 | 1.44 | 0.0746 |
| Examples 350 | 1.97 | 0.0738 |
| Examples 351 | 1.93 | 0.0744 |

(Note) 1): Measured by a portable spectrocolorimeter "COLOR-GUIDE 45/0" (manufactured by BYK CHEMIE JAPAN CO., LTD.)
(Note) 2): Measured by a multi-spectro-colour-meter "MSC-IS-2D" (manufactured by SUGA TESTING MACHINES MANUFACTURING CO., LTD.)

What is claimed is:

1. A rubber or resin composition comprising:
a base material for rubber or resin composition, and
a pigment comprising the composite particles having an average particle diameter of 0.001 to 10.0 tim and a liaht resistance ($\Delta E^*$ value) of not more than 5.0, comprising:
white inorganic particles as core particles;
a gluing agent coating layer formed on surface of said white inorganic particle; and
an organic pigment coat formed onto said gluing agent coating layer in an amount of from 1 to 500 parts by weight based on 100 parts by weight of said white inorganic particles.

2. A rubber or resin composition according to claim 1, wherein the amount of said pigment is 0.05 to 200 parts by weight based on 100 parts by weight of said base material for rubber or resin composition.

3. A rubber or resin composition according to claim 1, wherein said gluing agent is an organosilicon compound, a coupling agent, an oligomer compound or a polymer compound.

4. A rubber or resin composition according to claim 3, wherein said organosilicon compound is at least one organosilicon compound selected from the group consisting of:
(1) organosilane compounds obtainable from alkoxysilane compounds,
(2) polysiloxanes or modified polysiloxanes, and
(3) fluoroalkyl organosilane compounds obtainable form fluoroalkylsilane compounds.

5. A rubber or resin composition according to claim 3, wherein said coupling agent is at least one selected from the group consisting of a silane-based coupling agent, a titanate-based coupling agent, an aluminate-based coupling agent and a zirconate-based coupling agent.

6. A rubber or resin composition according to claim 1, wherein said white inorganic particles are a white pigment, a pearl pigment or an extender pigment.

7. A rubber or resin composition according to claim 1, wherein said white inorganic particles as core particles are particles each having on at least a part of the surface thereof, a coating layer comprising at least one compound selected from the group consisting of hydroxides of aluminum, oxides of aluminum, hydroxides of silicon and oxides of silicon.

8. A rubber or resin composition according to claim 1, wherein said organic pigment is an organic red-based pigment, an organic blue-based pigment, an organic yellow-based pigment or an organic green-based pigment.

9. A rubber or resin composition according to claim 1, wherein said composite particles have a BET specific surface area value of 1.0 to 500 $m^2/g$.

10. A rubber or resin composition according to claim 1, wherein said composite particles have a tinting strength of not less than 110%.

11. A rubber or resin composition according to claim 1, wherein the amount of said organic pigment coat formed onto said gluing agent coating layer is from 1 to 300 parts by weight based on 100 parts by weight of said white inorganic particles.

12. A rubber or resin composition according to claim 1, wherein the amount of the gluing agent coating layer comprising the organosilicon compound or the silane-based coupling agent is 0.02 to 5.0% by weight, calculated as Si, based on the weight of the gluing agent-coated white inorganic particles, and the amount of the gluing agent coating layer comprising the titanate-based coupling agent, the aluminate-based coupling agent, the zirconate-based coupling agent, the oligomer or the polymer compound is 0.01 to 15.0% by weight, calculated as C, based on the weight of the gluing agent-coated white inorganic particles.

13. A rubber or resin composition comprising:
a base material for rubber or resin composition, and
a pigment comprising the composite particles having an average particle diameter of 0.00 1 to 10.0 μm and a light resistance ($\Delta E^*$ value) of not more than 5.0, comprising:
white inorganic particles as core particles;
a gluing agent coating layer formed on surface of said white inorganic particle, comprising at least one selected from the group consisting of a silane-based coupling agent, a titanate-based coupling agent, an aluminate-based coupling agent, a zirconate-based coupling agent, an oligomer compound, a polymer compound and an organosilicon compound selected from the group consisting of:
(1) organosilane compounds obtainable from alkoxysilane compounds,
(2) polysiloxanes or modified polysiloxanes, and
(3) fluoroalkyl organosilane compounds obtainable form fluoroalkylsilane compounds; and
an organic pigment coat formed on said coating layer in an amount of from 1 to 500 parts by weight based on 100 parts by weight of said white inorganic particles.

14. A rubber or resin composition according to claim 13, wherein the amount of said pigment is 0.05 to 200 parts by weight based on 100 parts by weight of said base material for rubber or resin composition.

15. A rubber or resin composition according to claim 13, wherein said white inorganic particles are a white pigment, a pearl pigment or an extender pigment.

16. A rubber or resin composition according to claim 13, wherein said white inorganic particles as core particles are particles each having on at least a part of the surface thereof, a coating layer comprising at least one compound selected from the group consisting of hydroxides of aluminum, oxides of aluminum, hydroxides of silicon and oxides of silicon.

17. A rubber or resin composition according to claim 13, wherein said organic pigment is an organic red-based pigment, an organic blue-based pigment, an organic yellow-based pigment or an organic green-based pigment.

18. A rubber or resin composition according to claim 13, wherein the amount of said organic pigment coat formed onto said gluing agent coating layer is from 1 to 300 parts by weight based on 100 parts by weight of said white inorganic particles.

19. A rubber or resin composition according to claim 13, wherein the amount of the gluing agent coating layer comprising the organosilicon compound or the silane-based coupling agent is 0.02 to 5.0% by weight, calculated as Si, based on the weight of the gluing agent-coated white inorganic particles, and the amount of the gluing agent coating layer comprising the titanate-based coupling agent, the aluminate-based coupling agent, the zirconate-based coupling agent, the oligomer compound or the polymer compound is 0.01 to 15.0% by weight, calculated as C, based on the weight of the gluing agent-coated white inorganic particles.

20. A rubber or resin composition according to claim 13, wherein said composite particles have a BET specific surface area value of 1.0 to 500 m$^2$/g.

21. A rubber or resin composition according to claim 13, wherein said composite particles have a tinting strength of not less than 110%.

22. A rubber or resin composition comprising:
a base material for rubber or resin composition, and
a pigment comprising the composite particles having an average particle diameter of 0.001 to 10.0 μm and a light resistance (ΔE* value) of not more than 5.0, comprising:
white inorganic particles as core particles;
a coating layer formed on surface of said white inorganic particle, comprising at least one organosilicon compound selected from the group consisting of:
(1) organosilane compounds obtainable from alkoxysilane compounds, and
(2) polysiloxanes or modified polysiloxanes; and
an organic pigment coat formed on the coating layer comprising said organosilicon compound in an amount of from 1 to 100 parts by weight based on 100 parts by weight of said white inorganic particles.

23. A rubber or resin composition according to claim 22, wherein the amount of said pigment is 0.05 to 200 parts by weight based on 100 parts by weight of said base material for rubber or resin composition.

24. A rubber or resin composition according to claim 22, wherein said white inorganic particles as core particles are particles each having on at least a part of the surface thereof, a coating layer comprising at least one compound selected from the group consisting of hydroxides of aluminum, oxides of aluminum, hydroxides of silicon and oxides of silicon.

25. A rubber or resin composition according to claim 22, wherein said organic pigment is an organic red-based pigment, an organic blue-based pigment, an organic yellow-based pigment or an organic green-based pigment.

26. A rubber or resin composition according to claim 22, wherein the amount of the coating layer comprising said organosilicon compound is 0.02 to 5.0% by weight, calculated as Si, based on the weight of the coated white inorganic particles.

27. A rubber or resin composition according to claim 22, wherein said composite particles have a BET specific surface area value of 1.0 to 500 m$^2$/g.

28. A rubber or resin composition according to claim 22, wherein said composite particles have a tinting strength of not less than 115%.

29. A rubber or resin composition comprising:
a base material for rubber or resin composition, and
a pigment comprising the composite particles having an average particle diameter of 0.001 to 10.0 μm and a light resistance (ΔE* value) of not more than 5.0, comprising:
white inorganic particles as core particles;
a gluing agent coating layer formed on surface of said white inorganic particle; and
at least two colored adhesion layers composed of an organic pigment, formed on said coating layer through a gluing agent,
the amount of the organic pigment being 1 to 500 parts by weight based on 100 parts by weight of said white inorganic particles.

30. A rubber or resin composition according to claim 29, wherein the amount of said pigment is 0.05 to 200 parts by weight based on 100 parts by weight of said base material for rubber or resin composition.

31. A rubber or resin composition according to claim 29, wherein said gluing agent is an organosilicon compound, a coupling agent, an oligomer compound or a polymer compound.

32. A rubber or resin composition according to claim 31, wherein said organosilicon compound is at least one organosilicon compound selected from the group consisting of:
(1) organosilane compounds obtainable from alkoxysilane compounds,
(2) polysiloxanes or modified polysiloxanes, and
(3) fluoroalkyl organosilane compounds obtainable form fluoroalkylsilane compounds.

33. A rubber or resin composition according to claim 31, wherein said coupling agent is at least one selected from the group consisting of a silane-based coupling agent, a titanate-based coupling agent, an aluminate-based coupling agent and a zirconate-based coupling agent.

34. A rubber or resin composition according to claim 29, wherein said white inorganic particles are a white pigment, a pearl pigment or an extender pigment.

35. A rubber or resin composition according to claim 29, wherein said white inorganic particles as core particles are particles each having on at least a part of the surface thereof, a coating layer comprising at least one compound selected from the group consisting of hydroxides of aluminum, oxides of aluminum, hydroxides of silicon and oxides of silicon.

36. A rubber or resin composition according to claim 29, wherein said organic pigment is an organic red-based pigment, an organic blue-based pigment, an organic yellow-based pigment or an organic green-based pigment.

37. A rubber or resin composition according to claim 29, wherein said composite particles have a BET specific surface area value of 1.0 to 500 m²/g.

38. A rubber or resin composition according to claim 29, wherein said composite particles have a tinting strength of not less than 110%.

39. A rubber or resin composition according to claim 29, wherein the amount of said organic pigment coat formed onto said gluing agent coating layer is from 1 to 300 parts by weight based on 100 parts by weight of said white inorganic particles.

40. A rubber or resin composition according to claim 29, wherein the amount of the gluing agent coating layer comprising the organosilicon compound or the silane-based coupling agent is 0.02 to 5.0% by weight, calculated as Si, based on the weight of the gluing agent-coated white inorganic particles, and the amount of the gluing agent coating layer comprising the titanate-based coupling agent, the aluminate-based coupling agent, the zirconate-based coupling agent, the oligomer compound or the polymer compound is 0.01 to 15.0% by weight, calculated as C, based on the weight of the gluing agent-coated white inorganic particles.

41. A rubber or resin composition comprising:
a base material for rubber or resin composition, and
a pigment comprising the composite particles having an average particle diameter of 0.001 to 10.0 μm and a light resistance (ΔE* value) of not more than 5.0, comprising:
white inorganic particles as core particles;
a gluing agent coating layer formed on surface of said white inorganic particle, comprising at least one selected from the group consisting of a silane-based coupling agent, a titanate-based coupling agent, an aluminate-based coupling agent, a zirconate-based coupling agent, an oligomer compound, a polymer compound and an organosilicon compound selected from the group consisting of:
(1) organosilane compounds obtainable from alkoxysilane compounds,
(2) polysiloxanes or modified polysiloxanes, and
(3) fluoroalkyl organosilane compounds obtainable form fluoroalkylsilane compounds; and
at least two colored adhesion layers composed of an organic pigment, formed on said coating layer through a gluing agent comprising at least one selected from the group consisting of a silane-based coupling agent, a titanate-based coupling agent, an aluminate-based coupling agent, a zirconate-based coupling agent, an oligomer compound, a polymer compound and an organosilicon compound selected from the group consisting of: (1) organosilane compounds obtainable from alkoxysilane compounds, (2) polysiloxanes or modified polysiloxanes, and (3) fluoroalkyl organosilane compounds obtainable form fluoroalkylsilane compounds,
the amount of the organic pigment being 1 to 500 parts by weight based on 100 parts by weight of said white inorganic particles.

42. A rubber or resin composition according to claim 41, wherein the amount of said pigment is 0.05 to 200 parts by weight based on 100 parts by weight of said base material for rubber or resin composition.

43. A rubber or resin composition according to claim 41, wherein said white inorganic particles are particles each having on at least a part of the surface thereof, a coating layer comprising at least one compound selected from the group consisting of hydroxides of aluminum, oxides of aluminum, hydroxides of silicon and oxides of silicon.

44. A rubber or resin composition according to claim 41, wherein said organic pigment is an organic red-based pigment, an organic blue-based pigment, an organic yellow-based pigment or an organic green-based pigment.

45. A rubber or resin composition according to claim 41, wherein the amount of the gluing agent coating layer comprising the organosilicon compound or the silane-based coupling agent is 0.02 to 5.0% by weight, calculated as Si, based on the weight of the gluing agent-coated white inorganic particles, and the amount of the gluing agent coating layer comprising the titanate-based coupling agent, the aluminate-based coupling agent, the zirconate-based coupling agent, the oligomer compound or the polymer compound is 0.01 to 15.0% by weight, calculated as C, based on the weight of the gluing agent-coated white inorganic particles.

46. A rubber or resin composition according to claim 41, wherein the amount of said organic pigment coat formed onto said gluing agent coating layer is from 1 to 300 parts by weight based on 100 parts by weight of said white inorganic particles.

47. A rubber or resin composition according to claim 41, wherein said composite particles have a BET specific surface area value of 1.0 to 500 m²/g.

48. A rubber or resin composition according to claim 41, wherein said composite particles have a tinting strength of not less than 115%.

49. A rubber or resin composition comprising:
a base material for rubber or resin composition, and
a pigment comprising the composite particles having an average particle diameter of 0.001 to 0.5 μm and a light resistance (ΔE* value) of not more than 5.0, comprising:
extender pigment particles as core particles;
a gluing agent coating layer formed on surface of said extender pigment particle, comprising an organosilicon compound, a coupling agent, an oligomer compound or a polymer compound; and
an organic pigment coat formed on the gluing agent coating layer in an amount of from 1 to 500 parts by weight based on 100 parts by weight of said extender pigment particles.

50. A rubber or resin composition according to claim 49, wherein the amount of said pigment is 0.05 to 200 parts by weight based on 100 parts by weight of said base material for rubber or resin composition.

51. A rubber or resin composition according to claim 49, wherein the average particle diameter thereof is 0.001 to 0.3 μm.

52. A rubber or resin composition according to claim 49, wherein said extender pigment particles as core particles are particles each having on at least a part of the surface thereof, a coating layer comprising at least one compound selected from the group consisting of hydroxides of aluminum, oxides of aluminum, hydroxides of silicon and oxides of silicon.

53. A rubber or resin composition according to claim 49, wherein said organic pigment is an organic red-based pigment, an organic blue-based pigment, an organic yellow-based pigment or an organic green-based pigment.

54. A rubber or resin composition according to claim 49, wherein the amount of the gluing agent coating layer comprising the organosilicon compound or the silane-based coupling agent is 0.02 to 5.0% by weight, calculated as Si, based on the weight of the gluing agent-coated extender pigment particles, and the amount of the gluing agent coating layer comprising the titanate-based coupling agent, the aluminate-based coupling agent, the zirconate-based coupling agent, the oligomer compound or the polymer compound is 0.01 to 15.0% by weight, calculated as C, based on the weight of the gluing agent-coated extender pigment particles.

55. A rubber or resin composition according to claim 49, wherein the amount of said organic pigment coat formed onto said gluing agent coating layer is from 1 to 300 parts by weight based on 100 parts by weight of said extender pigment.

56. A rubber or resin composition according to claim 49, wherein said composite particles have a BET specific surface area value of 1.0 to 500 m$^2$/g.

57. A rubber or resin composition according to claim 49, wherein said composite particles have a tinting strength of not less than 115%.

58. A pigment dispersion for water-based paint comprising:
- 100 parts by weight of a pigment dispersion base material for water-based paint; and
- 5 to 1,000 parts by weight of the pigment selected from any one of the following composite particles (I) to (VI):
- (I) composite particles having an average particle diameter of 0.00 1 to 10.0 μm and a light resistance (ΔE* value) of not more than 5.0, comprising:
- white inorganic particles as core particles;
- a gluing agent coating layer formed on surface of said white inorganic particle; and
- an organic pigment coat formed onto said gluing agent coating layer in an amount of from 1 to 500 parts by weight based on 100 parts by weight of said white inorganic particles;
- (II) composite particles having an average particle diameter of 0.00 1 to 10.0 μm and a light resistance (ΔE* value) of not more than 5.0, comprising:
- white inorganic particles as core particles;
- a gluing agent coating layer formed on surface of said white inorganic particle, comprising at least one selected from the group consisting of a silane-based coupling agent, a titanate-based coupling agent, an aluminate-based coupling agent, a zirconate-based coupling agent, an oligomer compound, a polymer compound and an organosilicon compound selected from the group consisting of:
- (1) organosilane compounds obtainable from alkoxysilane compounds,
- (2) polysiloxanes or modified polysiloxanes, and
- (3) fluoroalkyl organosilane compounds obtainable form fluoroalkylsilane compounds; and
- an organic pigment coat formed on said coating layer in an amount of from 1 to 500 parts by weight based on 100 parts by weight of said white inorganic particles;
- (III) composite particles having an average particle diameter of 0.00 1 to 10.0 μm and a light resistance (ΔE* value) of not more than 5.0, comprising:
- white inorganic particles as core particles;
- a coating layer formed on surface of said white inorganic particle, comprising at least one organosilicon compound selected from the group consisting of:
- (1) organosilane compounds obtainable from alkoxysilane compounds, and
- (2) polysiloxanes or modified polysiloxanes; and
- an organic pigment coat formed on the coating layer comprising said organosilicon compound in an amount of from 1 to 100 parts by weight based on 100 parts by weight of said white inorganic particles;
- (IV) composite particles having an average particle diameter of 0.00 1 to 10.0 μm and a light resistance (ΔE* value) of not more than 5.0, comprising:
- white inorganic particles as core particles;
- a gluing agent coating layer formed on surface of said white inorganic particle; and
- at least two colored adhesion layers composed of an organic pigment, formed on said coating layer through a gluing agent,
- the amount of the organic pigment being 1 to 500 parts by weight based on 100 parts by weight of said white inorganic particles;
- (V) composite particles having an average particle diameter of 0.00 1 to 10.0 μm and a liaht resistance (AE* value) of not more than 5.0, comprising:
- white inorganic particles as core particles;
- a gluing agent coating layer formed on surface of said white inorganic particle, comprising at least one selected from the group consisting of a silane-based coupling agent, a titanate-based coupling agent, an aluminate-based coupling agent, a zirconate-based coupling agent, an oligomer compound, a polymer compound and an organosilicon compound selected from the group consisting of:
- (1) organosilane compounds obtainable from alkoxysilane compounds,
- (2) polysiloxanes or modified polysiloxanes, and
- (3) fluoroalkyl organosilane compounds obtainable form fluoroalkylsilane compounds; and
- at least two colored adhesion layers composed of an organic pigment, formed on said coating layer through a gluing agent comprising at least one selected from the group consisting of a silane-based coupling agent, a titanate-based coupling agent, an aluminate-based coupling agent, a zirconate-based coupling agent, an oligomer compound, a polymer compound and an organosilicon compound selected from the group consisting of: (1) organosilane compounds obtainable from alkoxysilane compounds, (2) polysiloxanes or modified polysiloxanes, and (3) fluoroalkyl organosilane compounds obtainable form fluoroalkylsilane compounds, the amount of the organic pigment being 1 to 500 parts by weight based on 100 parts by weight of said white inorganic particles; and
- (VI) composite particles having an average particle diameter of 0.00 1 to 0.5 μm and a light resistance (ΔE* value) of not more than 5.0, comprising:
- extender pigment particles as core particles;
- a gluing agent coating layer formed on surface of said extender pigment particle, comprising an organosilicon compound, a coupling agent, an oligomer compound or a polymer compound; and
- an organic pigment coat formed on the gluing agent coating layer in an amount of from 1 to 500 parts by weight based on 100 parts by weight of said extender pigment particles.

* * * * *